Figure 1:
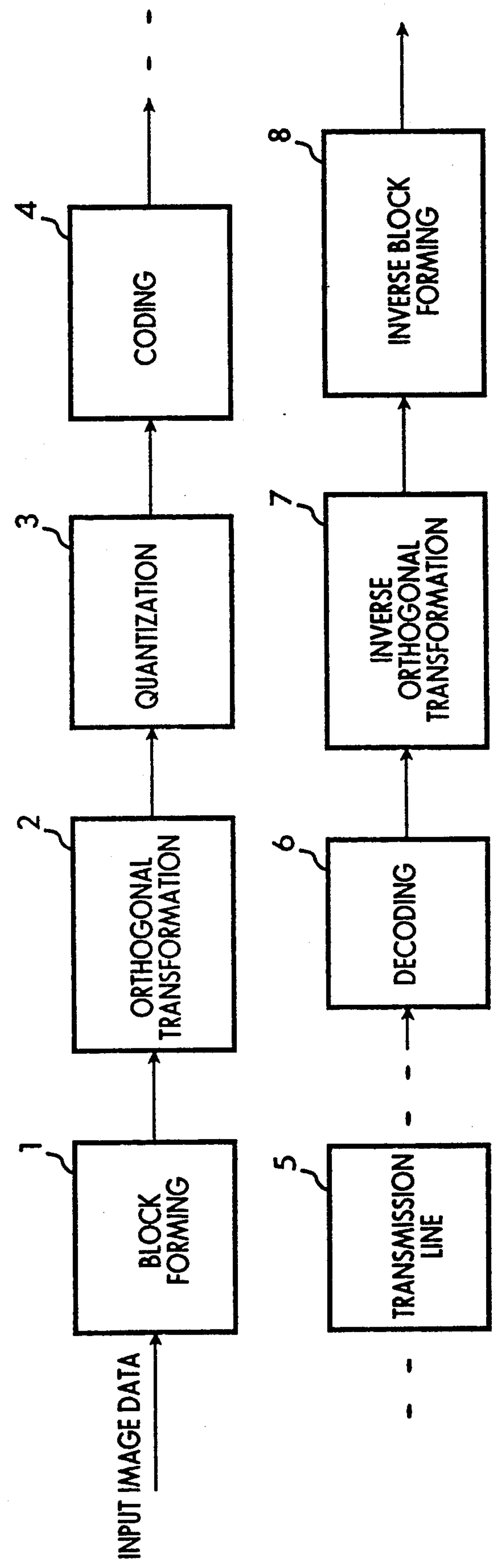

US005191446A

United States Patent [19]

Hamano et al.

[11] Patent Number: 5,191,446

[45] Date of Patent: Mar. 2, 1993

[54] IMAGE DATA TRANSMISSION SYSTEM

[75] Inventors: Takashi Hamano, Kawasaki; Kiyoshi Sakai, Yokohama; Kiichi Matsuda, Kawasaki, all of Japan

[73] Assignee: Fujitsu Limited, Japan

[21] Appl. No.: 594,090

[22] Filed: Oct. 9, 1990

[30] Foreign Application Priority Data

Oct. 9, 1989 [JP] Japan .................................. 1-262257
Oct. 9, 1989 [JP] Japan .................................. 1-262259
Oct. 9, 1989 [JP] Japan .................................. 1-262260

[51] Int. Cl.[5] .................................. H04N 1/40
[52] U.S. Cl. .................................. 358/463
[58] Field of Search .................................. 358/433–434, 358/438, 448, 463, 160, 163

[56] References Cited

U.S. PATENT DOCUMENTS

| | | | |
|---|---|---|---|
| 3,686,437 | 8/1972 | Leonard | 358/160 |
| 4,188,643 | 2/1980 | Schayes et al. | 358/463 |
| 4,709,395 | 11/1987 | Fischer et al. | 358/448 |
| 4,920,501 | 4/1990 | Sullivan et al. | 358/463 |
| 4,975,783 | 12/1990 | Takaoka | 358/463 |
| 5,089,885 | 2/1992 | Clark | 358/84 |

*Primary Examiner*—Stephen Brinich
*Attorney, Agent, or Firm*—Staas & Halsey

[57] ABSTRACT

An image data transmission system performs a coding of a plurality of picture elements in units of blocks. In order to prevent a deterioration of an image quality caused due to a loss of a packet cell on a transmission line without increasing a volume of data to be transmitted, a unit for producing a signal designating a loss compensation method to be performed on a receiving side is provided to be performed on a transmission side. The receiving side provides a unit for detecting a loss of the packet or cell and a unit for compensating the lost block data by the loss compensating method designated by the transmission side.

38 Claims, 83 Drawing Sheets

ORDINARY CASE

CASE OF CELL LOSS

CASE OF CELL LOSS

ORDINARY CASE

| ave1 | ave2 | ave3 |
|------|------|------|
| ave4 | ave5 | ave6 |

| ave1 | ave2 | ave3 |
|------|------|------|
| ave1 | [ave5] | ave6 |

[ave5]: AVERAGED VALUE OF BLOCK DATA WITHIN PREVIOUS FRAME

① S

| 30 | 25 | 24 |
|---|---|---|
| 8 | 19 | 38 |

② S

| 29 | 26 | 27 |
|---|---|---|
| 30 | 14 | 38 |

THRESHOLD VALUE OF LARGE/SMALL
JUDGMENT OF AVERAGED VALUE ; ±8

LARGE : CODE 1
SMALL : CODE 0

0 0 0 1 0 0

③ S

| 1 | -1 | -3 |
|---|---|---|
| -22 | 5 | 0 |

TRANSMISSION SIDE DATA

RECEIVING SIDE DATA

ORDINARY CASE

CASE OF CELL LOSS ave 5 : AVERAGED VALUE OF BLOCK DATA WITHIN PREVIOUS FRAME
(ave 4) : VALUE OF BLOCK WITHIN CURRENT FRAME TRANSMITTED FROM TRANSMISSION SIDE (ROUGHLY QUANTIZED)

TRANSMISSION SIDE DATA

RECEIVING SIDE DATA

ORDINARY CASE

CASE OF CELL LOSS

CASE OF CELL LOSS

ORDINARY CASE

TRANSMISSION SIDE DATA

①S

| 30 | 25 | 24 |
|----|----|----|
| 8  | 19 | 26 |

THRESHOLD VALUE OF
LARGE/SMALL JUDGMENT
OF DIRECT CURRENT COEFFICIENT: ±8

LARGE : CODE 1

SMALL : CODE 0

1 (CODE REPRESENTING 8) 0 0

RECEIVING SIDE DATA

①R

| 30 | 25 | 24 |
|----|----|----|
| 8  | 25 | 24 |

ORDINARY CASE

CASE OF CELL LOSS

EACH PORTION SEPARATED BY THICK LINES REPRESENT FREQUENCY BAND
(THE SEPARATION METHOD IS NOT LIMITED TO THE PRESENT SYSTEM)

UPPER LEFT SIDE DESIGNATES LOW FREQUENCY

| | | | |
|---|---|---|---|
| L1 | L2 | H | H |
| L3 | H | H | H |
| H | H | H | H |
| H | H | H | H |

COEFFICIENT REGION IN THE PREVIOUS FRAME $\ell 1 - L1 > TH1$ (THRESHOLD)
$\ell 2 - L2 < TH2$ (THRESHOLD)
$\ell 3 - L3 > TH3$ (THRESHOLD)

Fig. 39A

| | | | |
|---|---|---|---|
| ℓ1 | ℓ2 | H | H |
| ℓ3 | H | H | H |
| H | H | H | H |
| H | H | H | H |

COEFFICIENT REGION IN THE PRESENT FRAME (ℓ1),(ℓ3) IS REPRESENT A VALUE TRANSMITTED FROM TRANSMITTING SIDE

Fig. 39B

| | | | |
|---|---|---|---|
| ℓ1 | ℓ2 | H | H |
| ℓ3 | H | H | H |
| H | H | H | H |
| H | H | H | H |

COEFFICIENT REGION AFTER ORDINARY DECODING $\ell 1 - L1 > TH1$ (THRESHOLD)
$\ell 2 - L2 < TH2$ (THRESHOLD)
$\ell 3 - L3 > TH3$ (THRESHOLD)

Fig. 39C

| | | | |
|---|---|---|---|
| (ℓ1) | L2 | H | H |
| (ℓ3) | H | H | H |
| H | H | H | H |
| H | H | H | H |

COEFFICIENT REGION AFTER DECODING WHERE CELL DISPOSAL OCCURS (ℓ1),(ℓ3) IS REPRESENT A VALUE TRANSMITTED FROM TRANSMITTING SIDE

Fig. 39D

TRANSMISSION SIDE DATA

RECEIVING SIDE DATA

THRESHOLD VALUE OF LARGE/SMALL JUDGMENT: ± 8

LARGE : CODE 1

SMALL : CODE 0

1000 1000 1000 1

11 (COMPENSATION INFORMATION FOR 22) 0 1 (COMPENSATION INFORMATION FOR -9) 1000 1000 1 ex. 24 ex. -8

| | |
|---|---|
| dc | ac1 |
| ac2 | ac3 |

ORDINARY CASE

Fig. 44A

| | |
|---|---|
| dc' | 0 |
| 0 | 0 |

CASE OF CELL LOSS

Fig. 44B

| | |
|---|---|
| PELa | PELb |
| PELc | PELd |

ORDINARY CASE

Fig. 45A

| | |
|---|---|
| $\frac{(PELa'+PELb'+PELc'+PELd')}{4}$ | $\frac{(PELa'+PELb'+PELc'+PELd')}{4}$ |
| $\frac{(PELa'+PELb'+PELc'+PELd')}{4}$ | $\frac{(PELa'+PELb'+PELc'+PELd')}{4}$ |

CASE OF CELL LOSS

Fig. 45B

①S

| | |
|---|---|
| 1 | -9 |
| 12 | 0 |

②S

| | |
|---|---|
| 2 | 10 |
| -5 | 3 |

③S

| | |
|---|---|
| 3 | 1 |
| 7 | 3 |

TRANSMISSION SIDE DATA

Fig. 46A

①R

| | |
|---|---|
| ? | ? |
| ? | ? |

②R

| | |
|---|---|
| 2 | 10 |
| -5 | 3 |

③R

| | |
|---|---|
| 2 | 0 |
| 0 | 0 |

RECEIVING SIDE DATA (PRESENT INVENTION)

Fig. 46B

①R

| | |
|---|---|
| ? | ? |
| ? | ? |

②R

| | |
|---|---|
| 2 | 10 |
| -5 | 3 |

③R

| | |
|---|---|
| 2 | 10 |
| -5 | 3 |

RECEIVING SIDE DATA (PRIOR ART)

Fig. 46C

TRANSMISSION SIDE DATA

RECEIVING SIDE DATA (PRESENT INVENTION)

RECEIVING SIDE DATA (PRIOR ART)

IMAGE DATA TRANSMISSION SYSTEM

FIELD OF THE INVENTION

The present invention relates to an image data transmission system for coding input image data by using a plurality of picture elements as one block and transmitting the input image data in a packet or a cell unit, and more particularly to an image data transmission system for compensating the data of the block corresponding to a packet or a cell which is lost of on the transmission line.

Recently, image apparatuses with digitalized and an apparatus for transmitting an image digital signal have been broadly developed and researched in application fields such as video-telephone.

Generally, the volume of data required to transmit an image is very large. For example, a transmission capacity of 100 Mbit/sec may be necessary. This is 1500 times the volume of information required to transmit a voice. The screen is changed 30 times/sec in transmitting a television image, i.e., the frame is switched every 1/30 second. The picture element on one screen corresponding to one frame is generally arranged two-dimensionally and if the signal level of one picture element is expressed by 8 bits, for example, the volume of image data information corresponding to one frame becomes very large.

However, where a frame is switched every 1/30 second as in a television signal, the content of the pictures of respective frames does not change greatly. The greatest part of the image, such as the sky and background, does not move. The portion that changes in each frame is small. An inter frame coding method is considered as a system for compressing and coding the image data.

Differences in level data are obtained between corresponding picture elements in two continuous frames in a time divisional manner according to the inter-frame coding system. These differences are Huffman coded and transmitted via the transmission line. If the difference in level data for most of the picture element does not change, the difference for two continuous the picture elements becomes 0 and can be expressed by 1 bit. The code for pictures with a large level difference requires more than 8 bits and only the difference in level is coded. As a result, the amount of information to be transmitted is greatly compressed. In contrast, the system for coding the data within one frame is called a system of inter-frame coding.

Even if intra-frame coding or inter-frame coding are utilized, two operations of sampling and quantization are basically necessary for a digital expression of an image signal. There are two methods of sampling the image. The first is to express the image by using a level value for a discrete type point arrangement corresponding to an image within the frame. The second method is to perform a normal orthogonal expansion of a level value function (image function) defined by an XY plane corresponding to the frame plane. The expansion coefficient is treated as a sampled value.

FIG. 1 shows a whole block diagram of the image transmission system using the normal orthogonal transformation of the second method. The input image in FIG. 1 is formed into a block at 1, orthogonally transformed at 2, quantized at 3 and Huffman coded at 4. It is thereby transmitted from the transmitting side onto the transmission line 5. On the receiving side, the signal from the transmission line 5 is decoded, subjected to an inverse orthogonal transformation at 7 and an inverse block formation at 8. It is thereby output as the image data. The blocking operation at 1 does not perform the two dimensional data of the K×K picture elements (corresponding to one screen) in a group and an orthogonal transformation, but obtains a transformation coefficient in units of block by using 4×4–16×16 picture elements as one block, thereby shortening the transforma time. The kinds of orthogonal transformation at 2 comprise Hadamard transformation, a cosine transformation and a Karhunen-Loeve transformation. These transformations have recently been expressed in a discrete manner using the cosine transformation. The later described discrete cosine transformation (DCT) is also often used.

The orthogonal transformation coded system shown in FIG. 1 takes account of the relation of a small region within a screen and performs an orthogonal transformation by treating the picture element in a small area as a train of the numerical value. The resulting transformation coefficient, corresponds to the component of the frequency and expresses respective components from low frequency to high frequency. The image signal generally has a large power of a low frequency component and a small power of a high frequency component. Thus, when the quantization is conducted, a large number of bits are applied to the low frequency component and a small number of bits are applied to the high frequency component, t hereby minimizing the amount of information to be transmitted.

Figure 2:
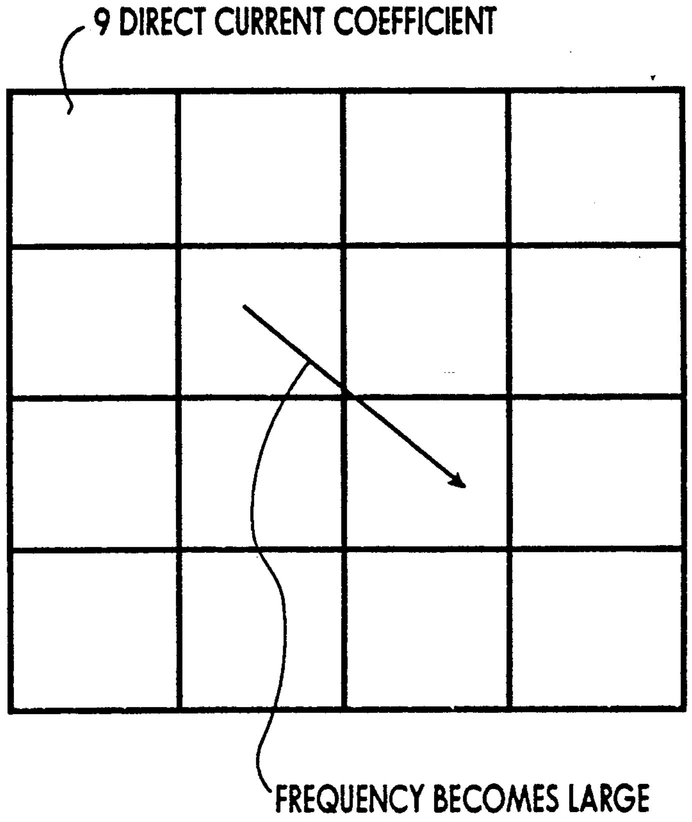

FIG. 2 shows a view of a transformation coefficient region after an orthogonal transformation is applied to image data within one block formed by a 4×4 picture element. In the transformation coefficient region, the region 9 on the uppermost left expresses a current component of the signal and the coefficient of the other region represents the alternative component. The alternative component corresponds to respective frequencies from low frequency to high frequency. The frequency increases in the lower right direction.

When a plurality of picture elements are coded as one block and are transmitted, the image data is transmitted in a packet format, with a fixed length of several bytes, to which a header corresponding to the destination information is attached, is transmitted on the transmission line, regardless of whether the coding system is intra-frame coding or the inter-frame coding and regardless of whether the transformation coefficient after the orthogonal transformation is coded or the image data itself is coded. The packet may be called a cell.

However, where a header error arises or the processing capability of the network is exceeded as the number of the cells abruptly increases, the cell is lost in the network, i.e., the loss of the cell occurs. In this case, the image deteriorates in the part which receives the image data. In particular, there is a problem that the quality of picture greatly deteriorates where the differences in the direct current component and the low frequency component becomes large between the blocks within the currently transmitted frame and the corresponding block of the previous frame. There is also the problem that the pattern of the previous frame of the lost cell remains as it is when data of the corresponding block in the previous frame of the present frame is used as the image data of the block corresponding to the packet which was lost of.

Figures 3A, 3B, 3C:
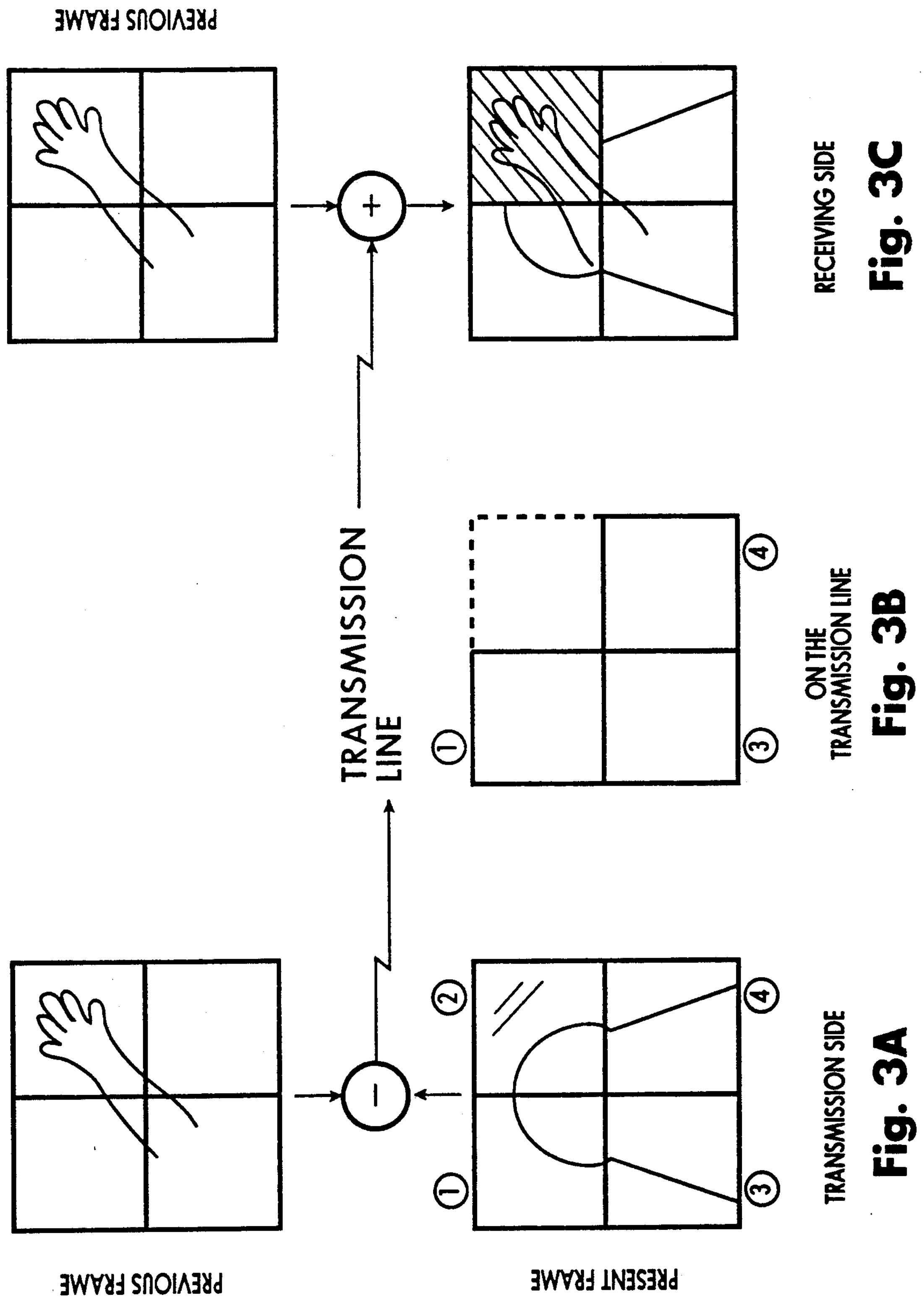

FIGS. 3A to 3B show explanatory views of such a problem. The intra-frame difference between the present frame and the previous frame is obtained on the transmission side as shown in FIG. 3A. The data is divided into blocks 1 to 4 for transmission and the data 2 is lost on the transmission line as shown in FIG. 3B. Then the data of the previous frame and the data of the received frame is summed and output on the receiving side, as shown in FIG. 3C. The "hand" image which is the data of the previous frame, is output to block 2.

SUMMARY OF THE INVENTION

A first object of the present invention is to prevent deterioration of image quality by transmitting a signal designating a method of compensating for loss from the transmission side to the receiving side where data is lost, in accordance with a coding system utilized for the image data transmission system, and by performing a compensation of a loss of the data in accordance with the instruction from the transmission side when loss of the data is detected on the receiving side.

A second object of the present invention is to further decrease deterioration of picture quality by transmitting replacement information to be used to compensate for the loss in addition to a signal designating the method of compensation for loss on the receiving side, and to send the replacement information from the transmission side of the image data transmission system and to perform a compensation of the loss of the data by using the transmitted replacement information in accordance with the designated method of compensation for loss on the receiving side.

A third object of the present invention is to transmit only coded data from the transmission side of the image data transmission system and to perform a compensation of the data loss in accordance with the method for compensating the data loss predetermined when data loss is detected on the receiving side.

A feature of the present invention resides in an image data transmission system for coding the input image data a plurality of picture element as the block and for transmitting them in units of packets or cell, comprising means for outputting signal designating the loss compensation method provided on the transmission side. image data a transmission system for outputting signal designating the compensation method of the loss data on the receiving side where the data of the block being currently coded is lost during the transmission, loss detecting means for provided on the receiving side of the image data transmission system for detecting the deposal of packet or cell, and loss compensation means for compensating the data of the block which can not be decoded due to the loss, using the loss compensation method designated by the transmission side when the loss is detected.

A BRIEF DESCRIPTION OF THE DRAWINGS

Figure 4A:
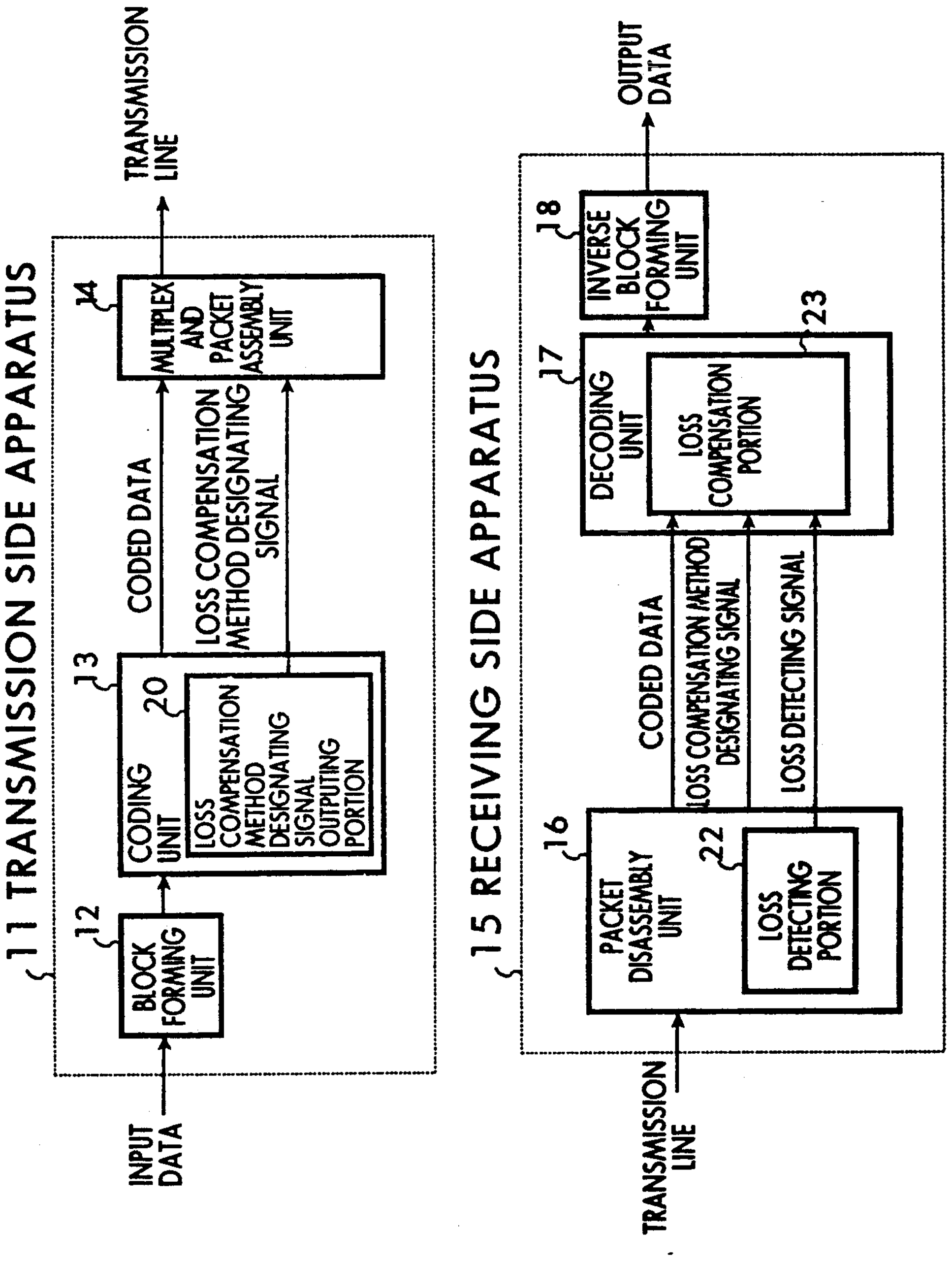
Figure 4B:
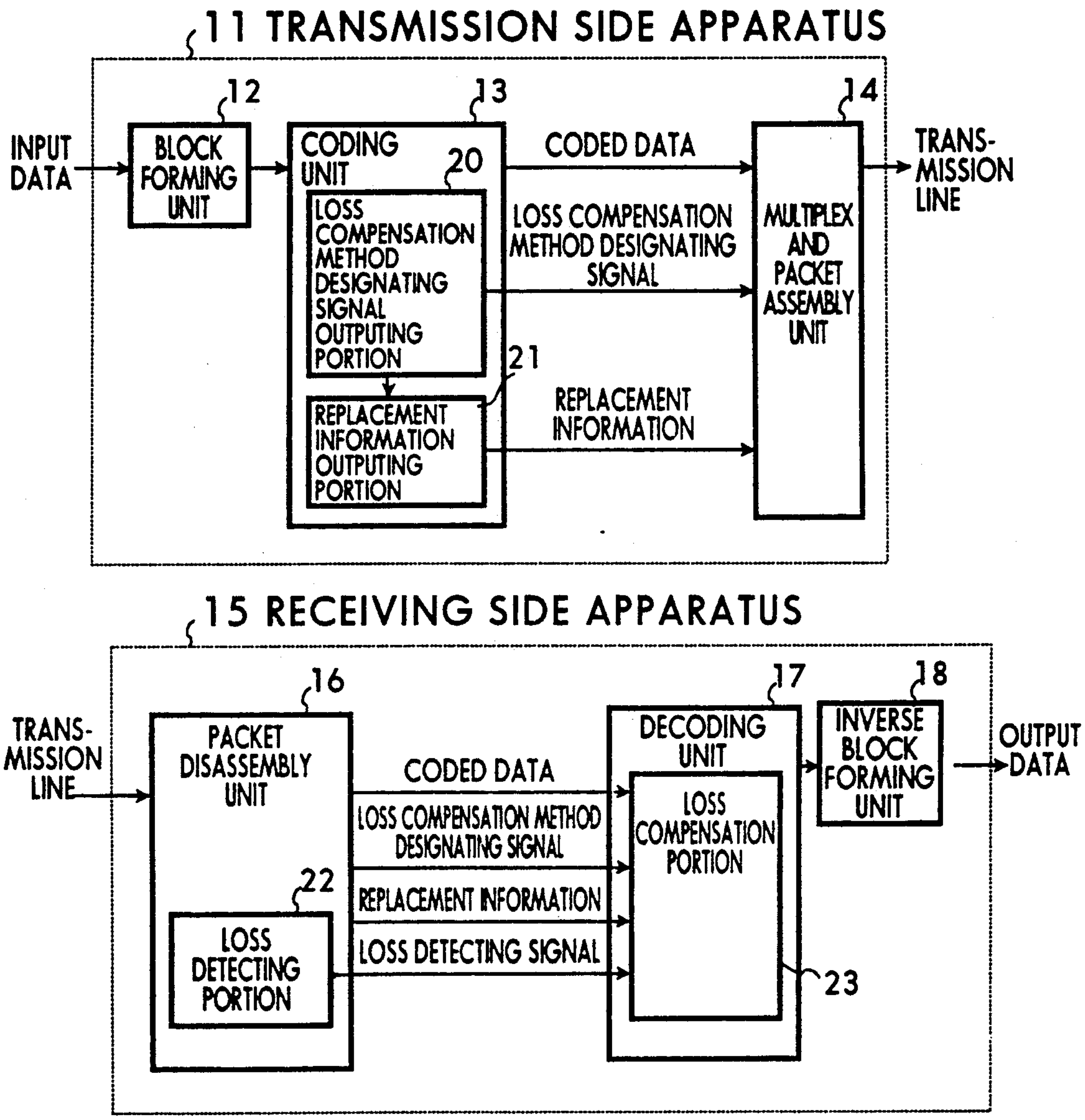
Figure 4C:
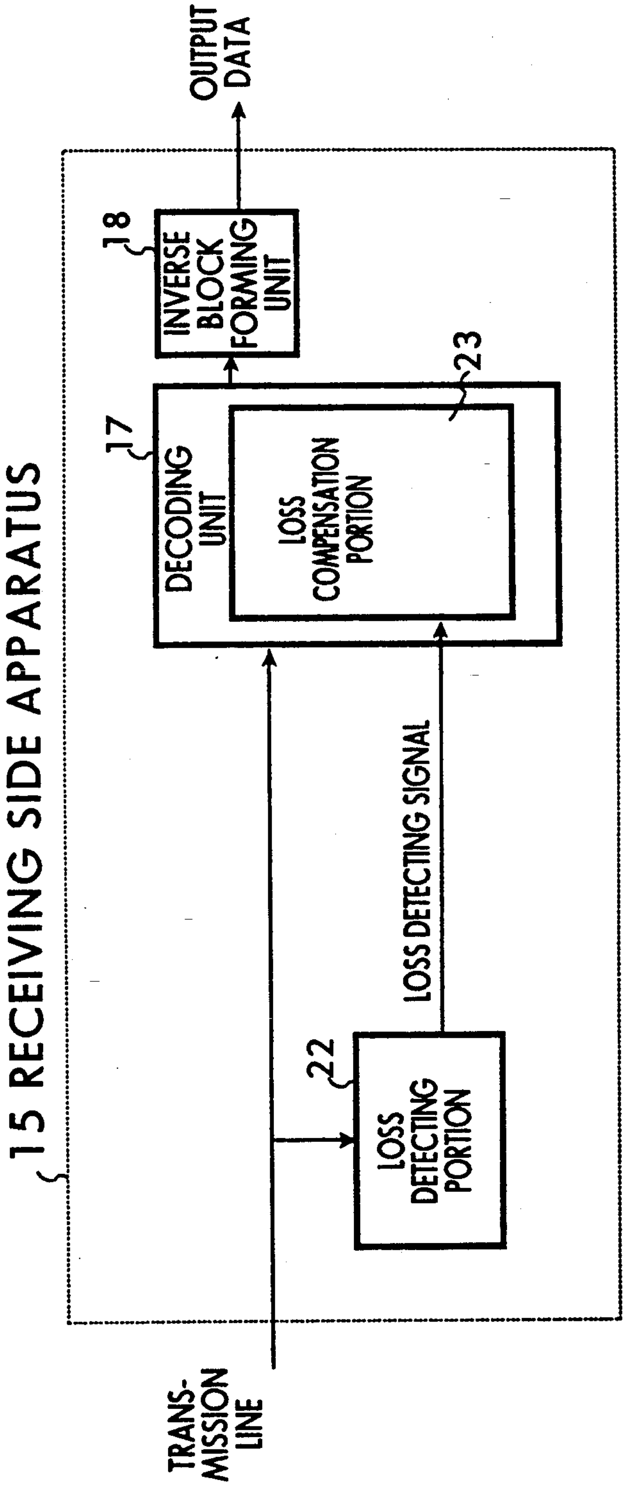
Figure 5:
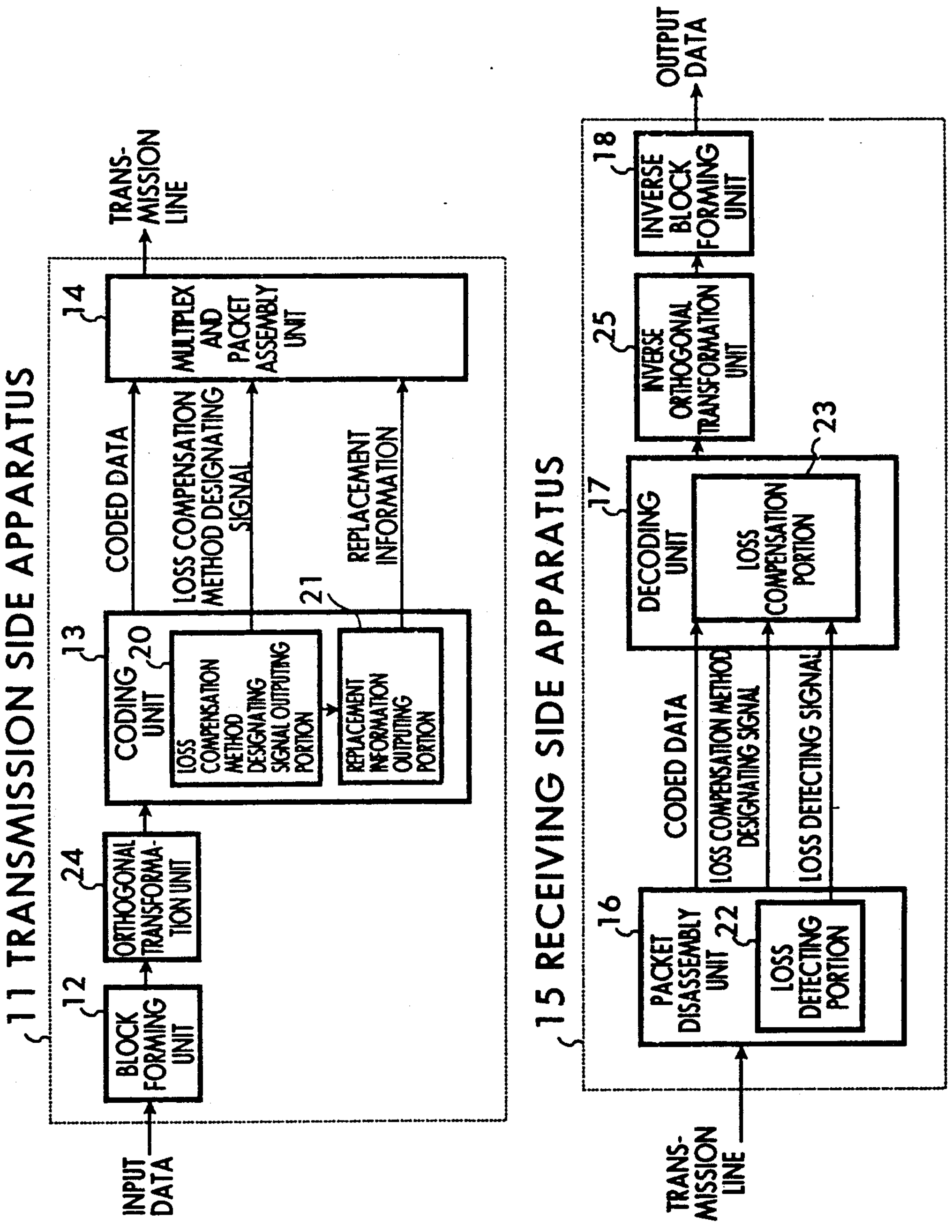
Figure 6A:
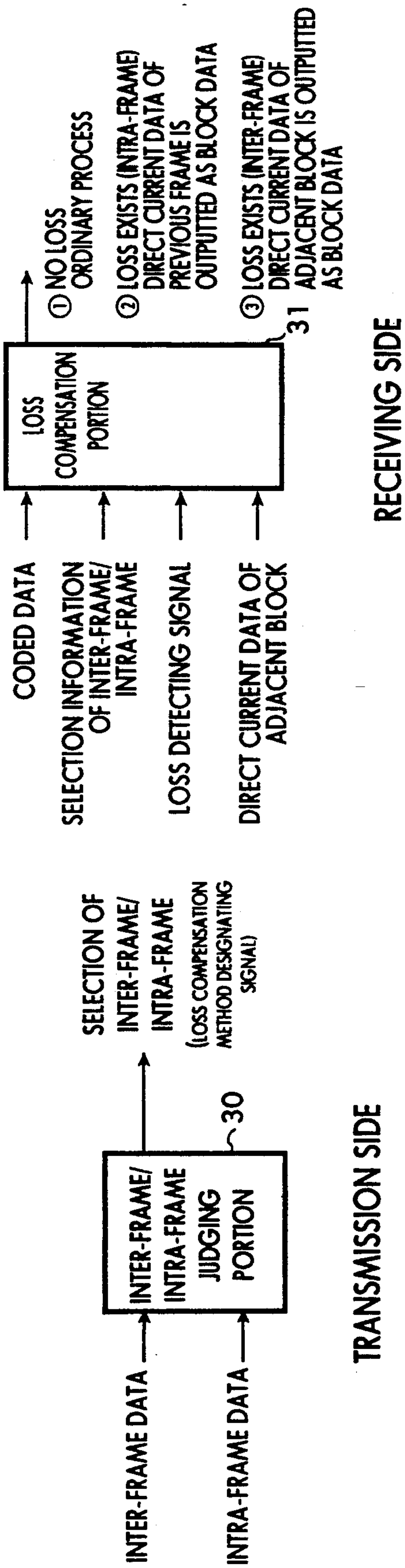
Figure 6B:
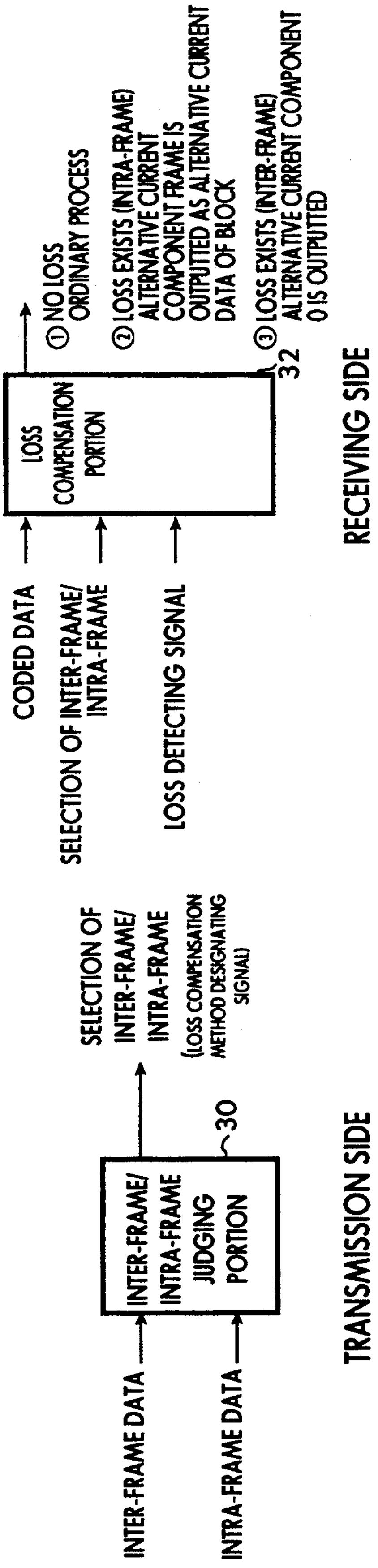
Figure 6C:
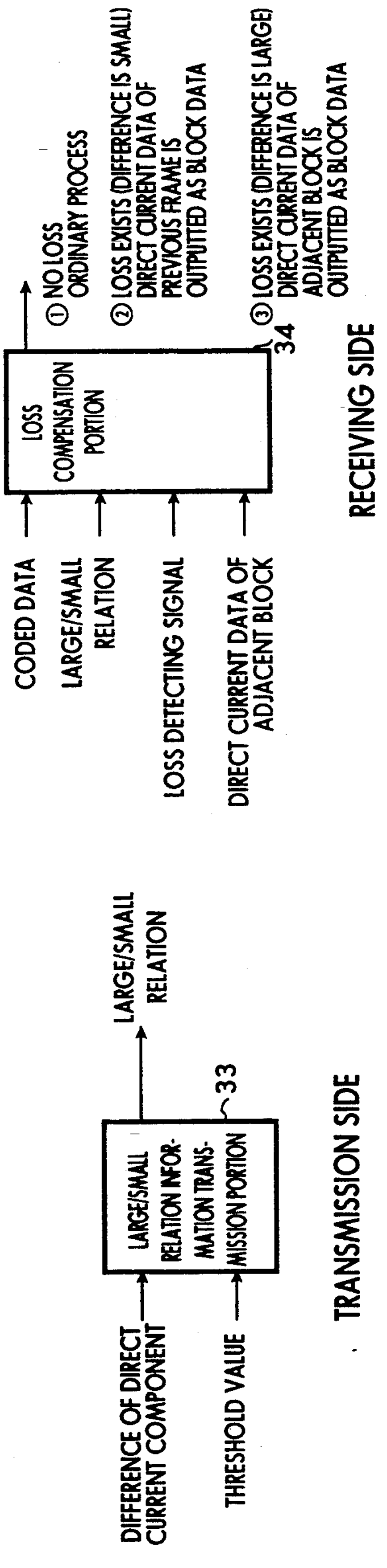
Figure 6D:
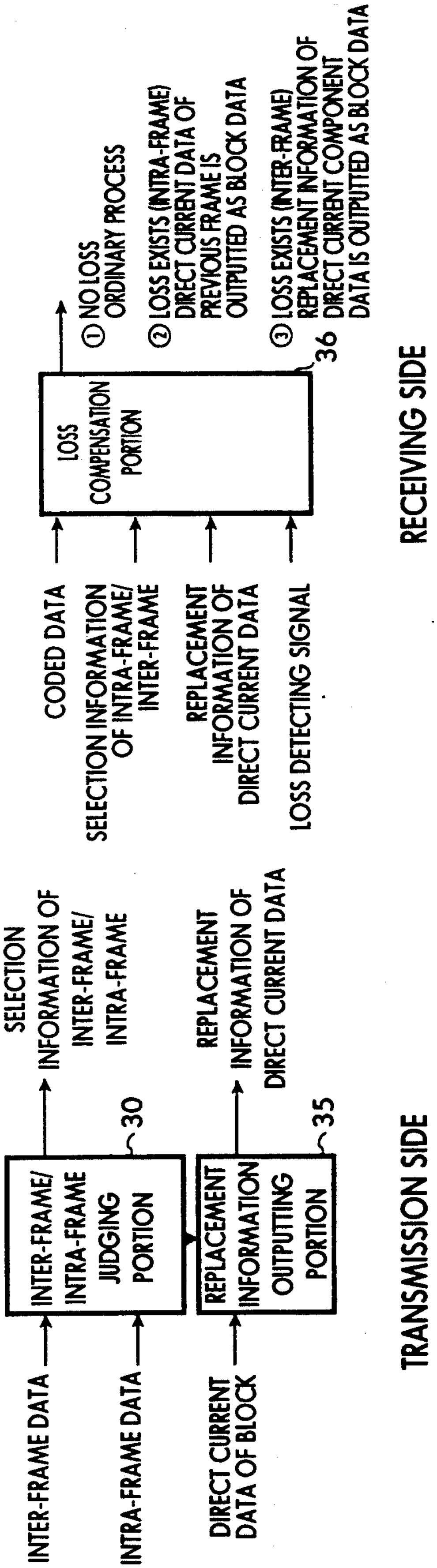
Figure 6E:
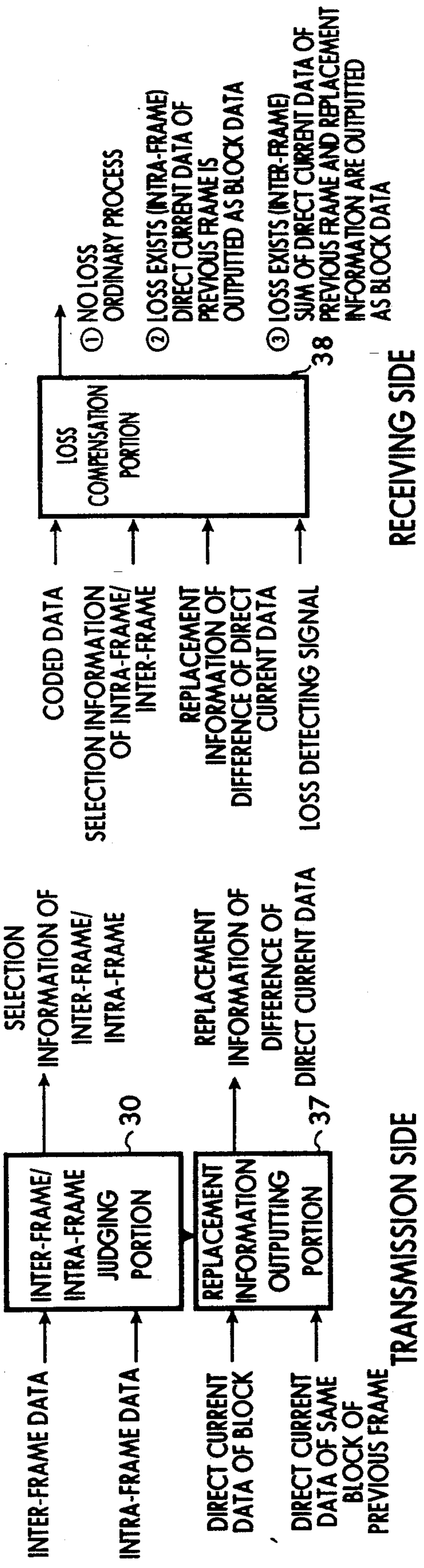
Figure 6F:
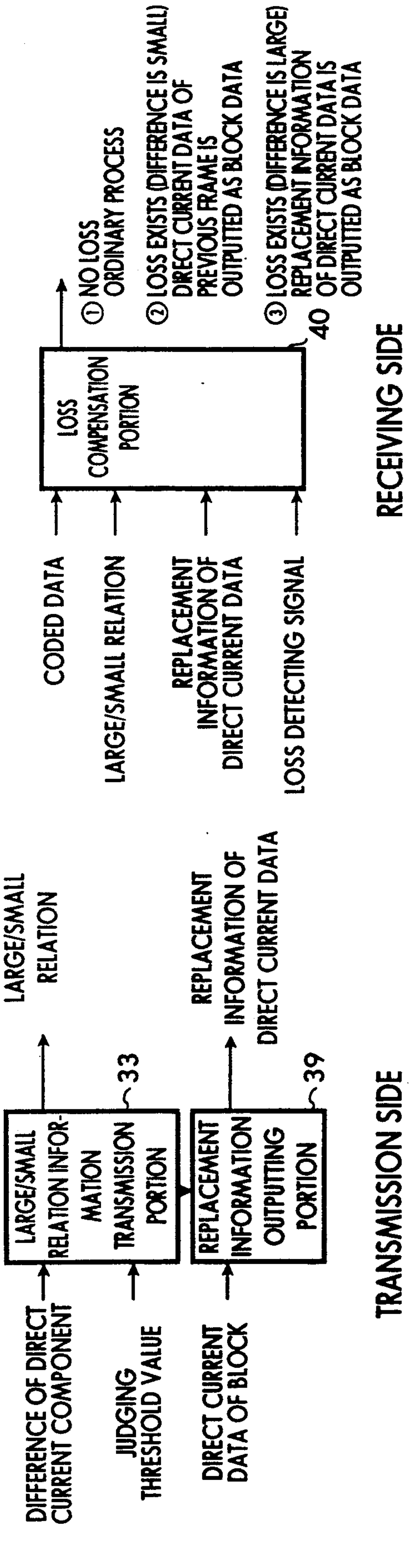
Figure 6G:
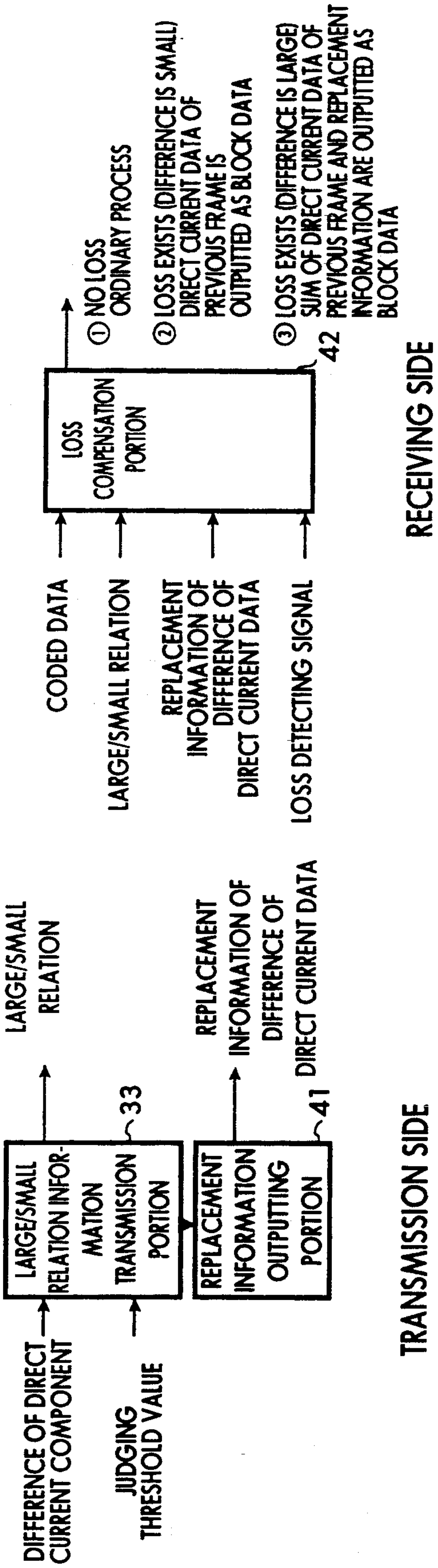
Figure 6H:
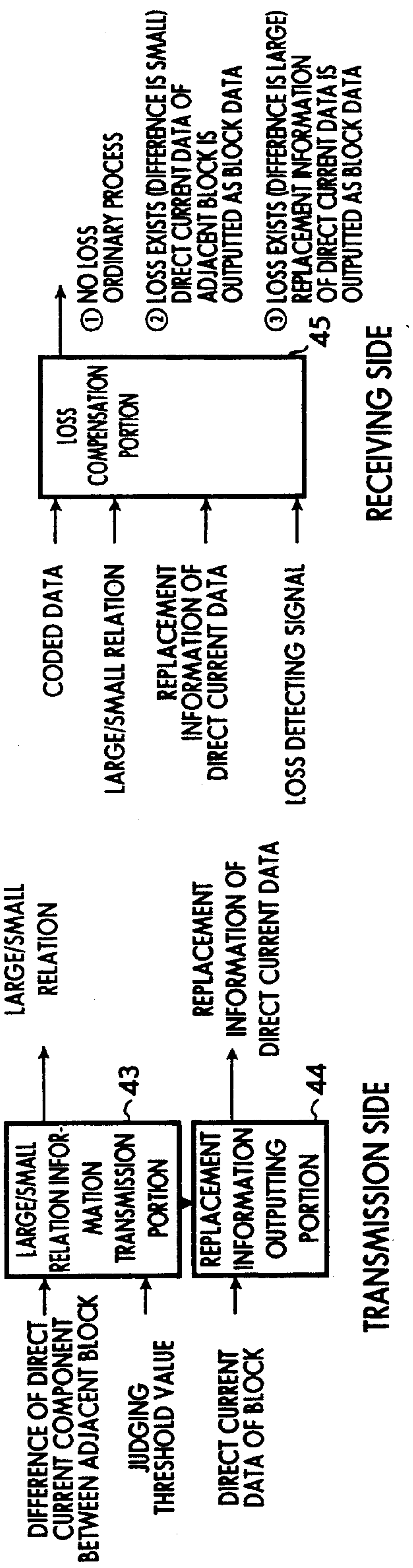
Figure 6I:
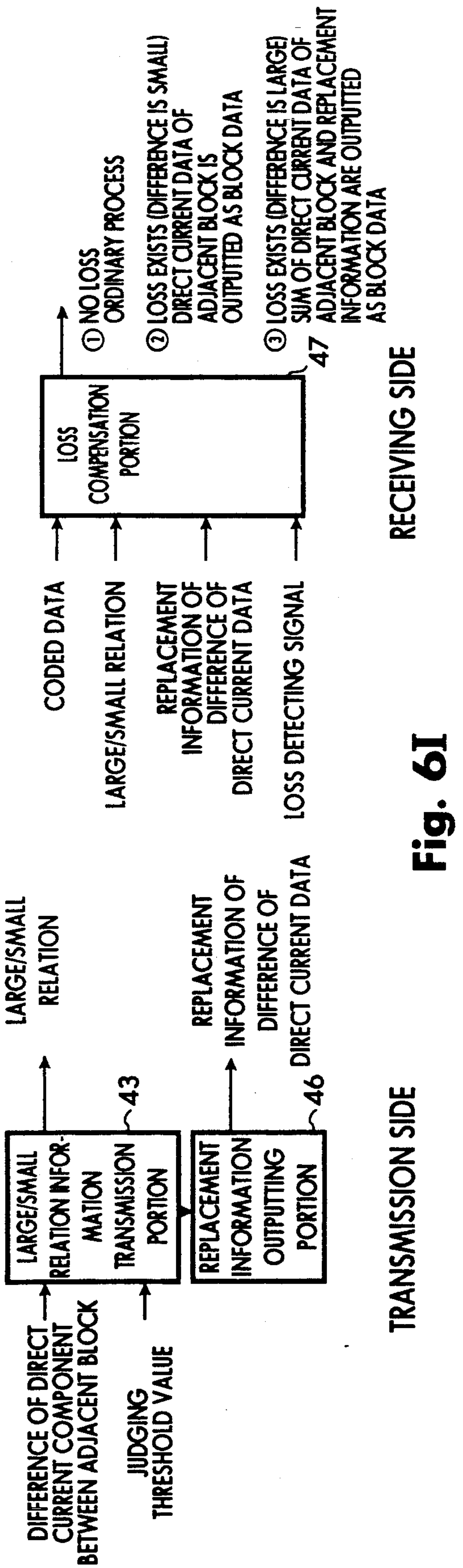
Figure 6J:
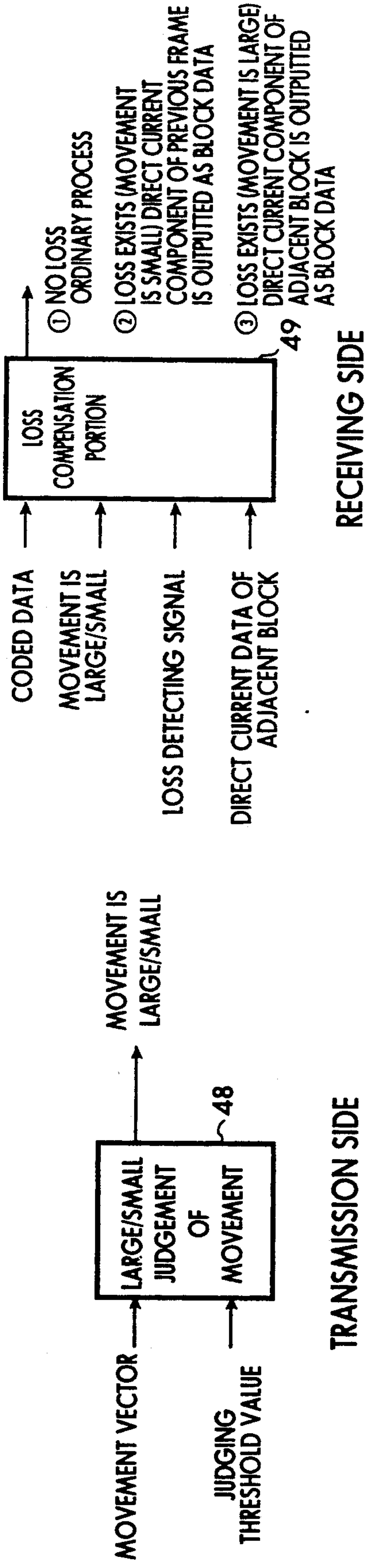
Figure 6K:
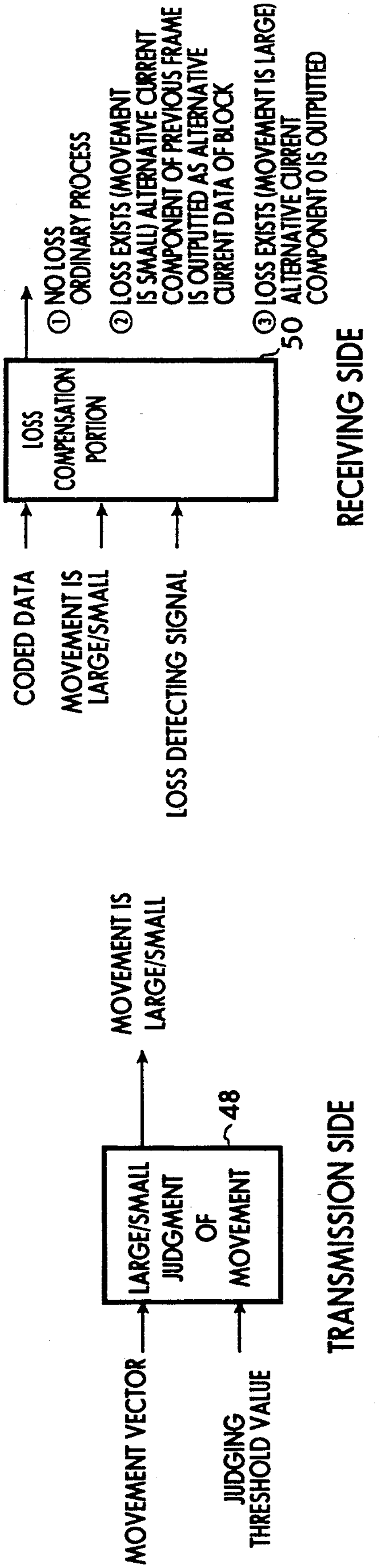
Figure 6L:
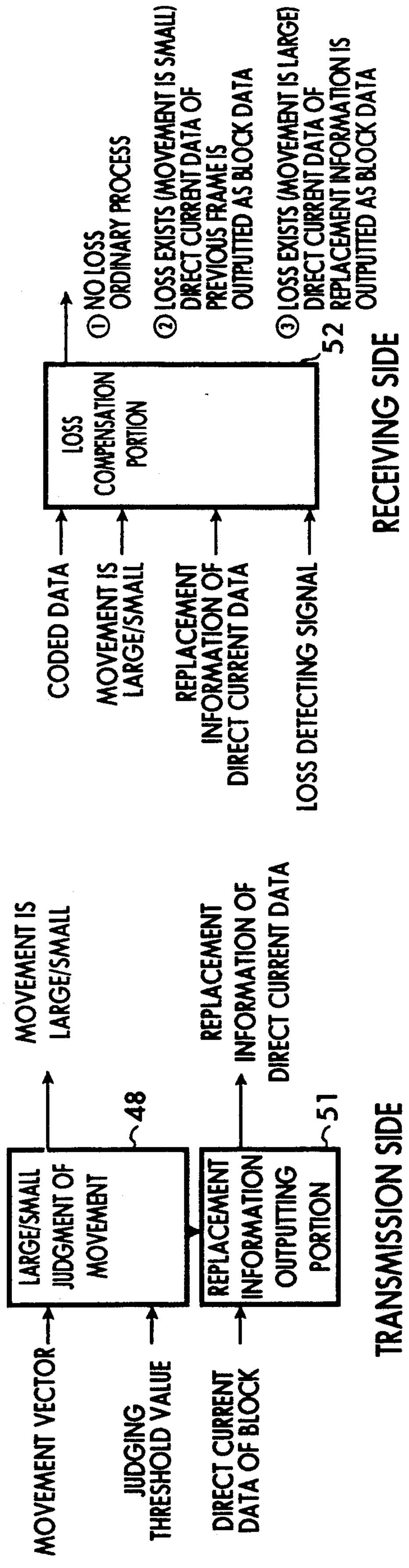
Figure 6M:
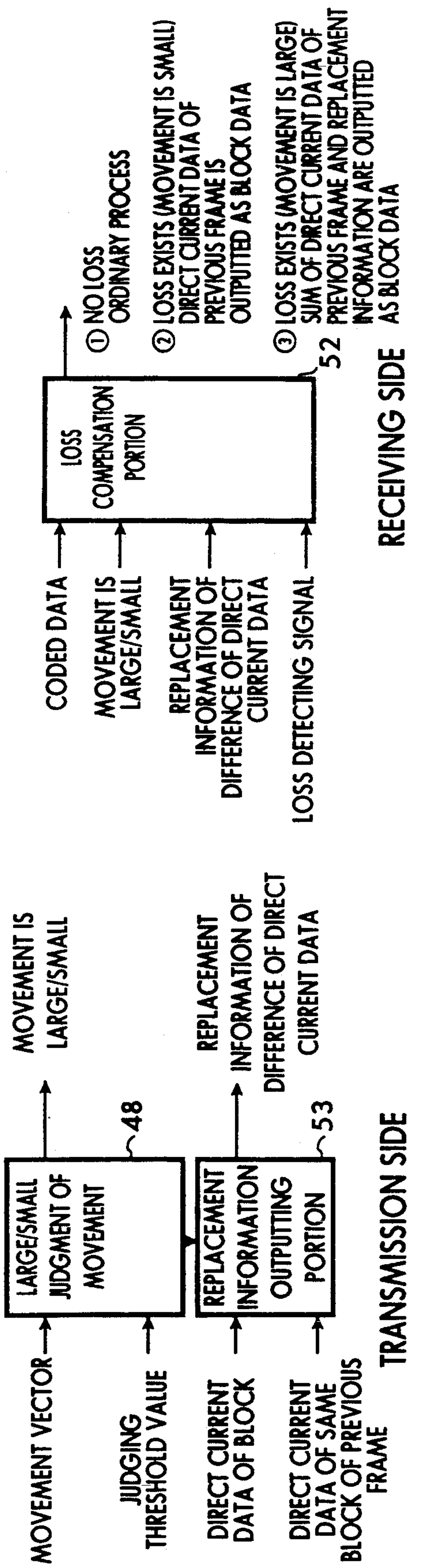
Figure 6N:
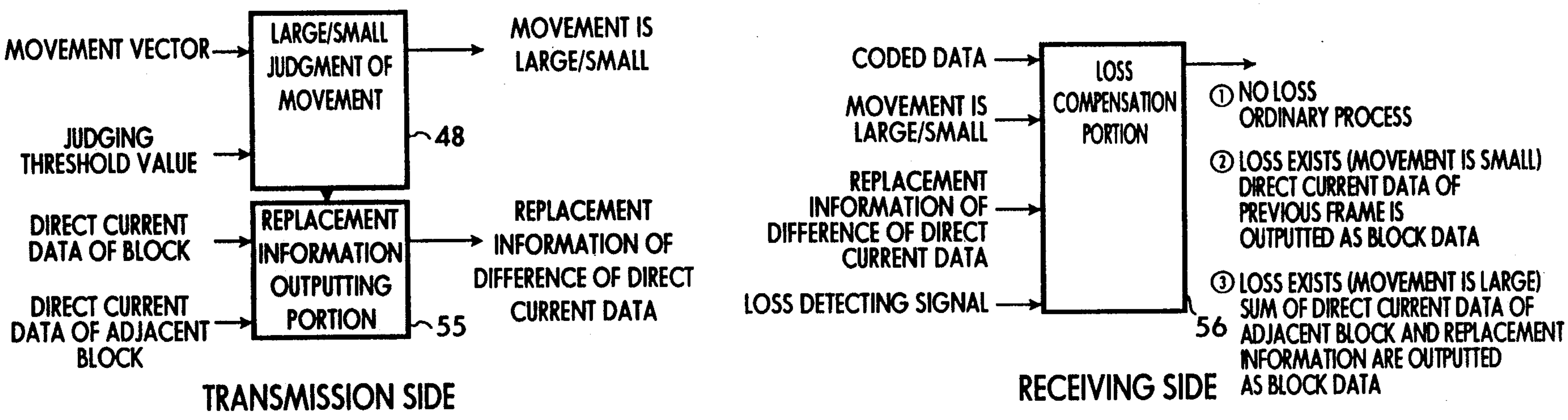
Figure 60:
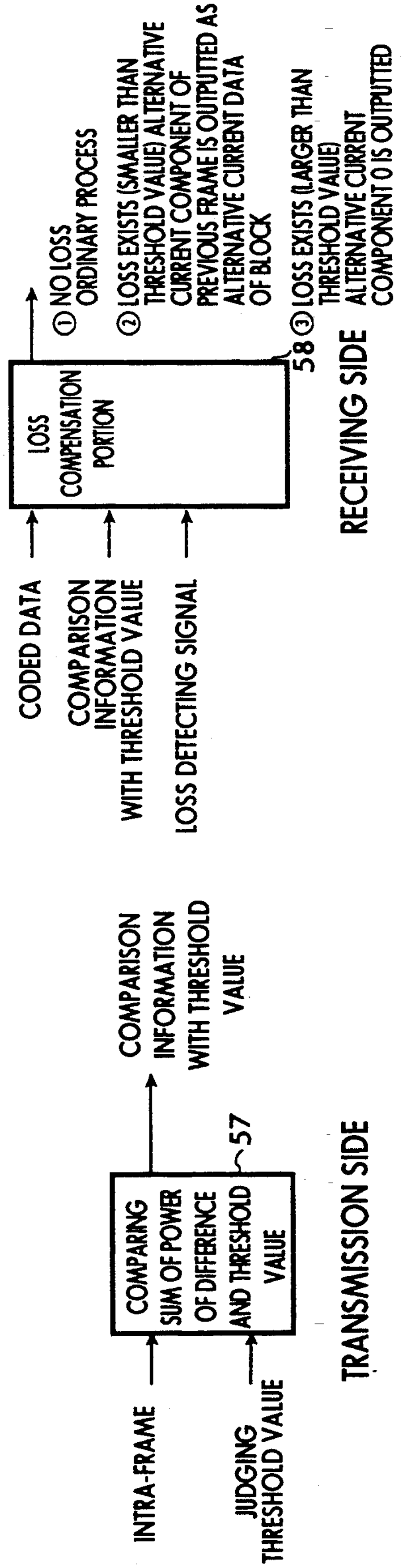
Figure 6P:
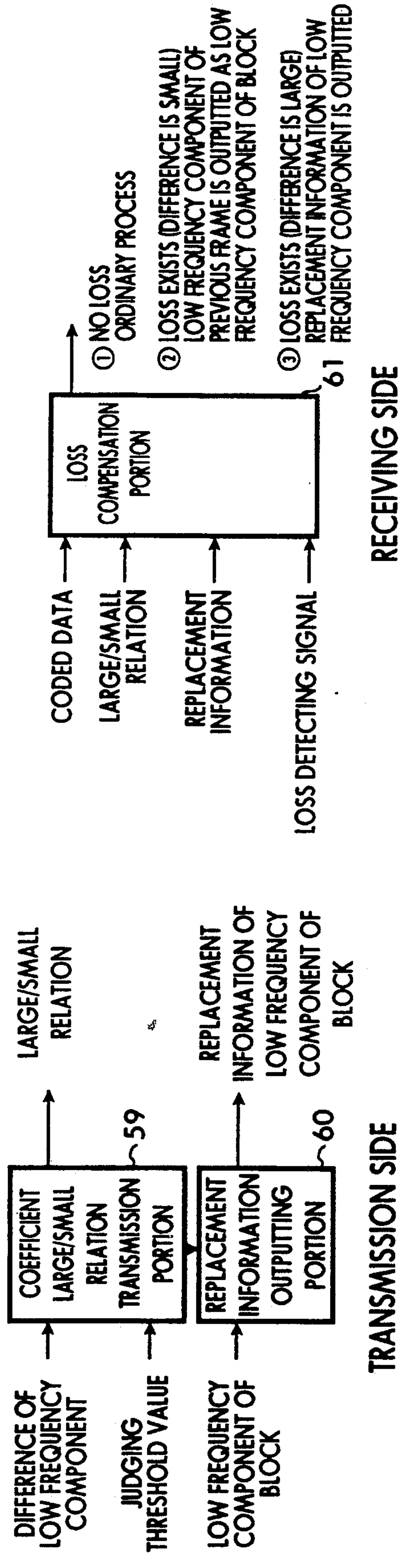
Figure 6Q:
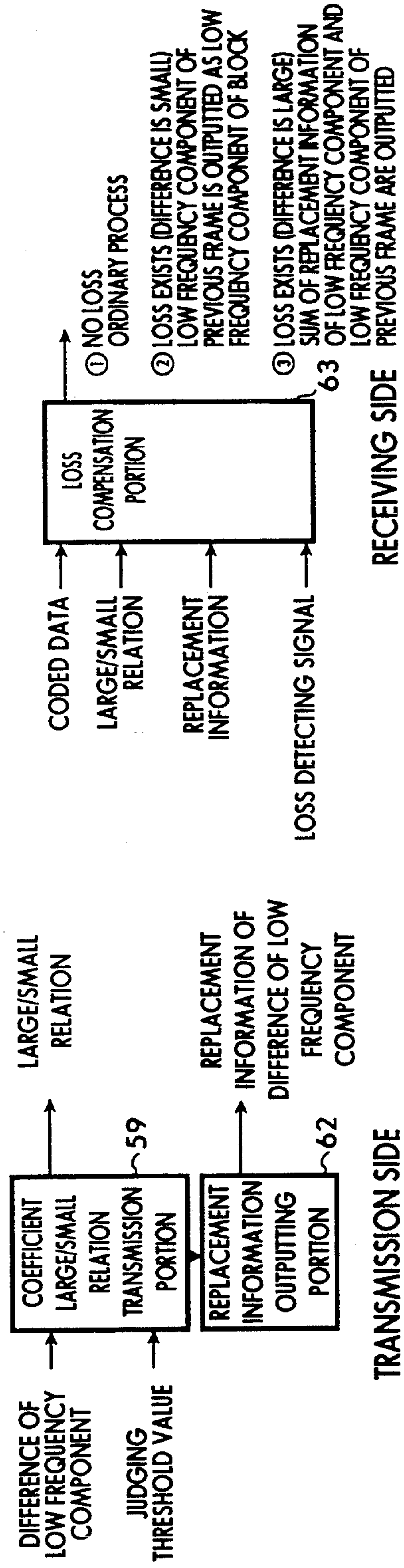
Figure 6R:
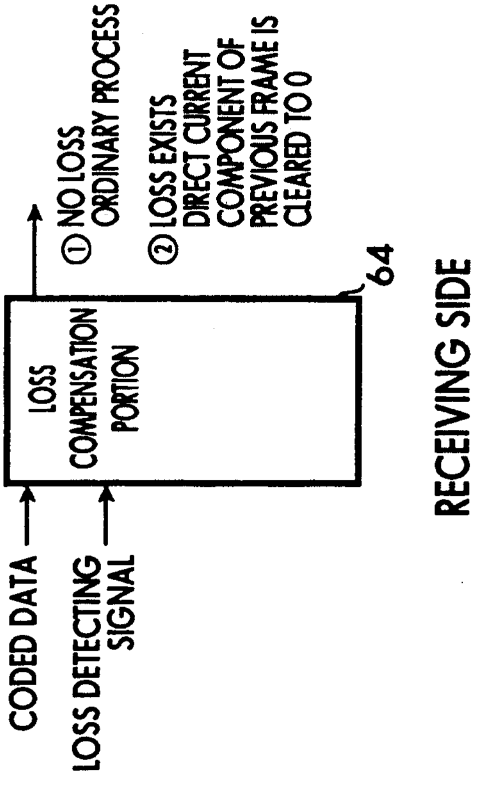
Figure 6S:
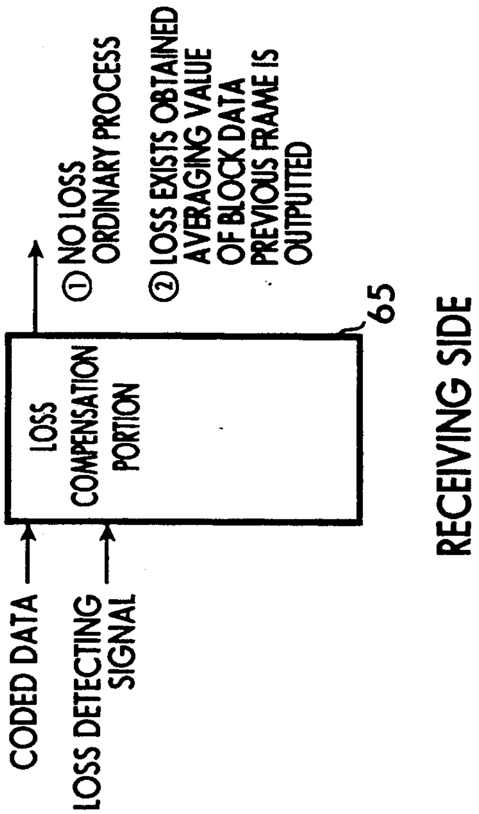
Figure 7A:
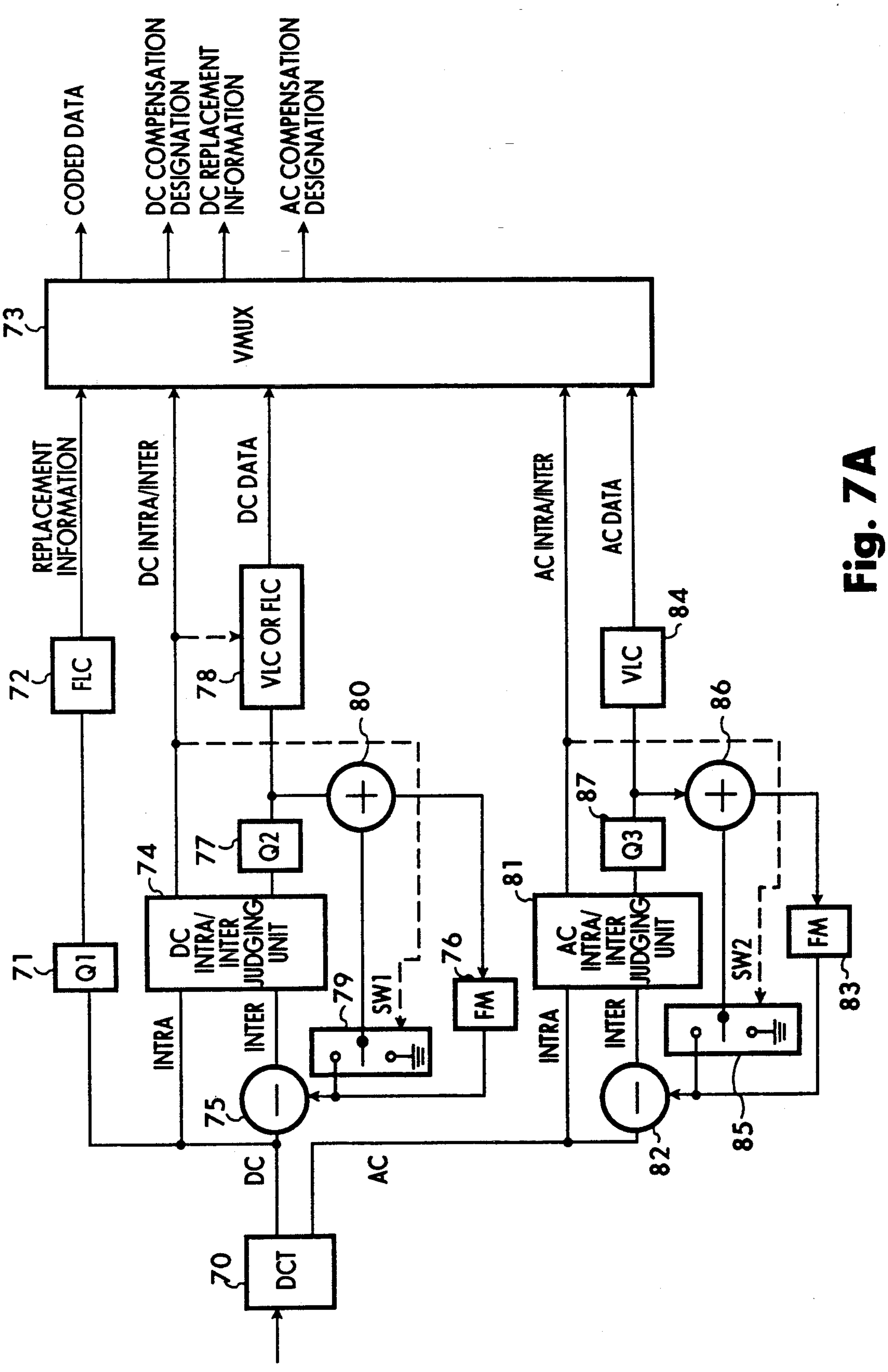
Figure 7B:
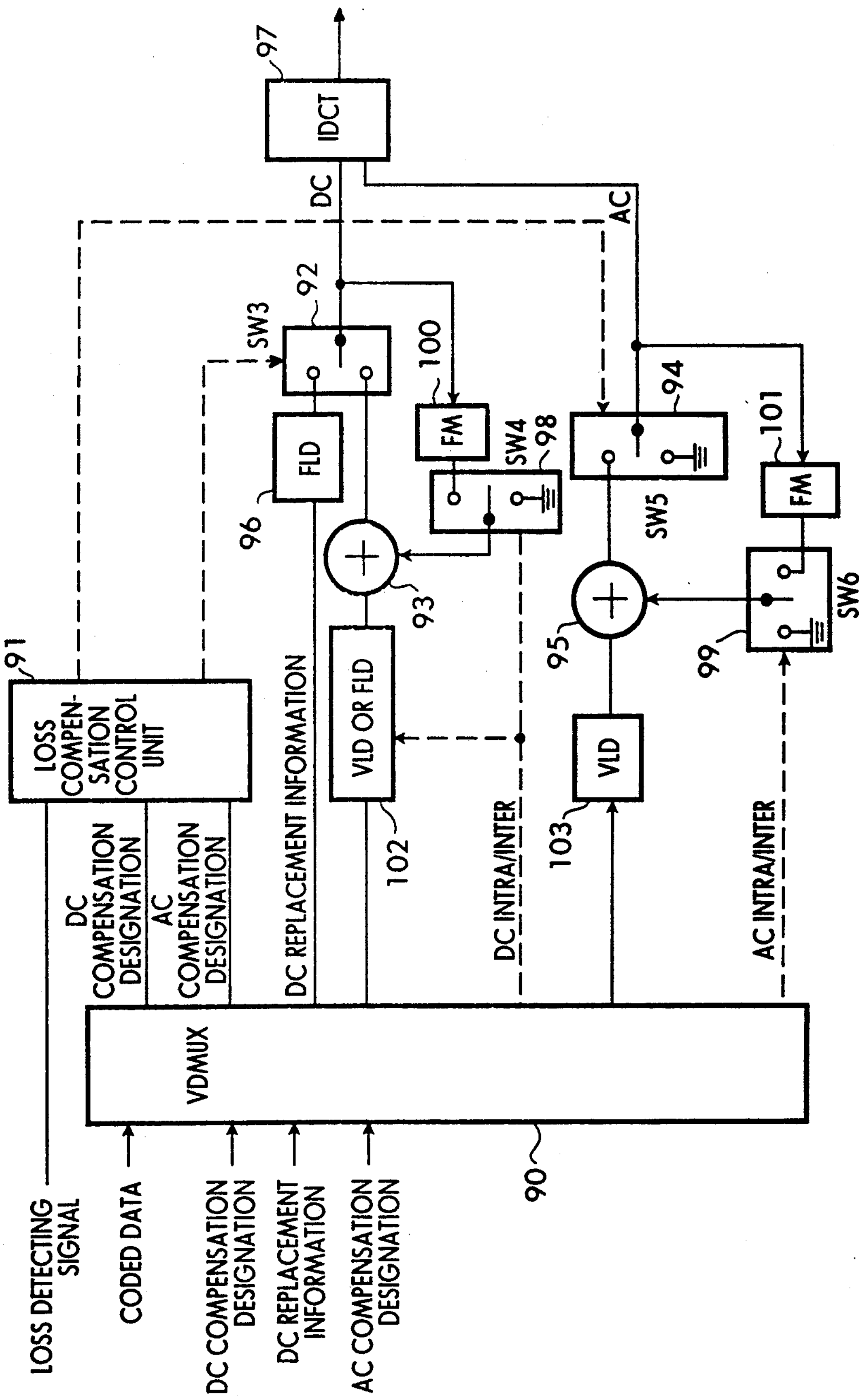
Figure 8A:
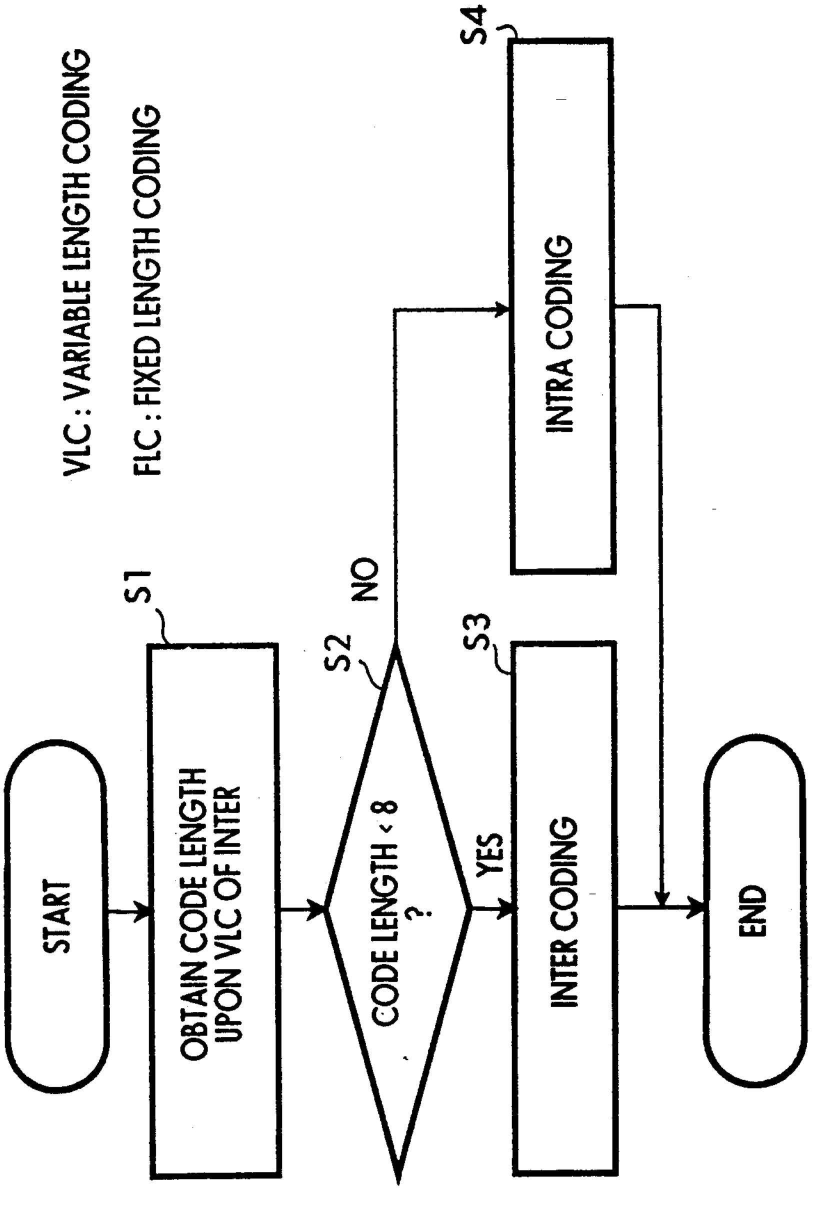
Figure 8B:
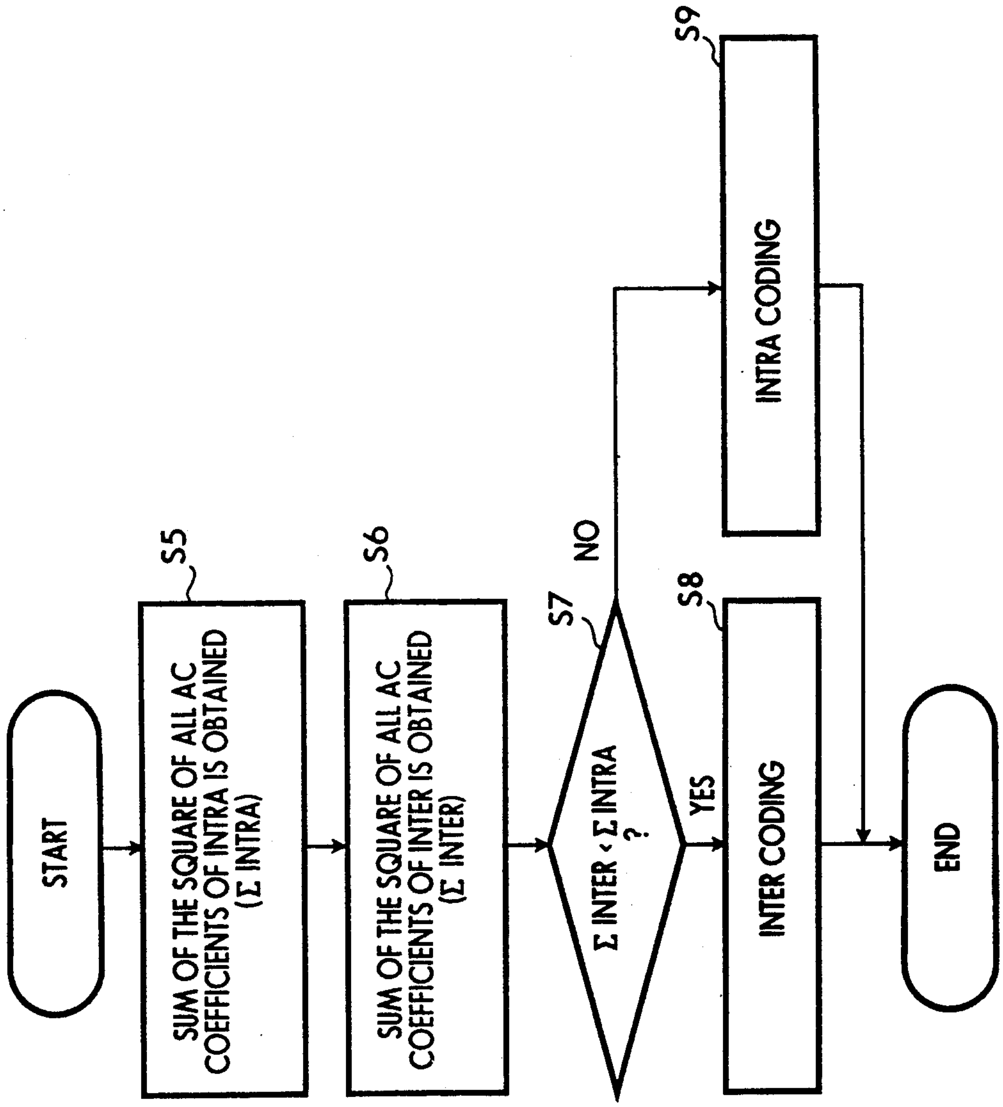
Figure 8C:
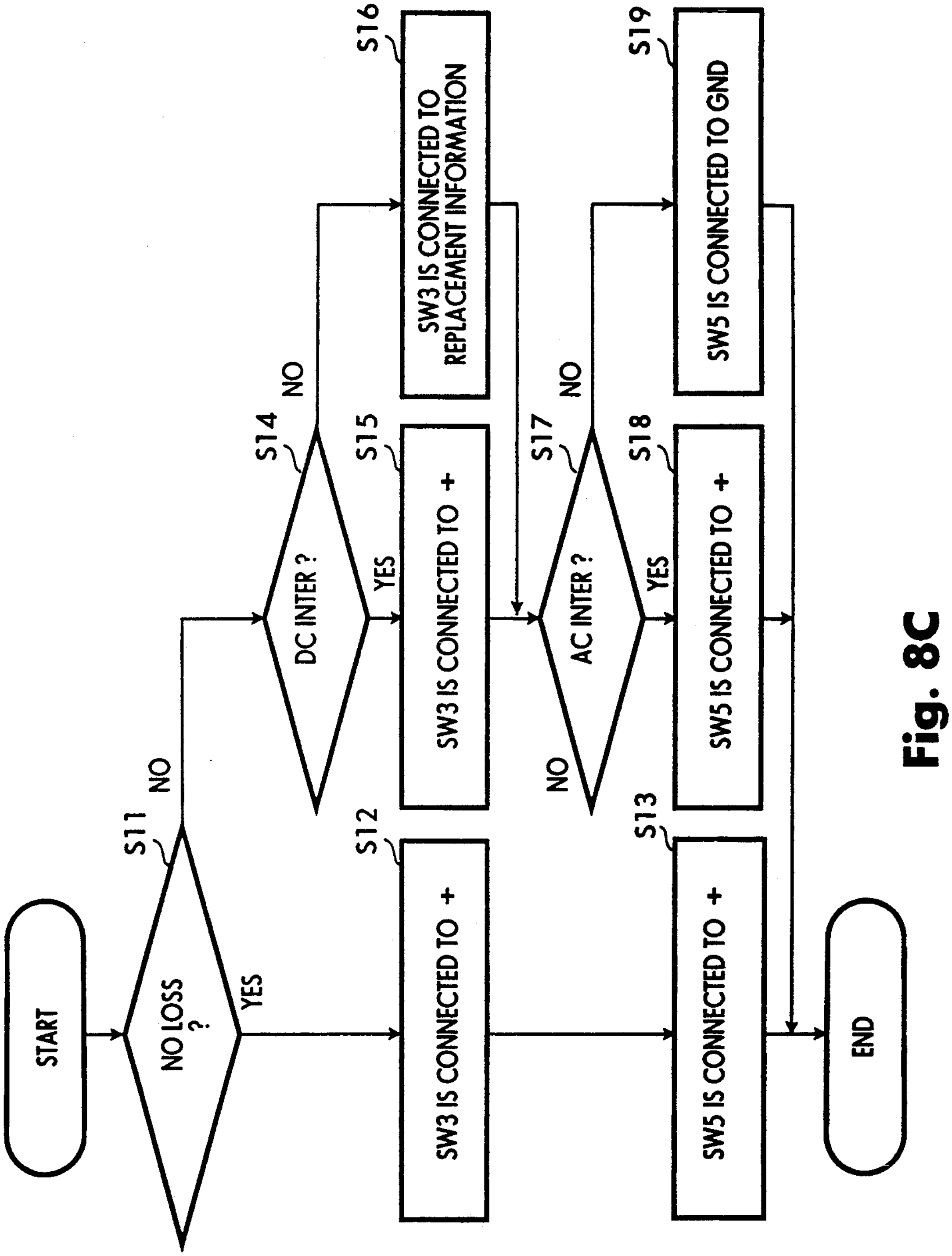
Figure 9A:
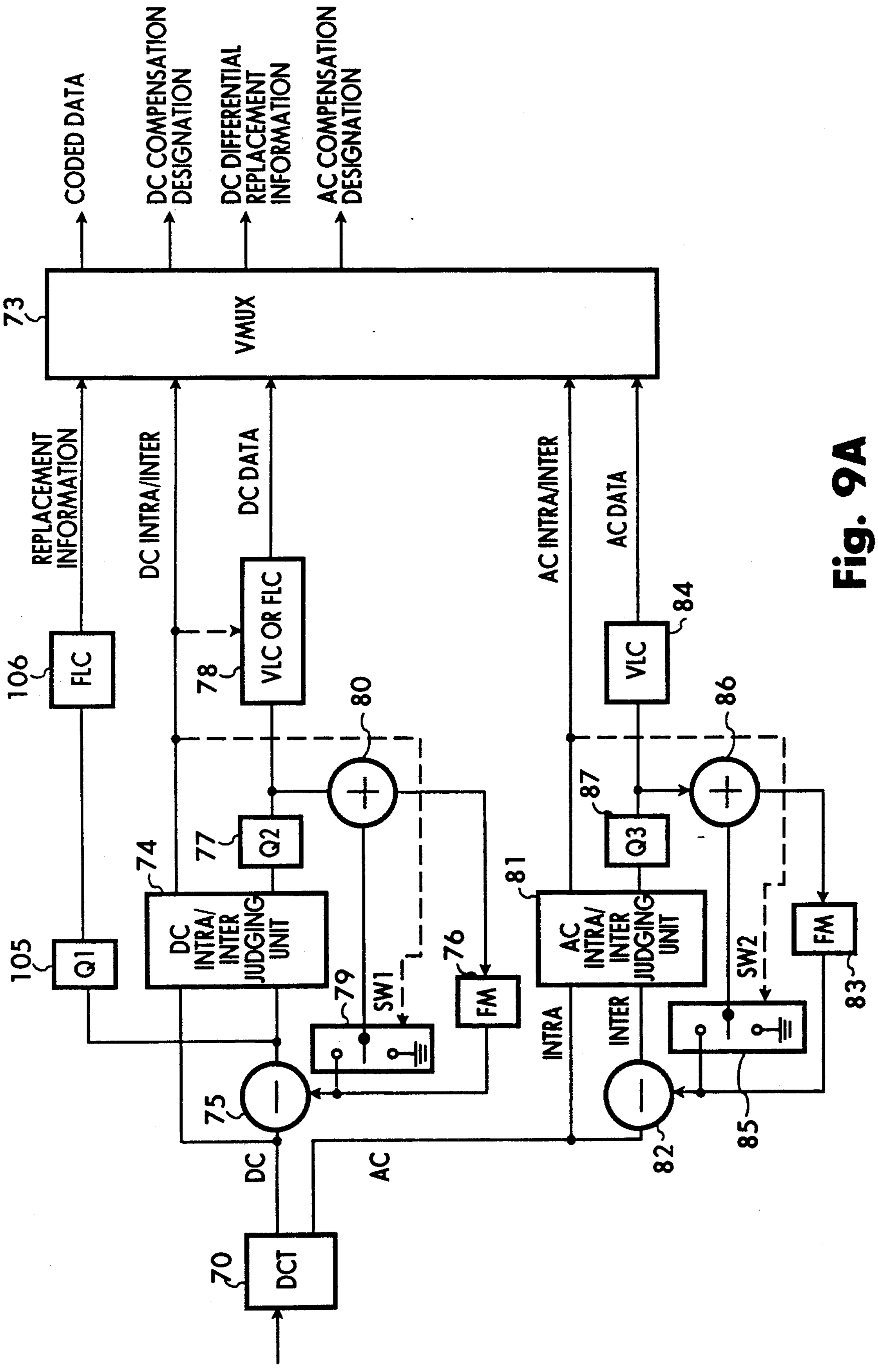
Figure 9B:
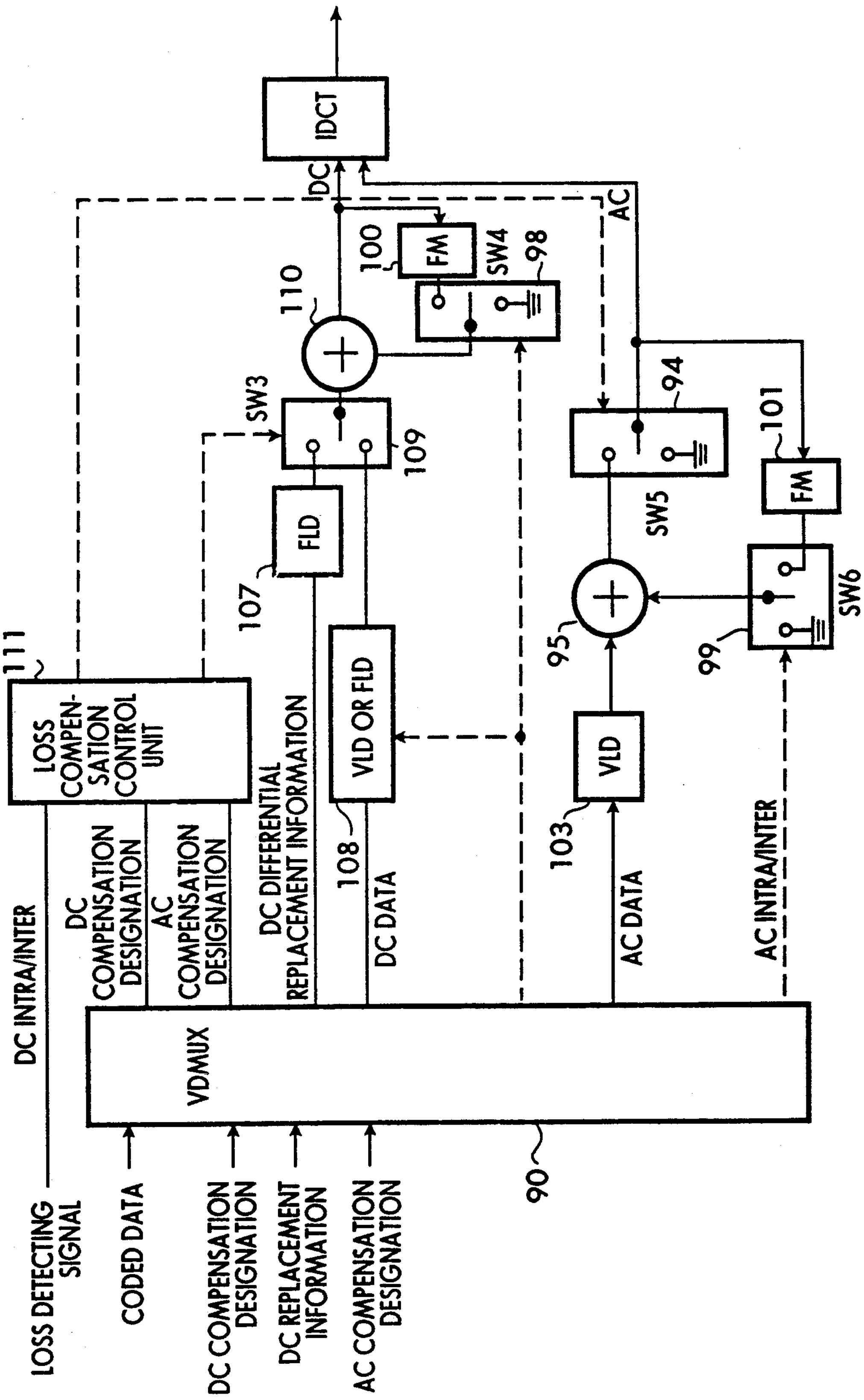
Figure 10:
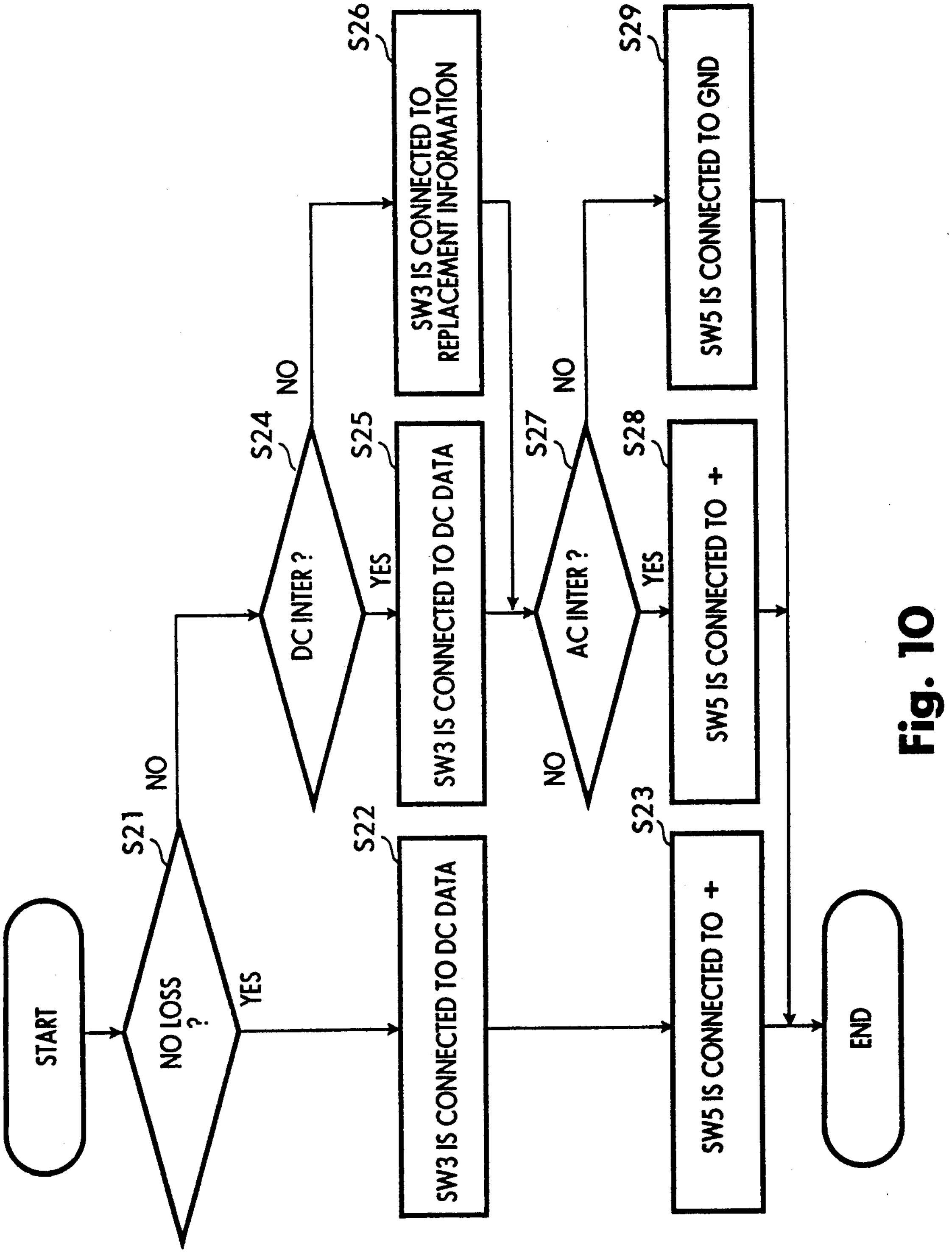
Figure 11A:
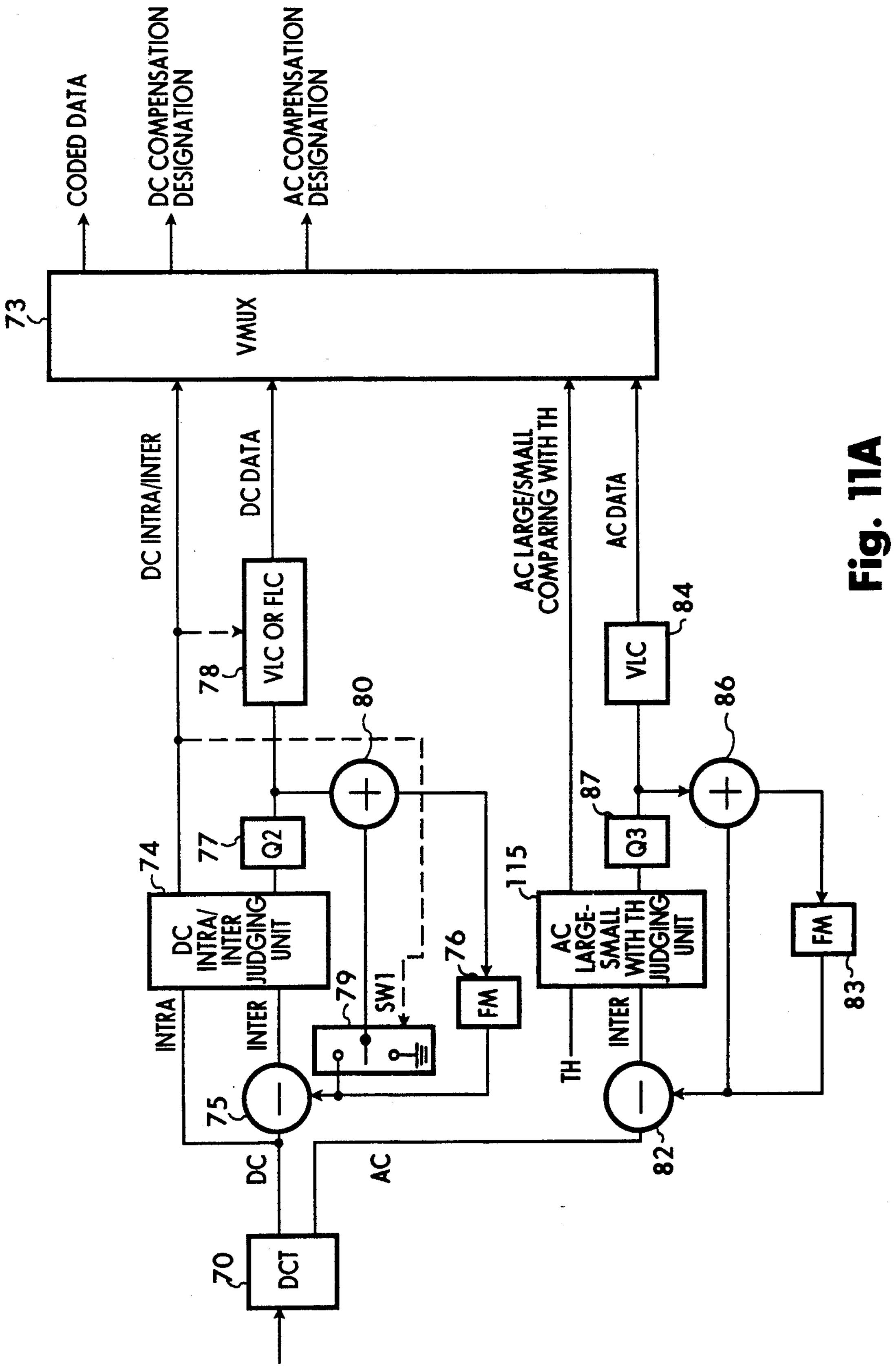
Figure 11B:
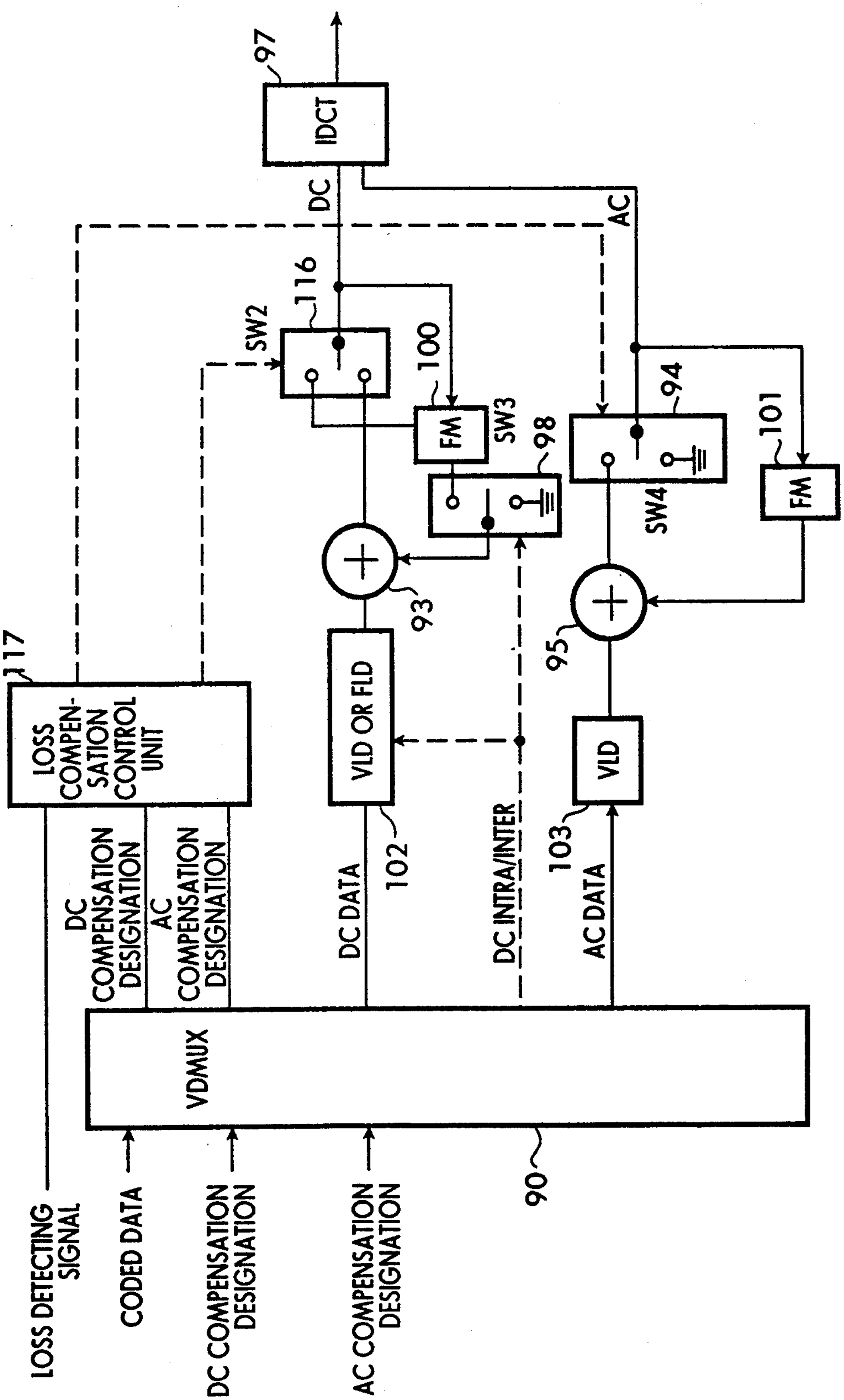
Figure 12A:
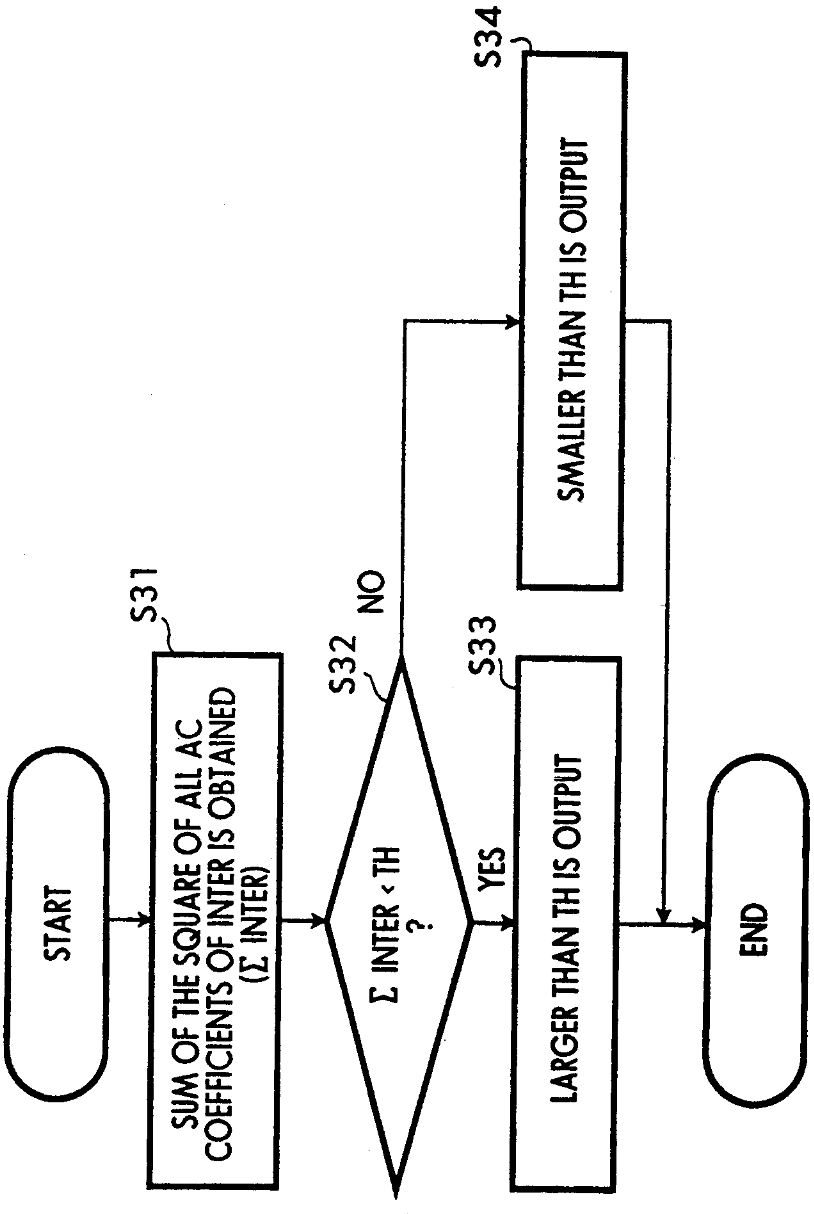
Figure 12B:
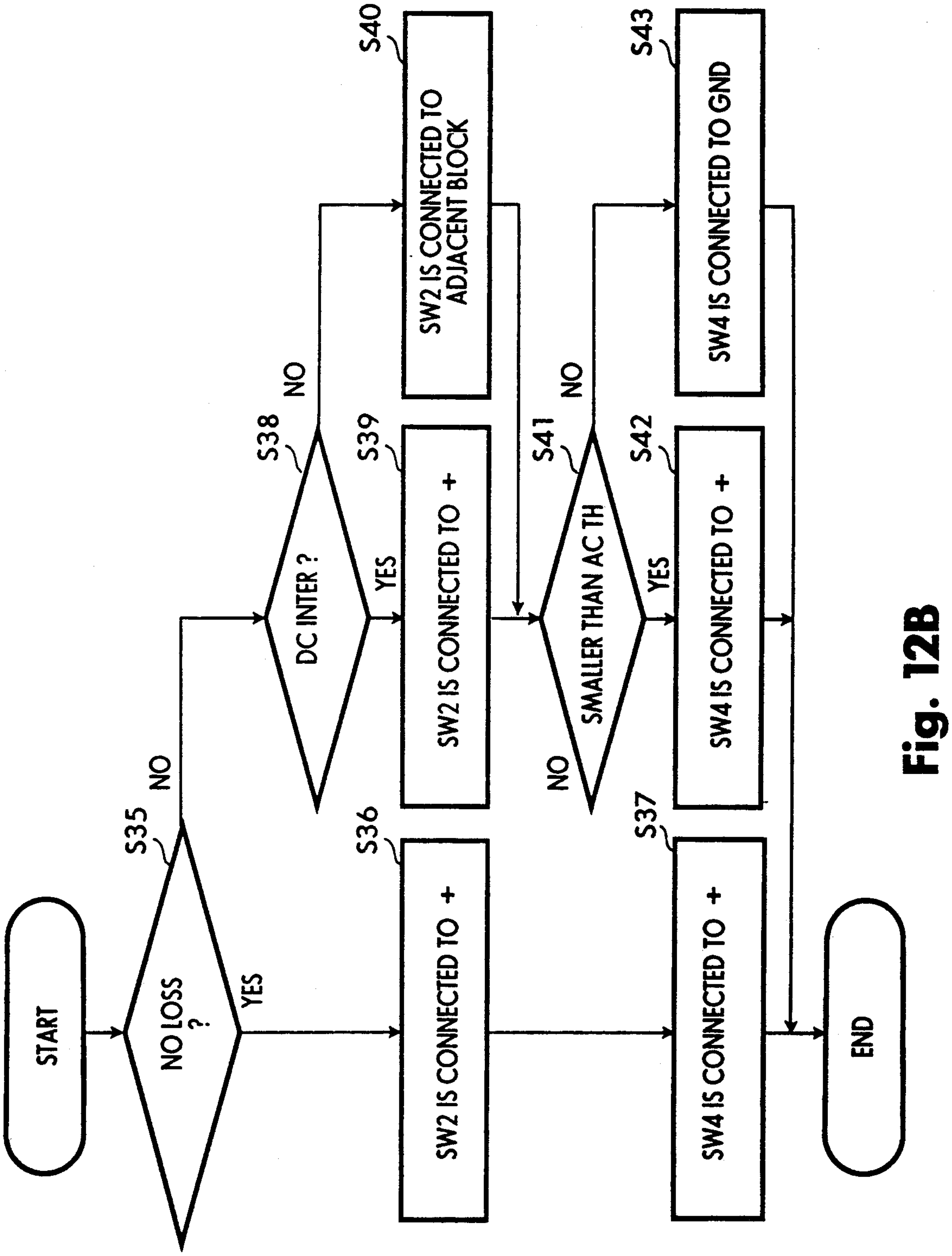
Figure 13A:
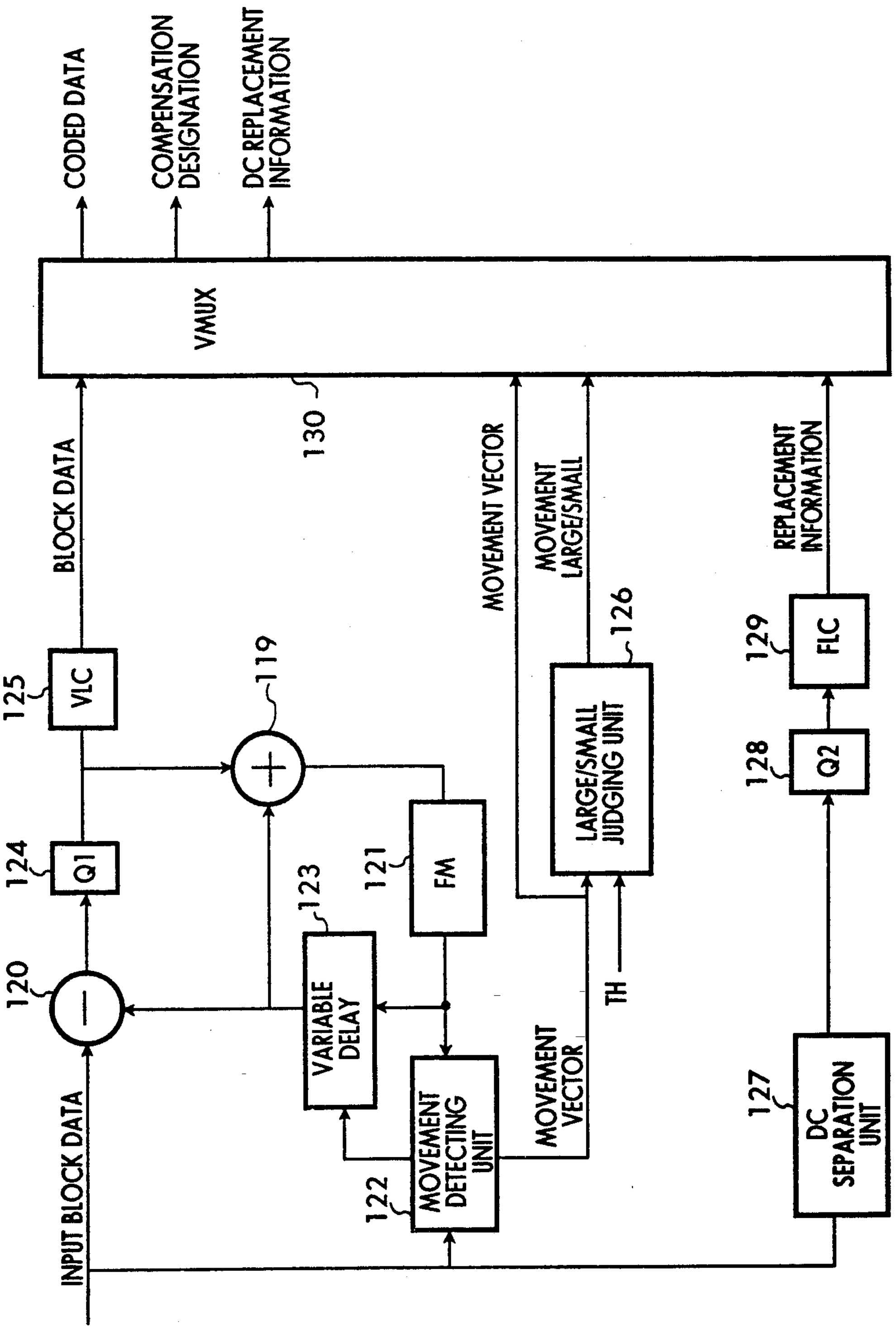
Figure 13B:
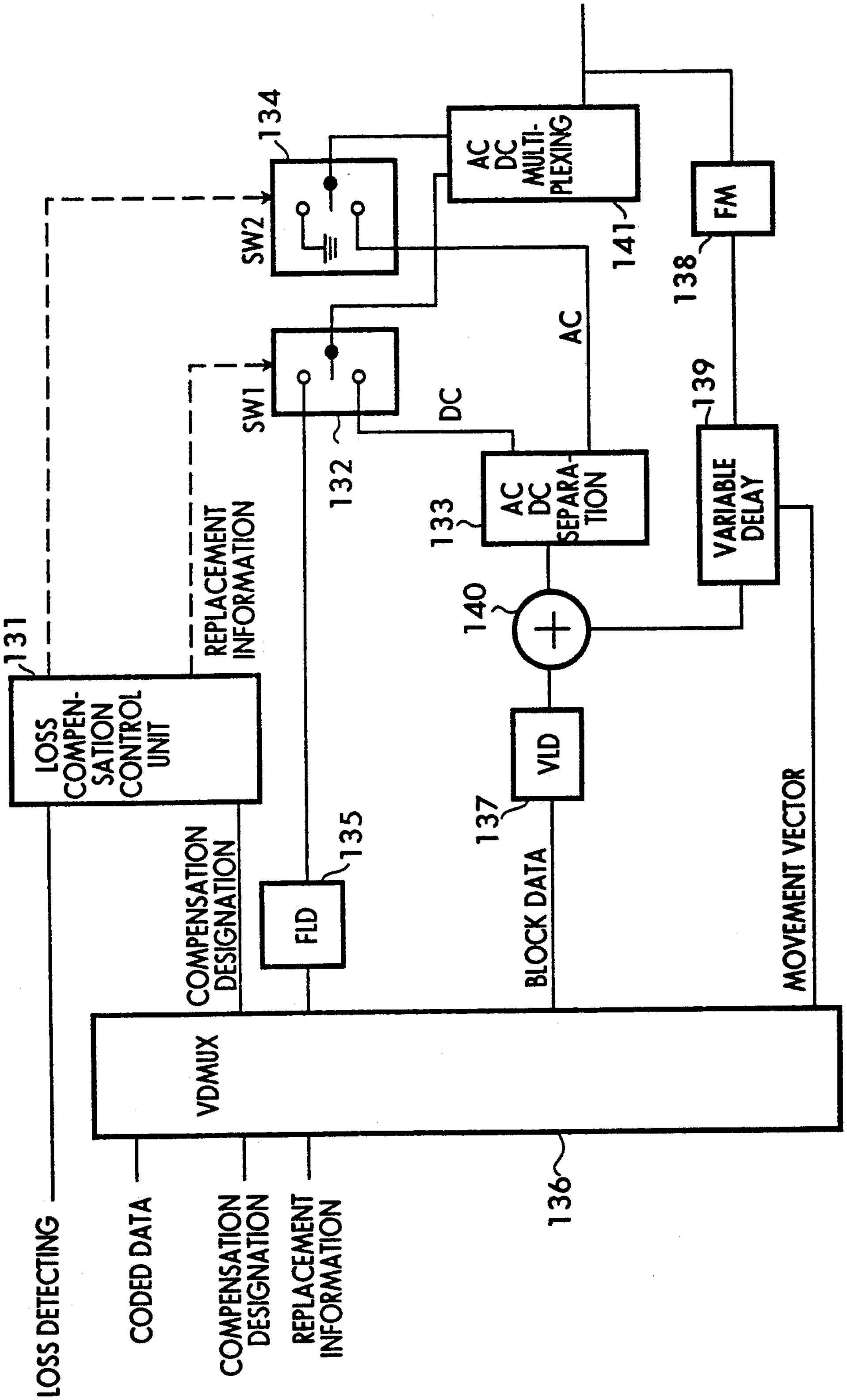
Figure 14:
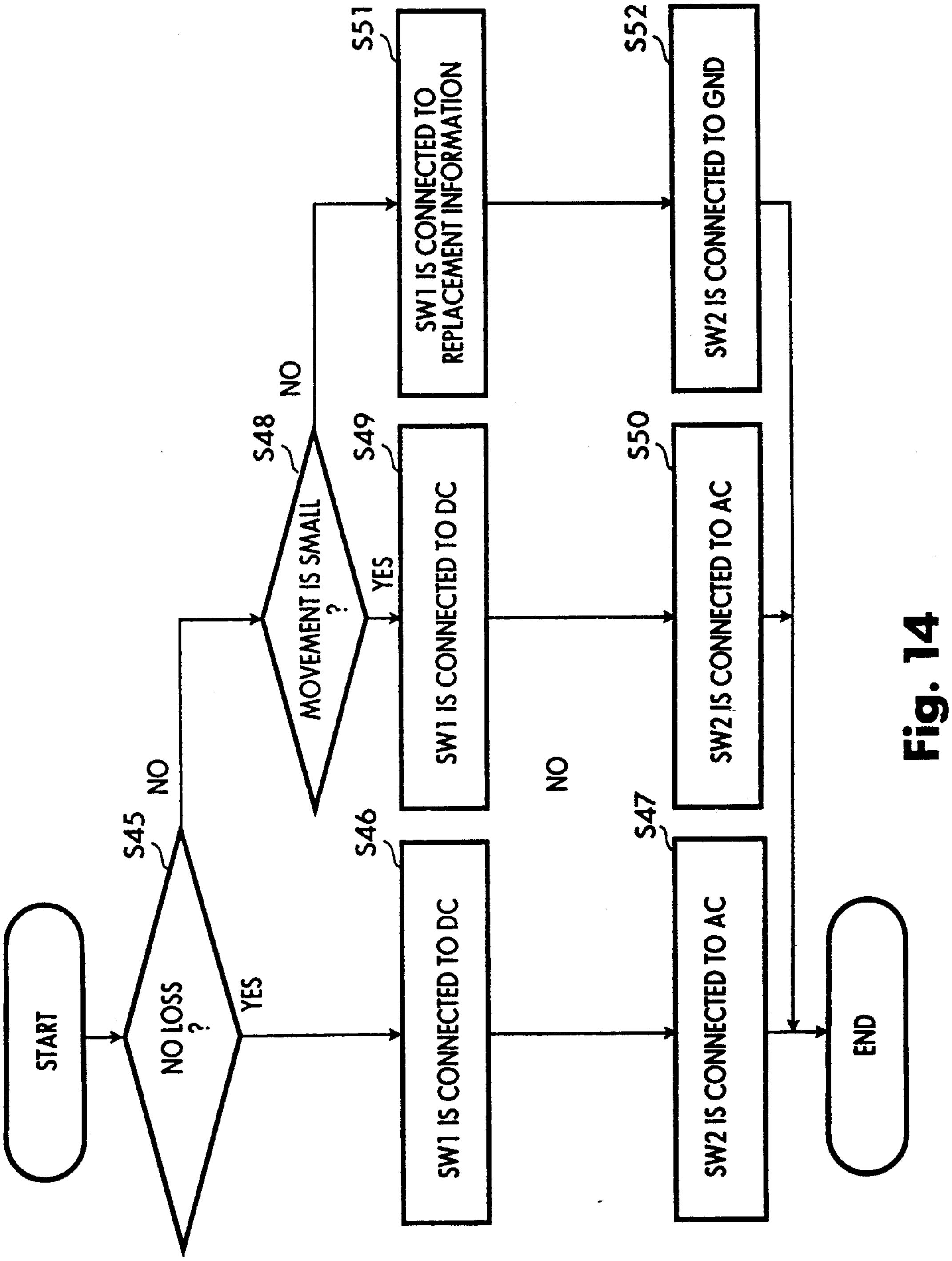
Figure 15A:
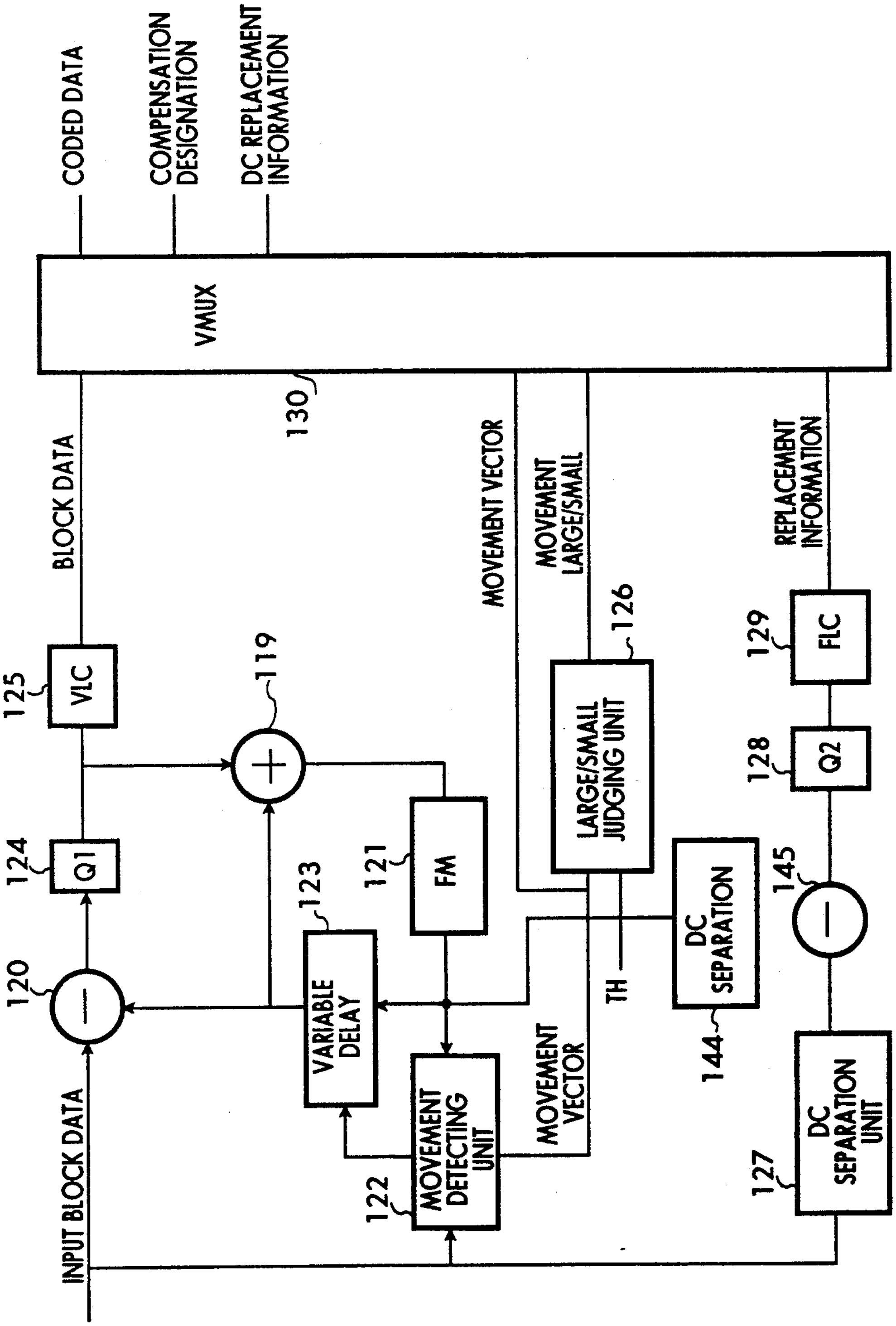
Figure 15B:
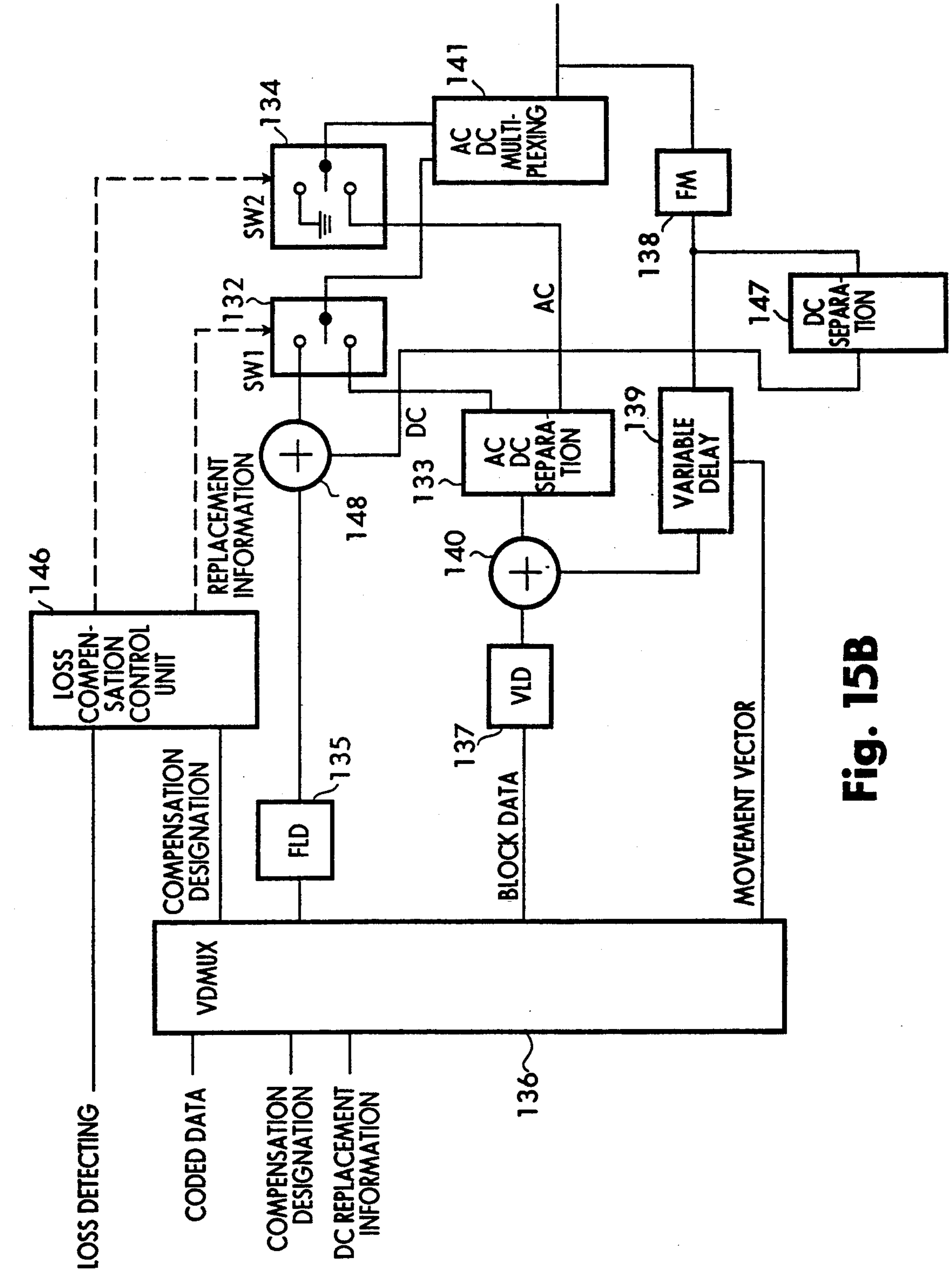
Figure 16A:
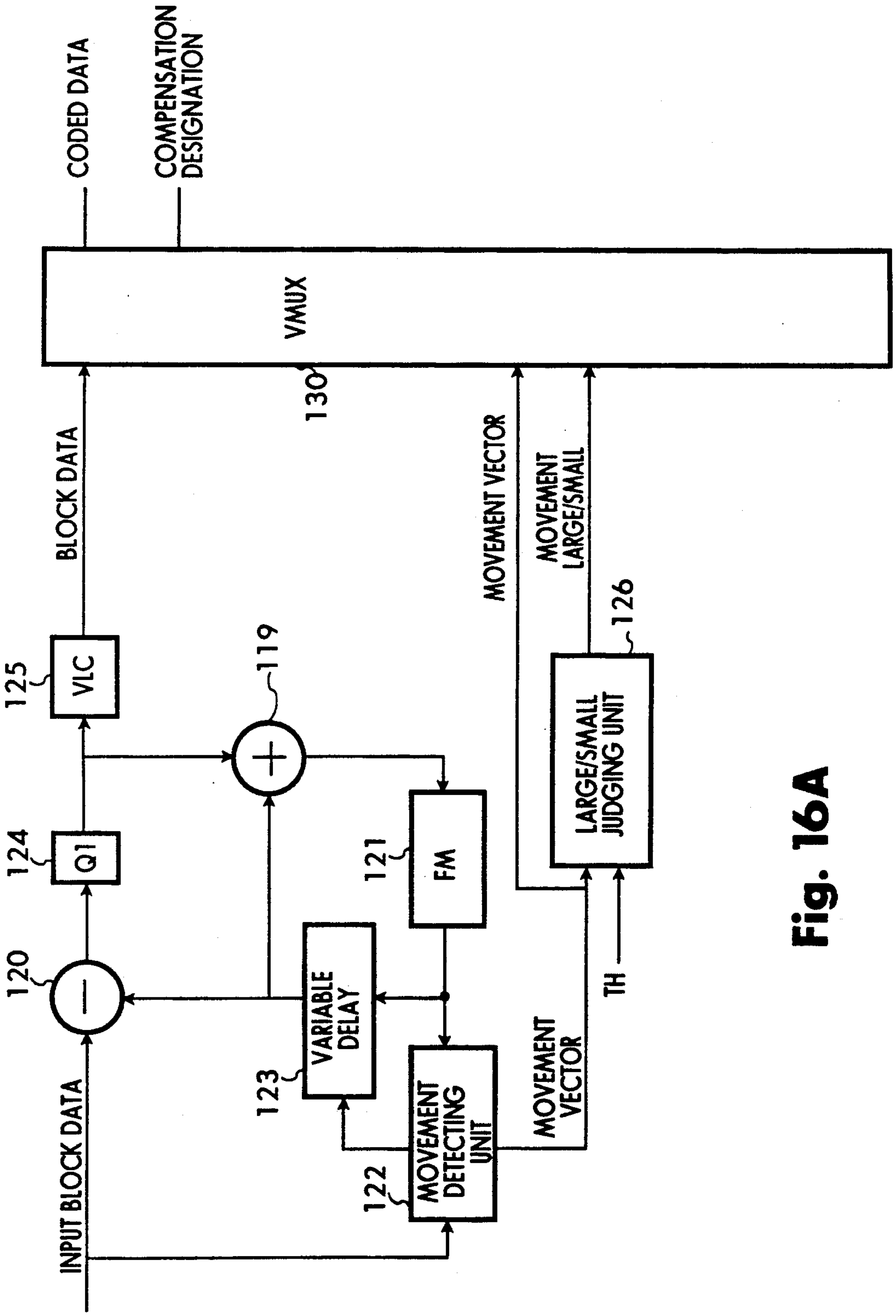
Figure 16B:
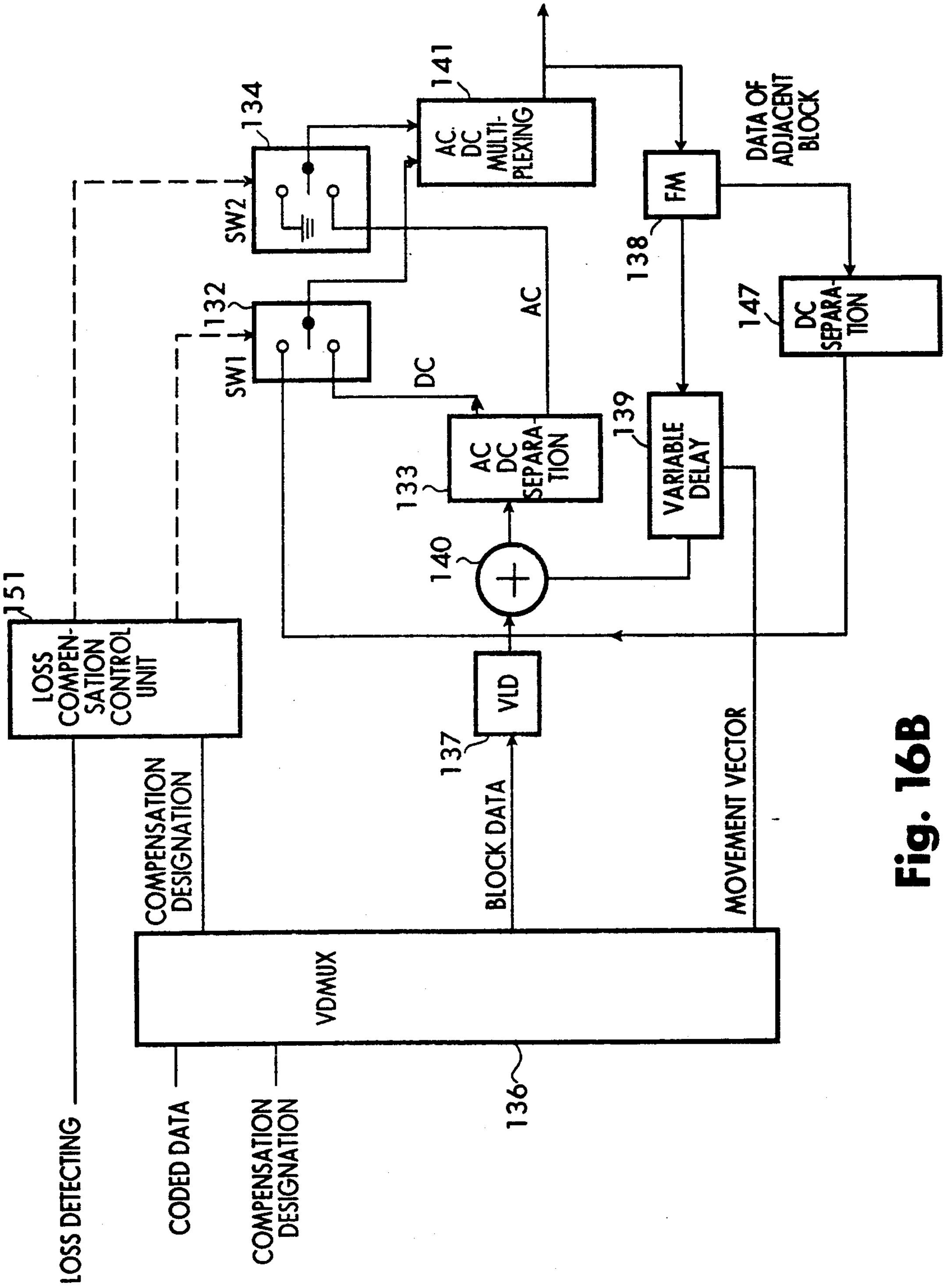
Figure 17:
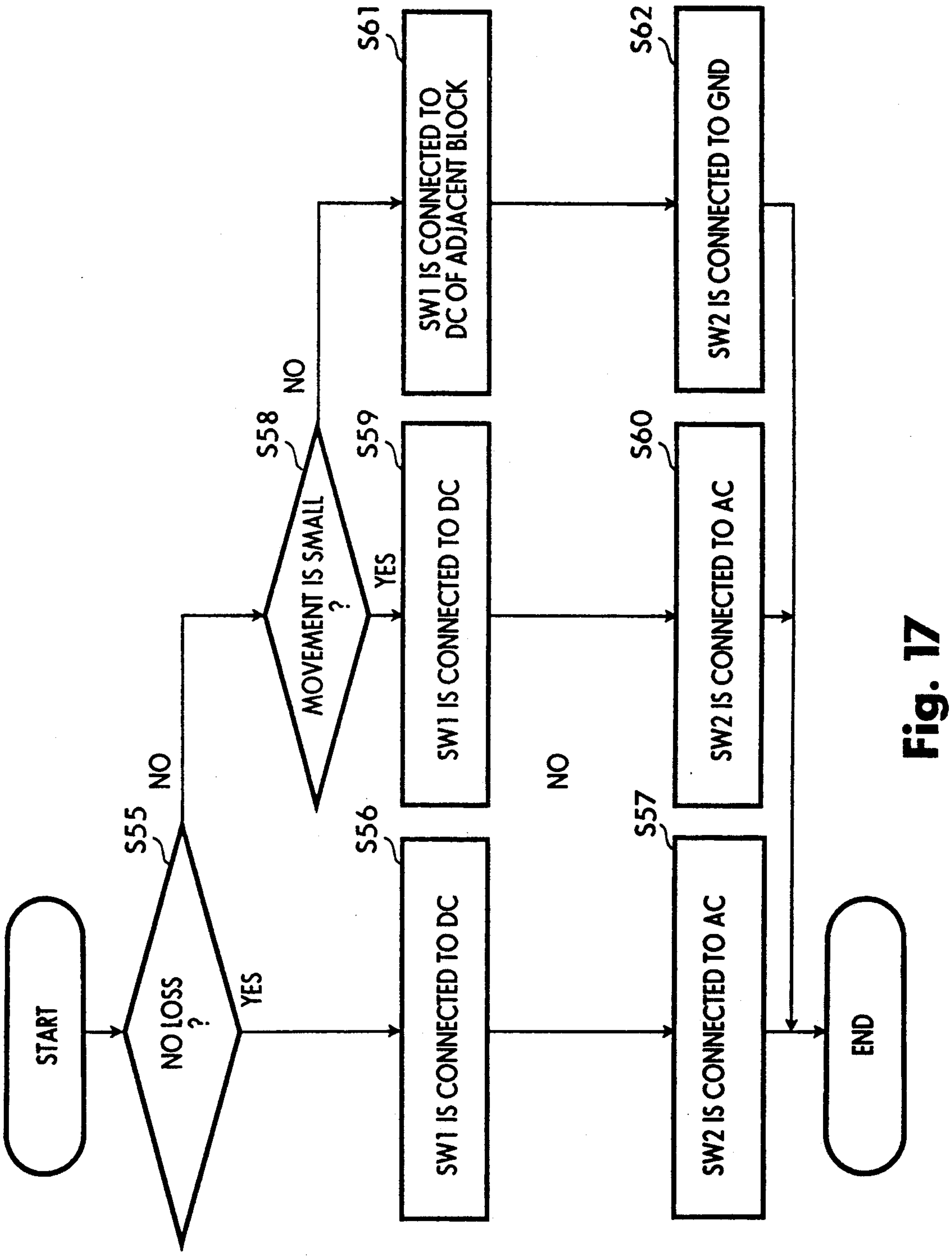
Figure 18:
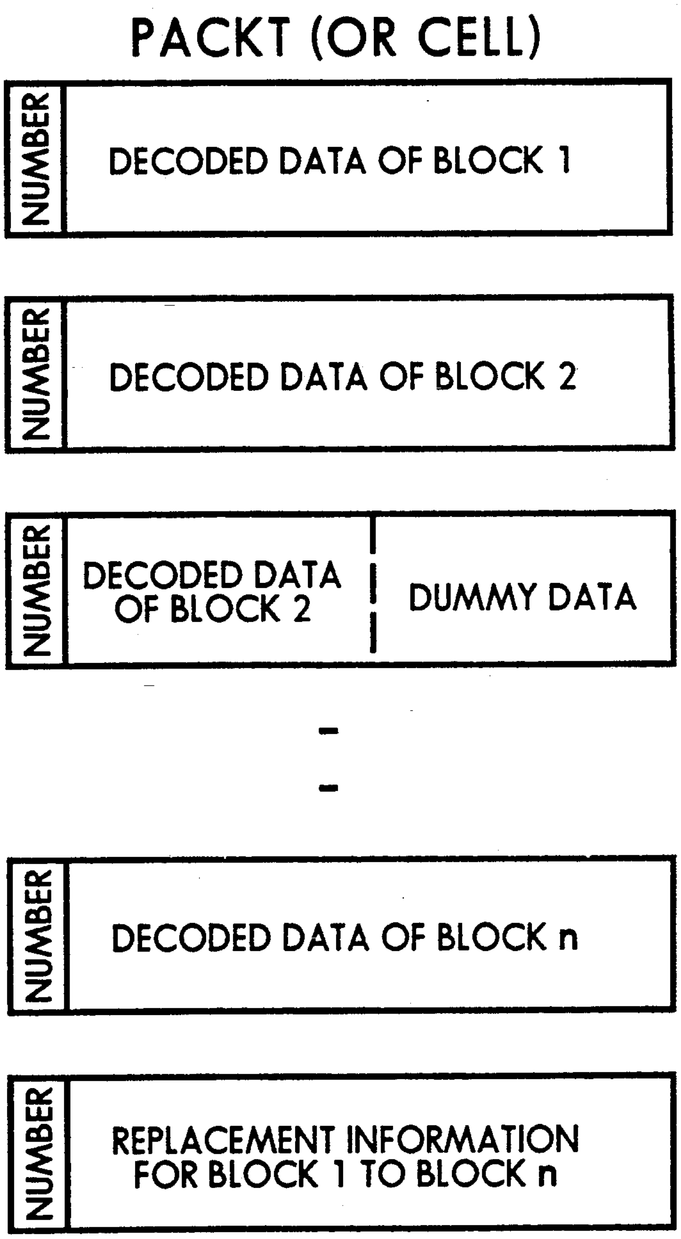
Figure 19A:
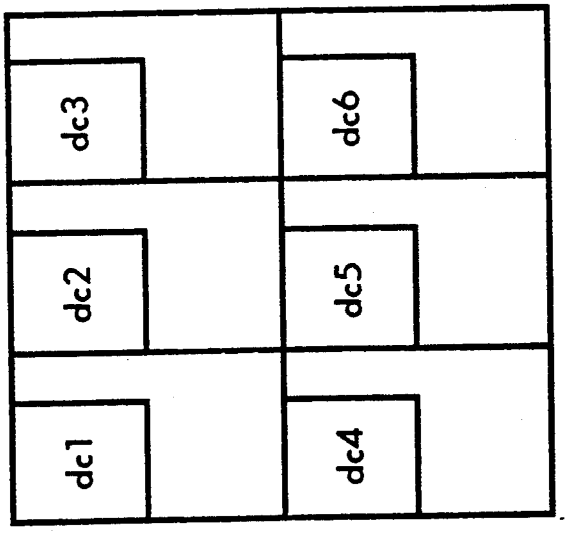
Figure 19B:
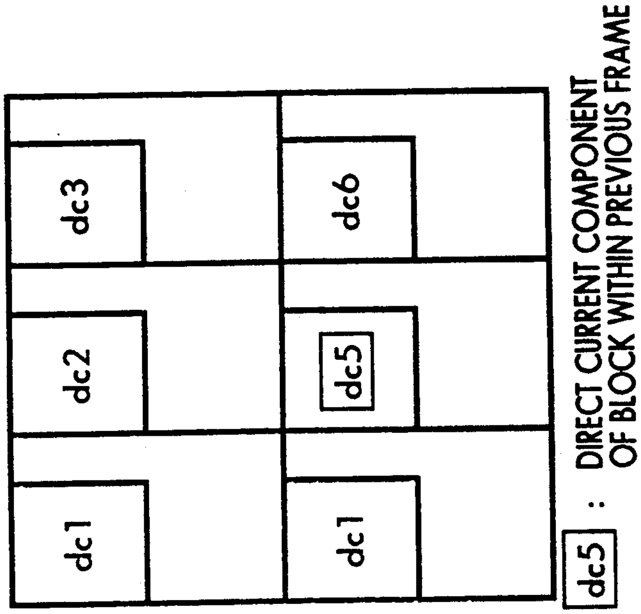
Figure 20B:
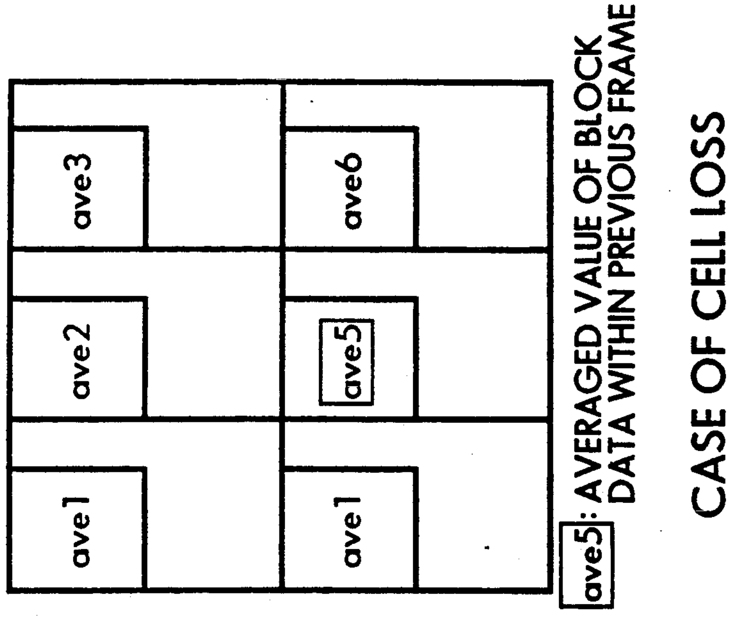
Figure 20A:
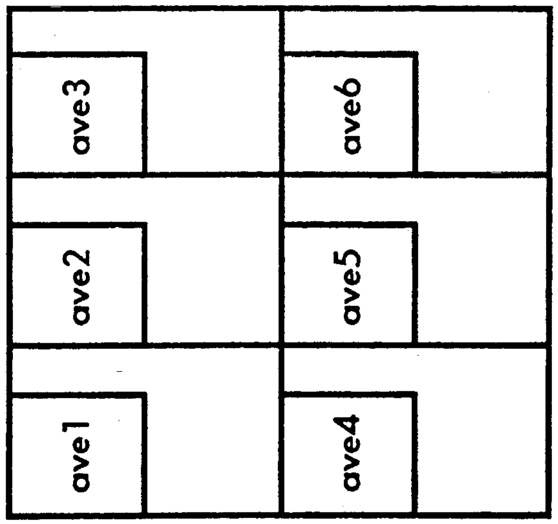
Figure 21:
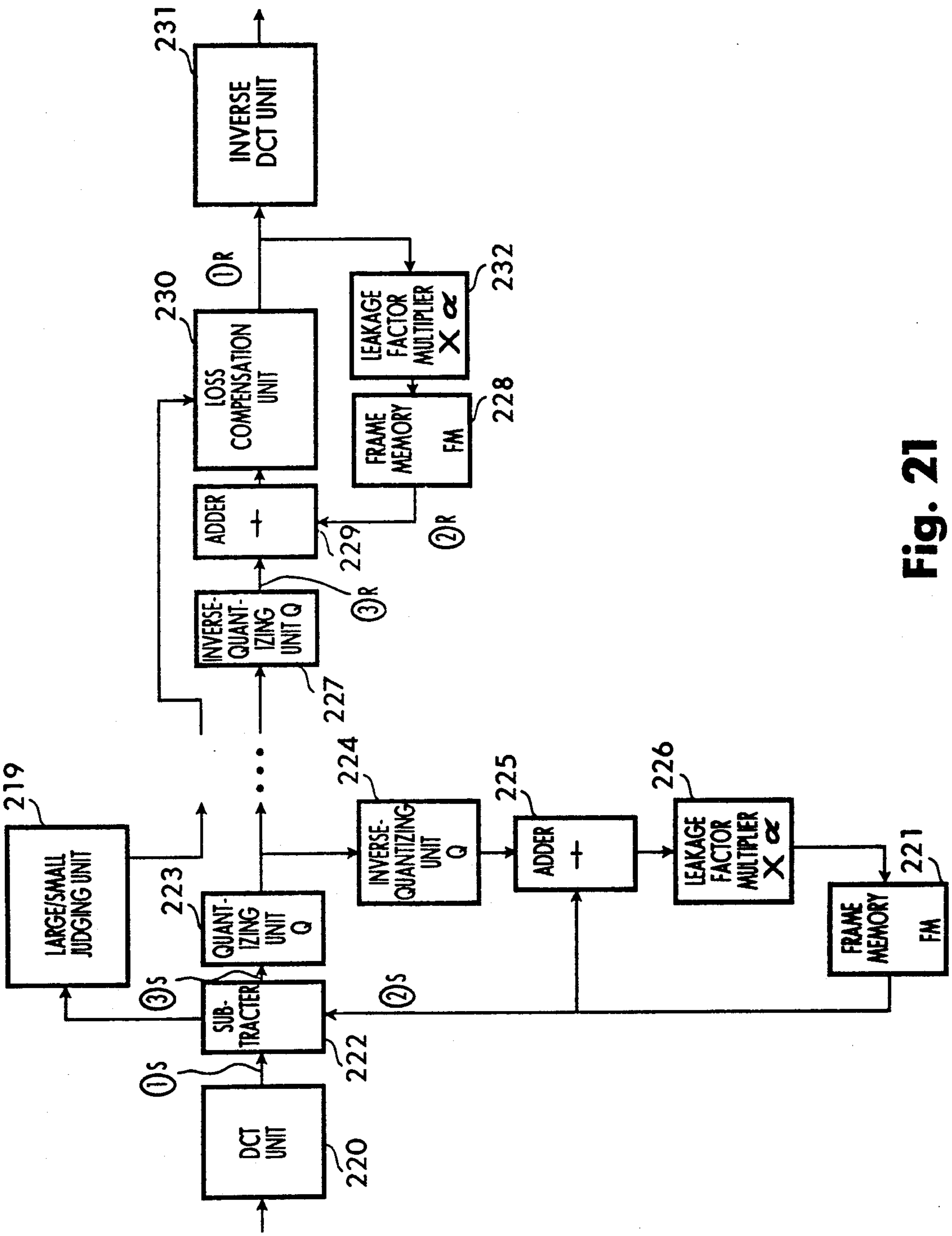
Figure 22A:
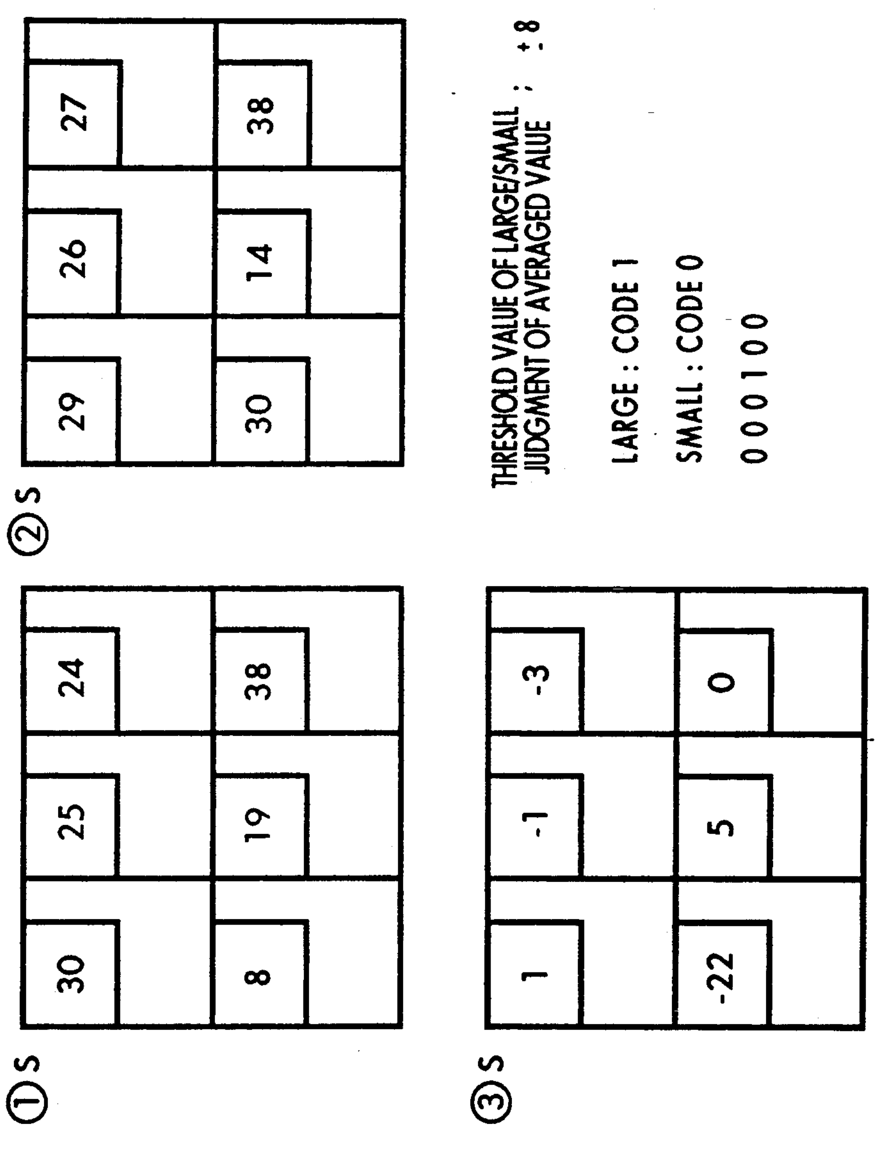
Figure 22B:
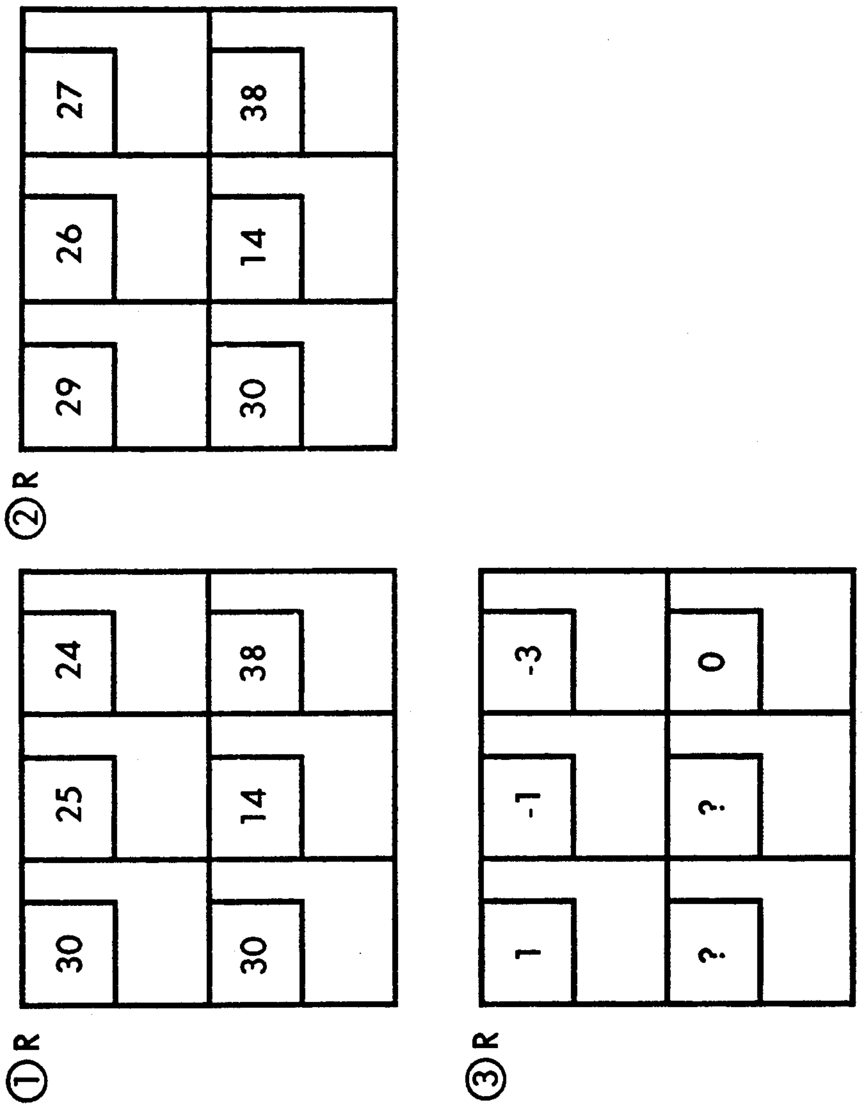
Figure 23:
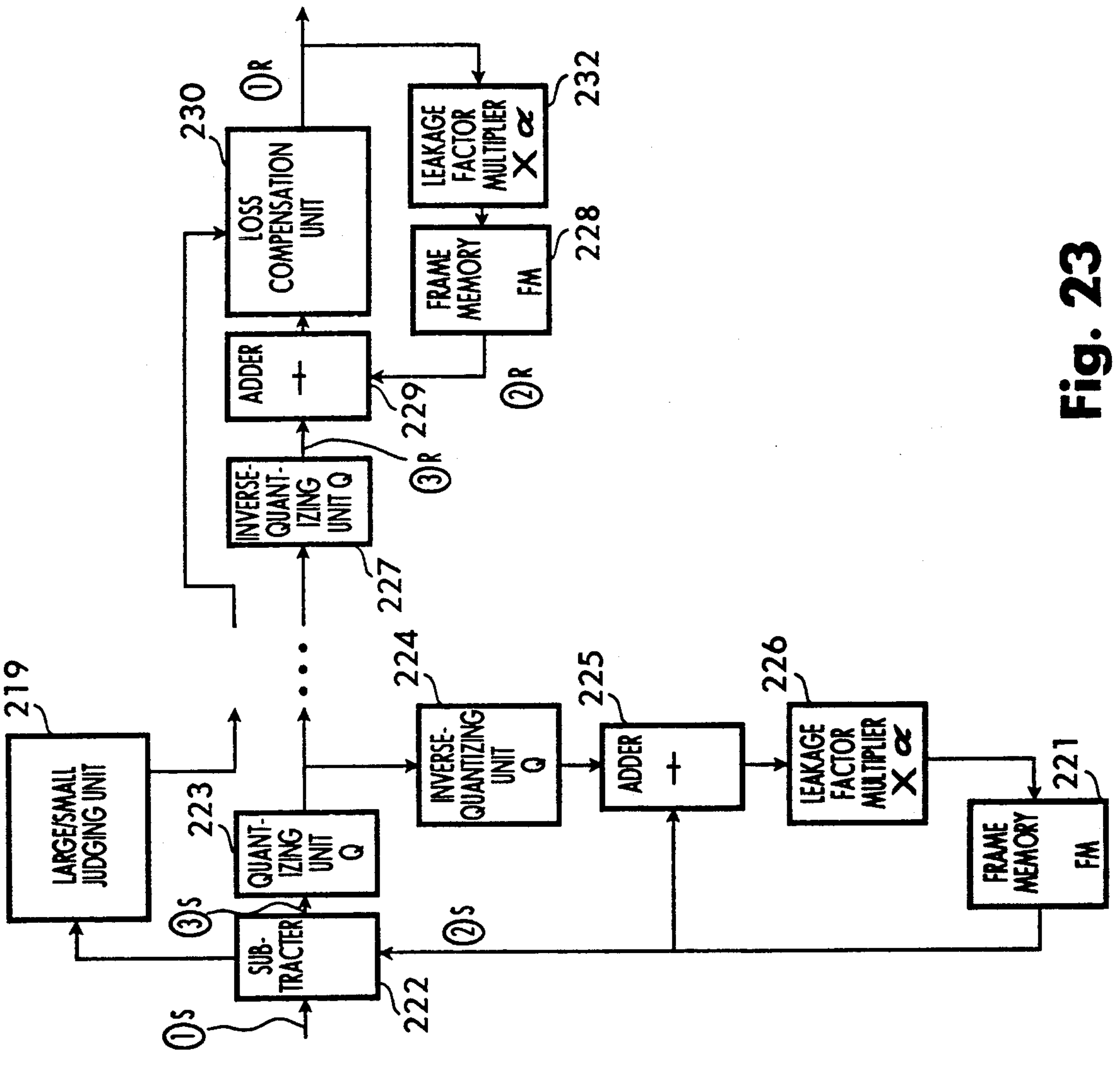
Figure 24A:
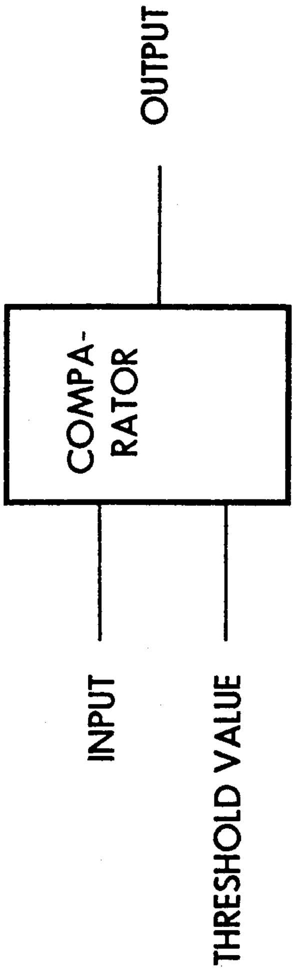
Figure 24B:
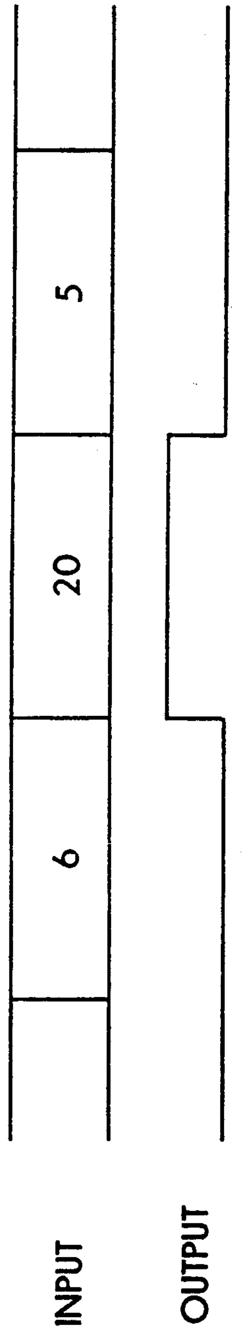
Figure 25:
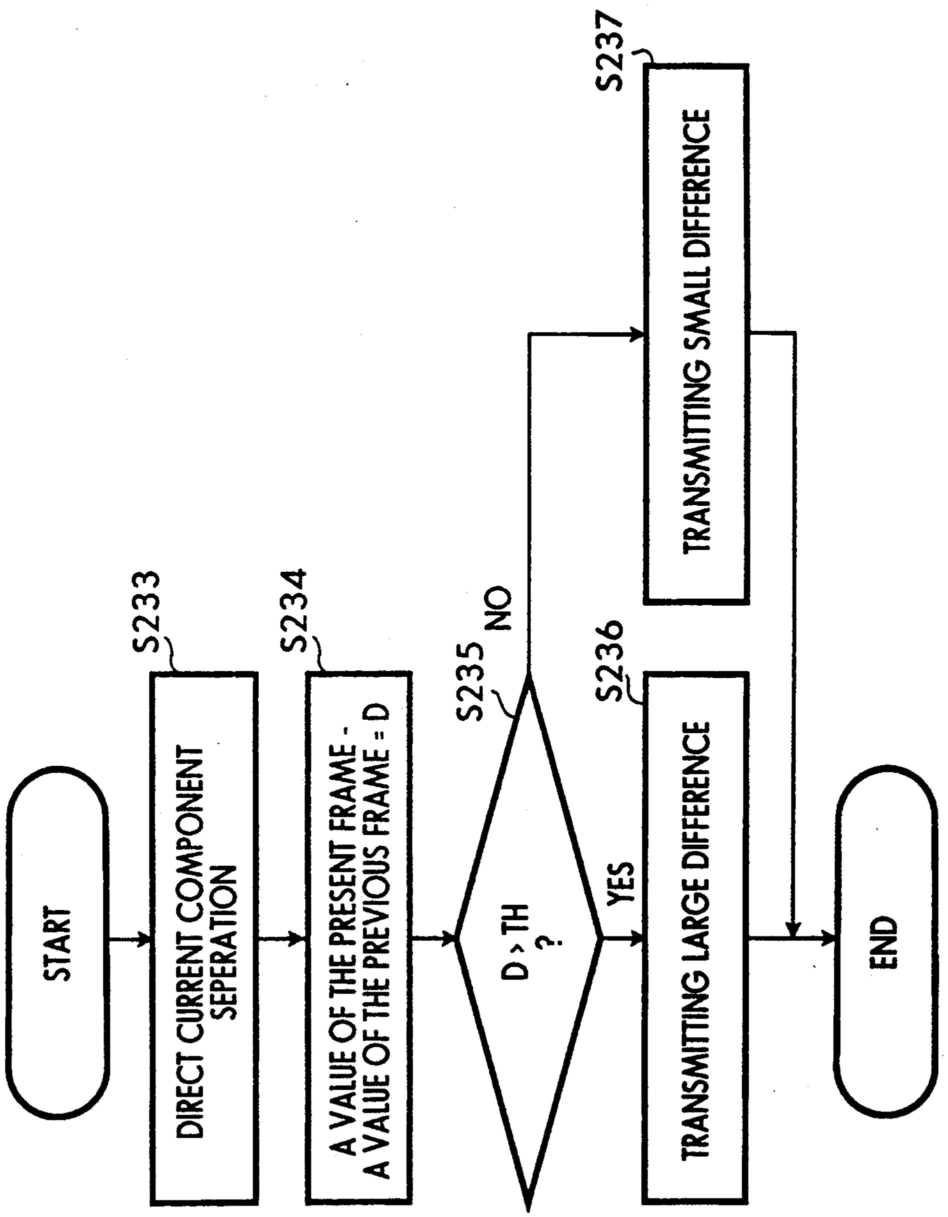
Figure 26:
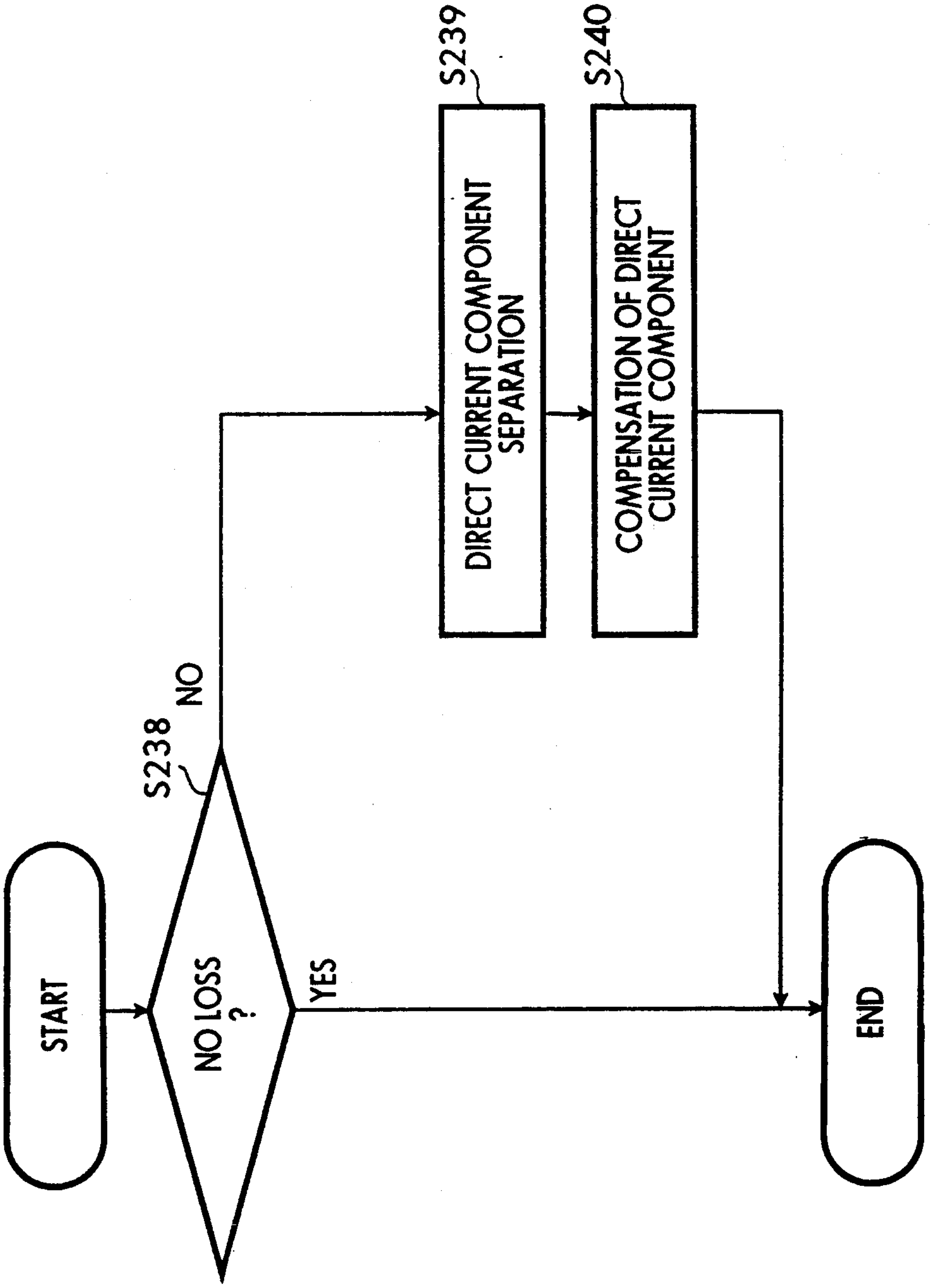
Figure 27A:
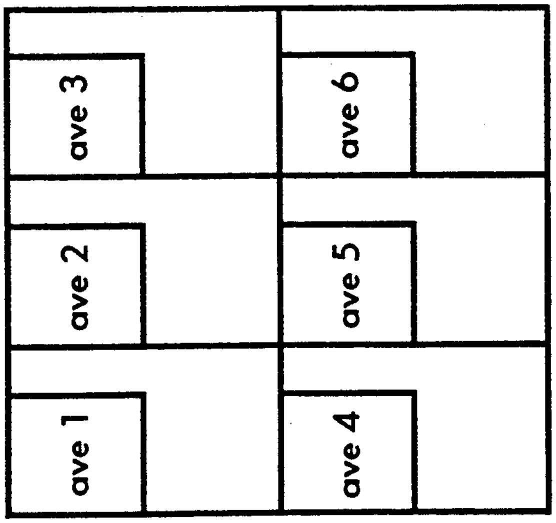
Figure 27B:
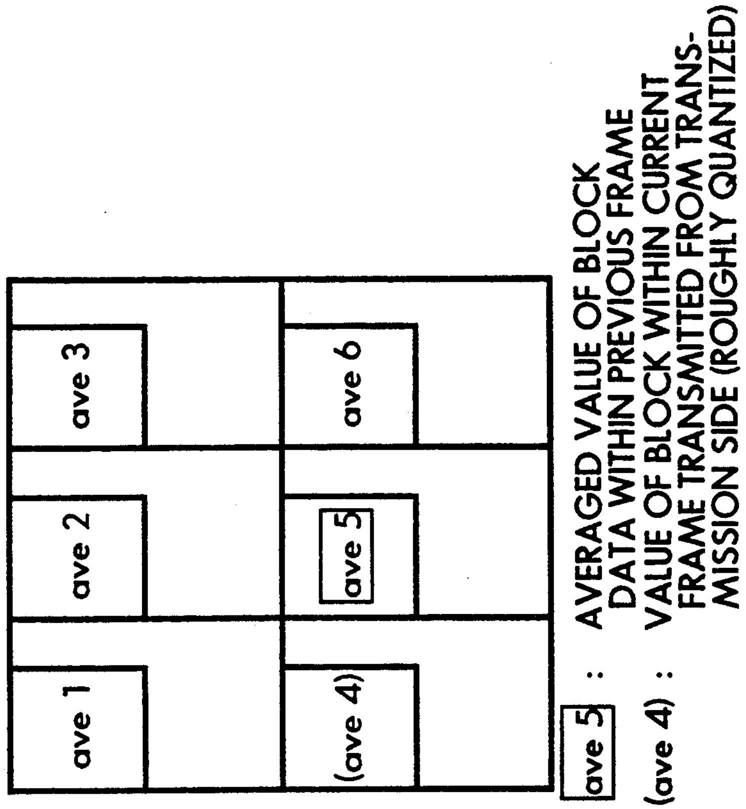
Figure 28A:
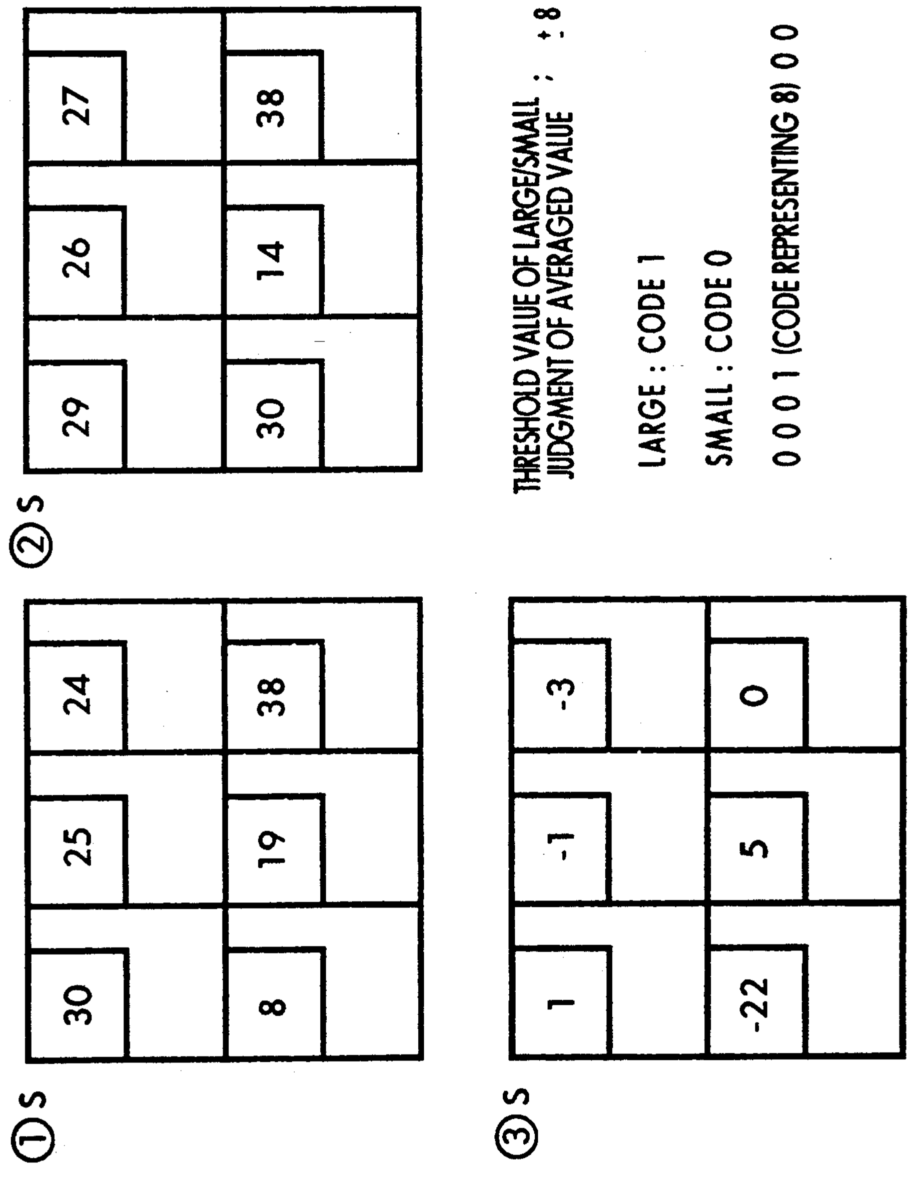
Figure 28B:
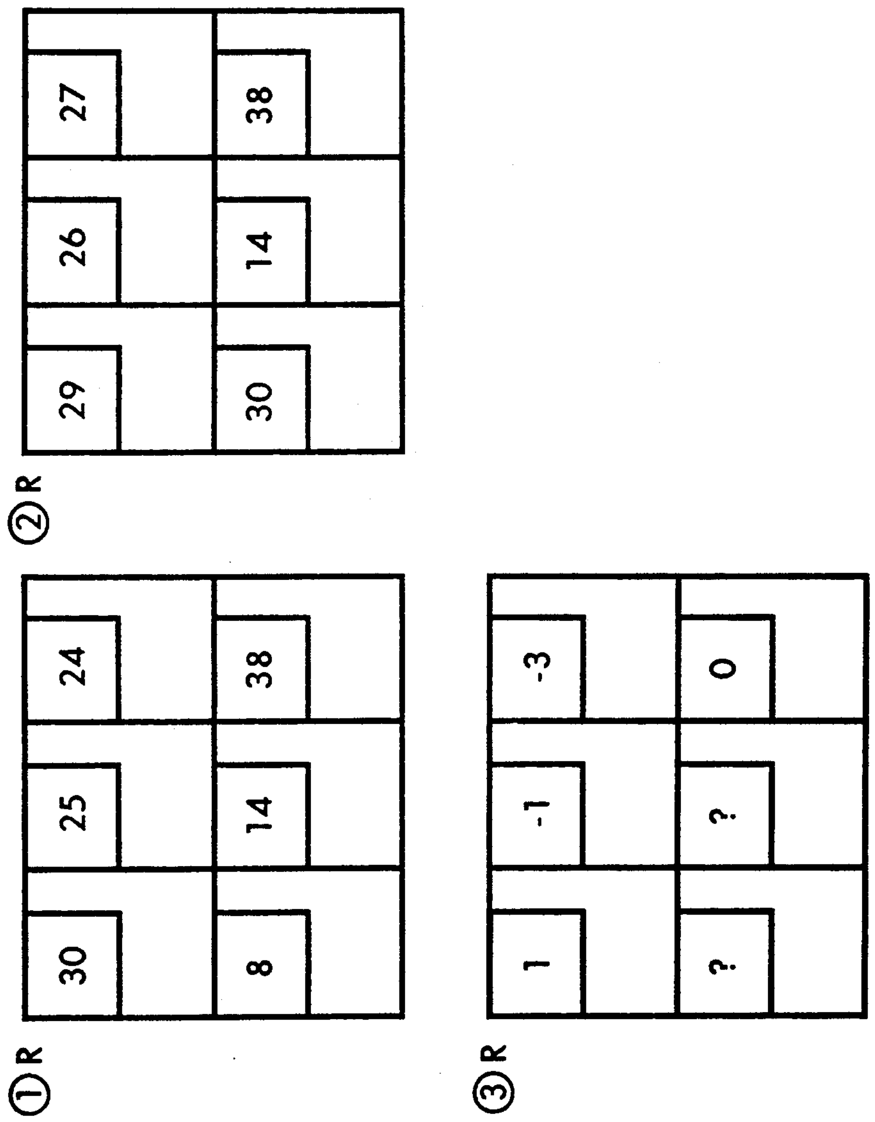
Figure 29A:
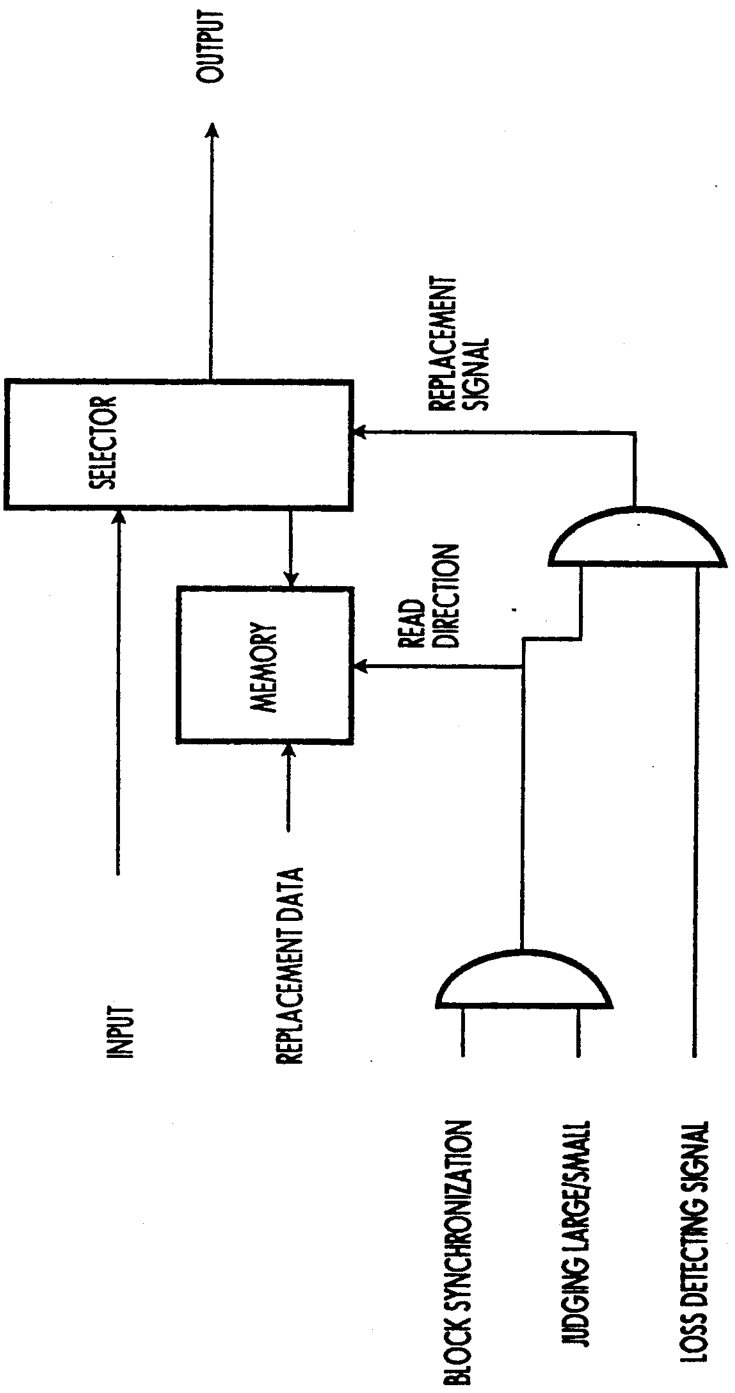
Figure 29B:
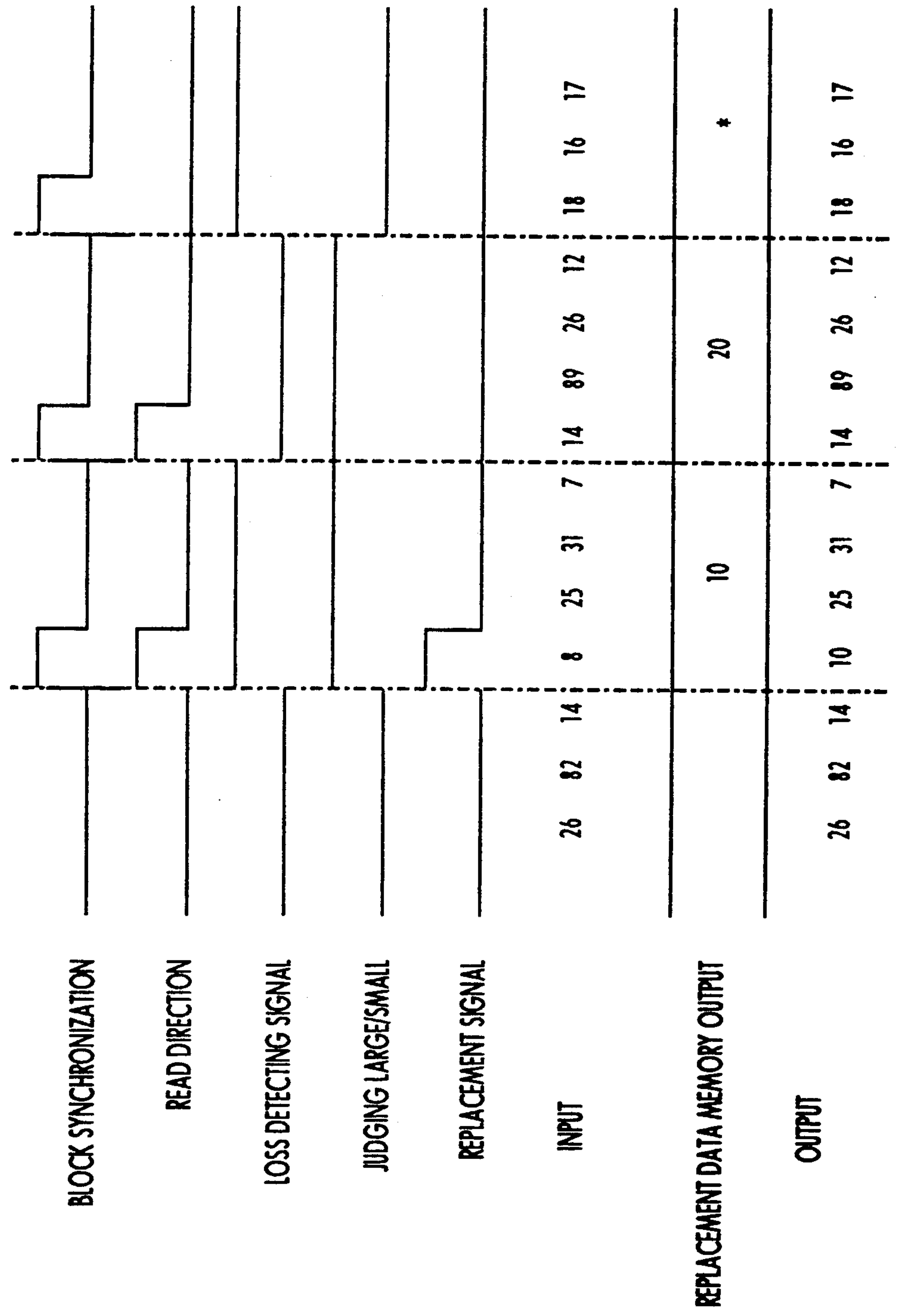
Figure 30:
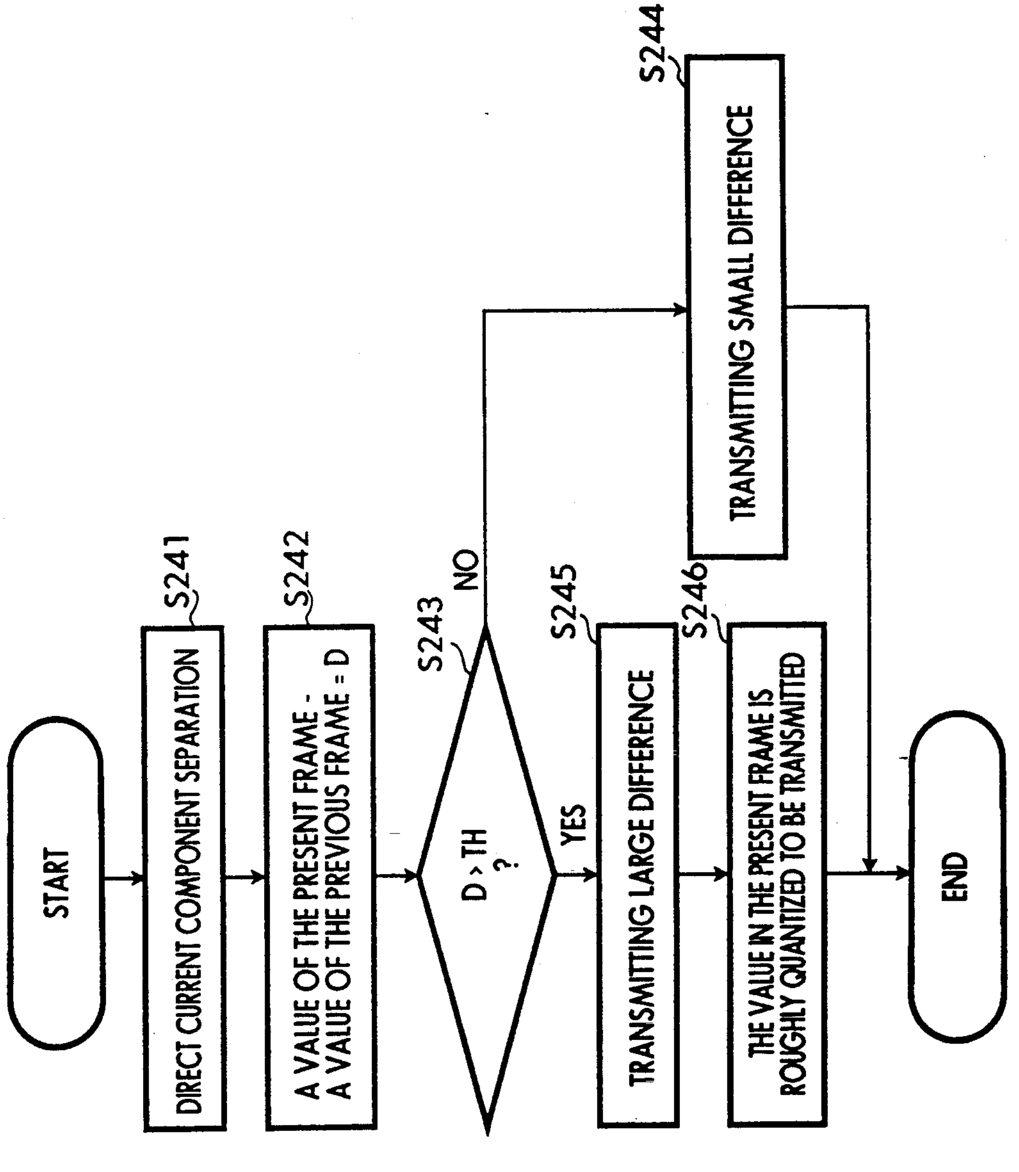
Figure 31:
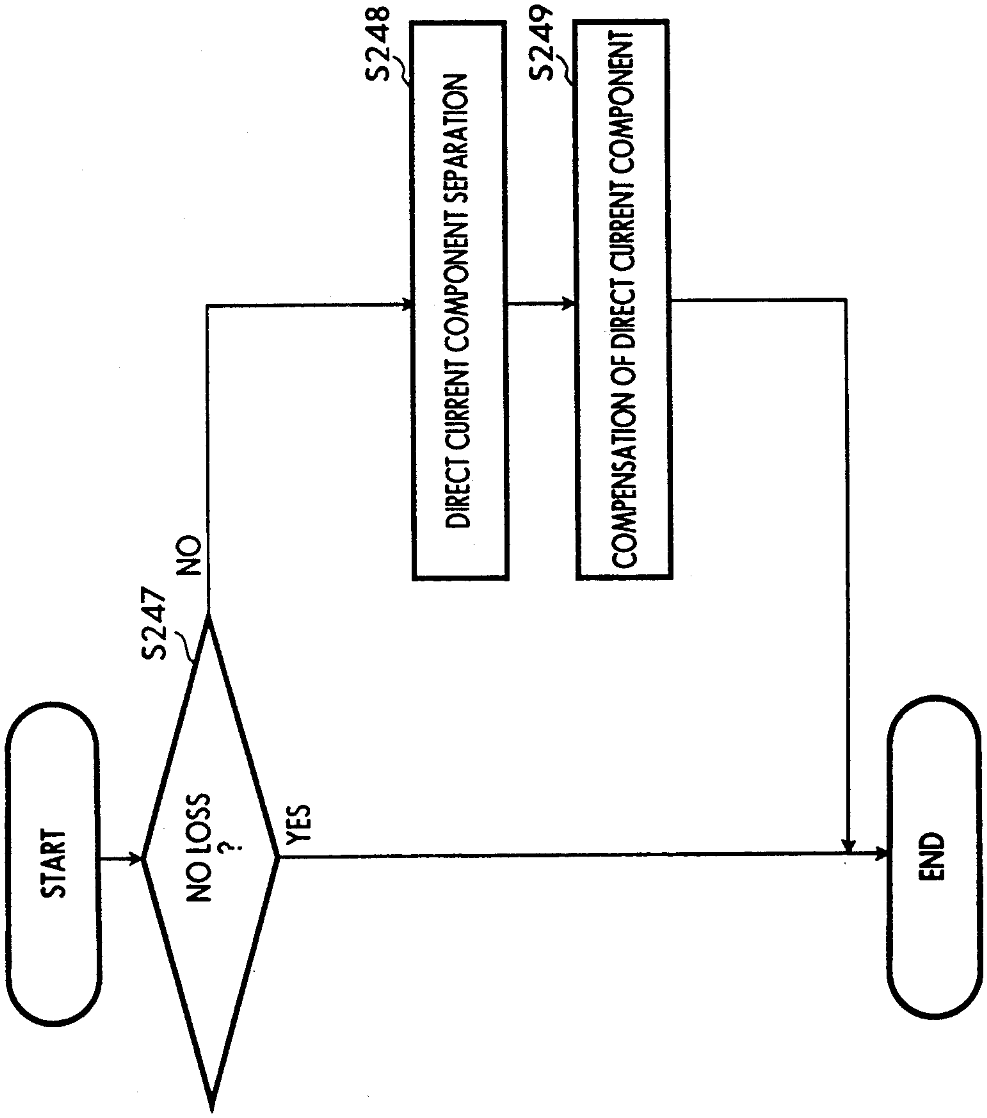
Figure 32A:
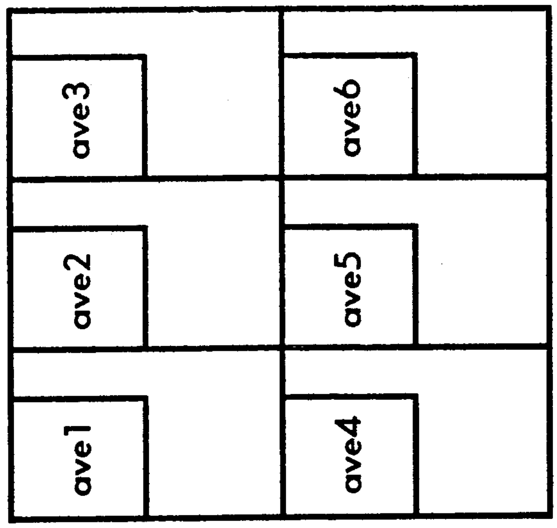
Figure 32B:
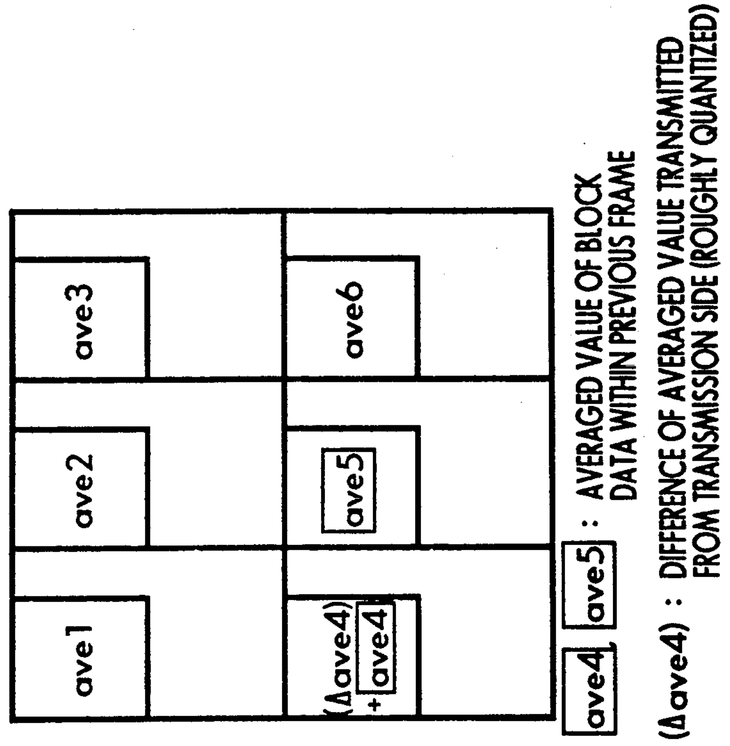
Figure 33B:
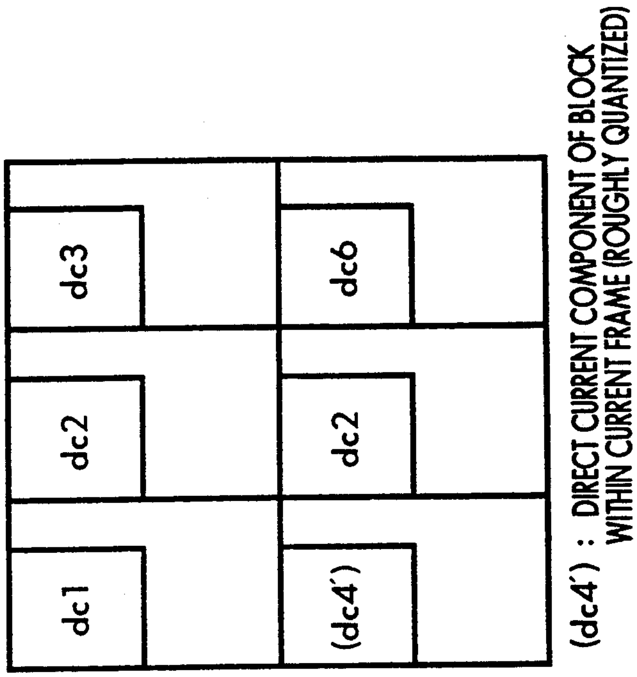
Figure 33A:
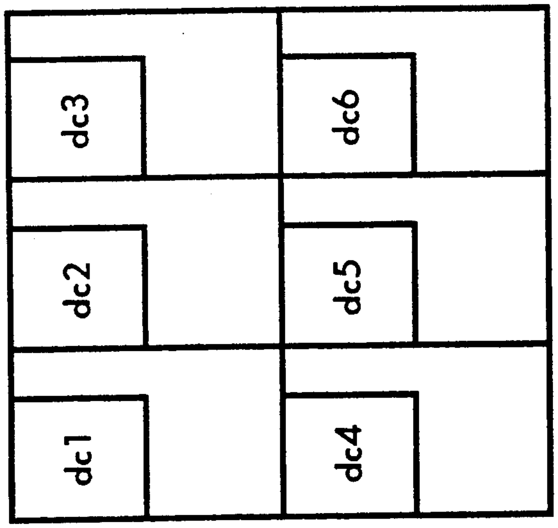
Figure 34B:
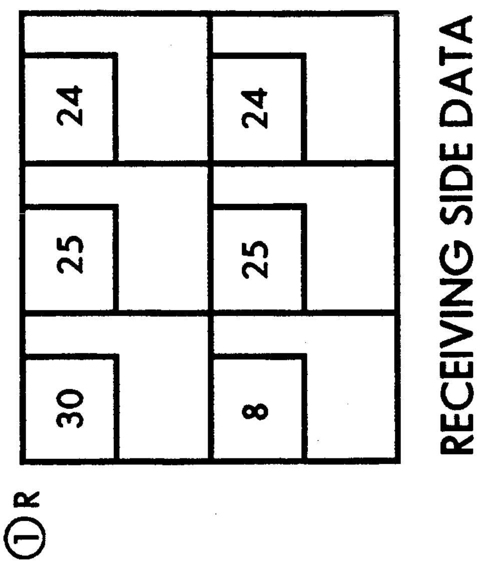
Figure 34A:
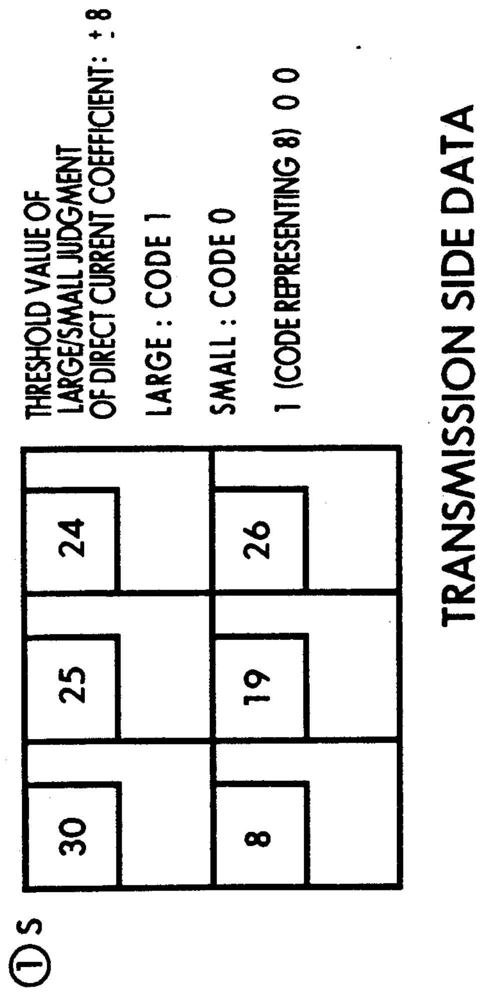
Figure 35:
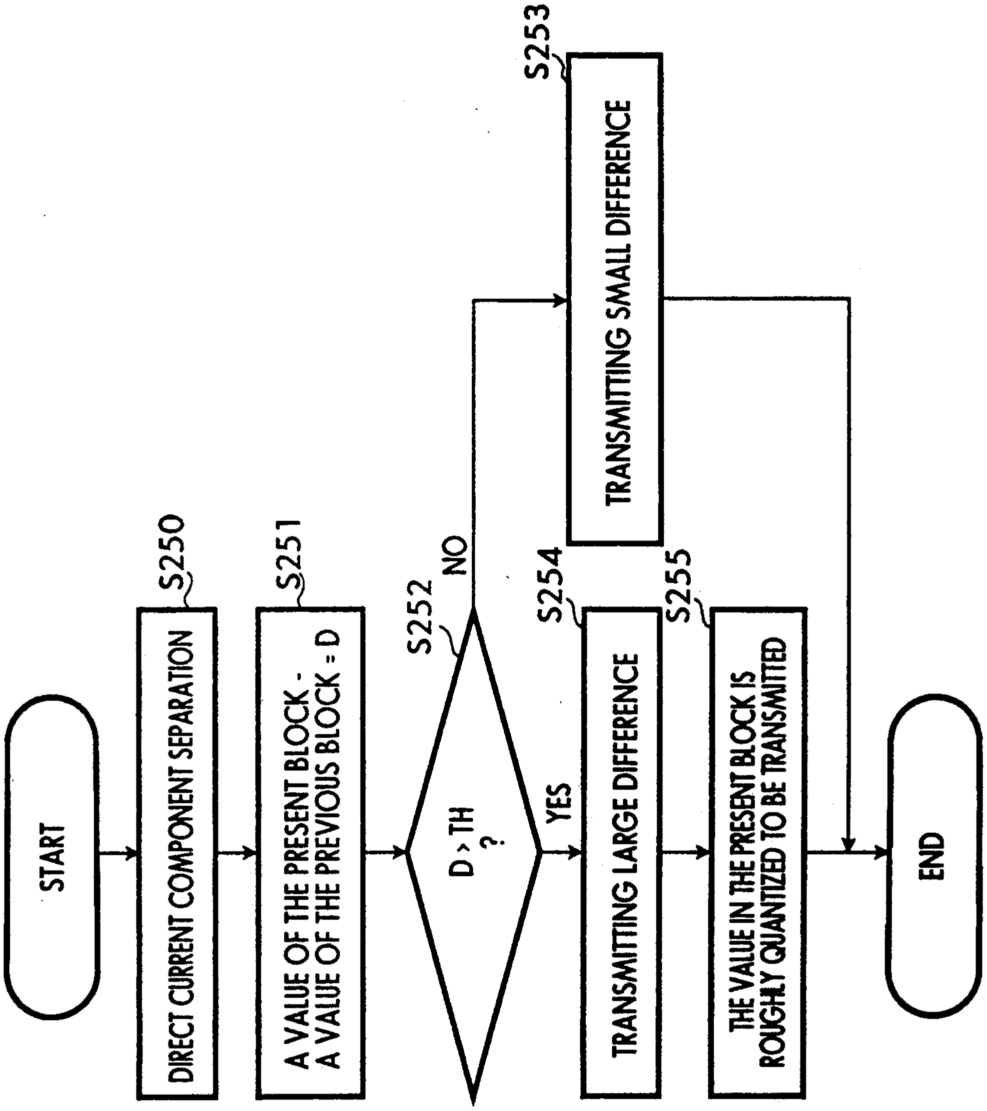
Figure 36:
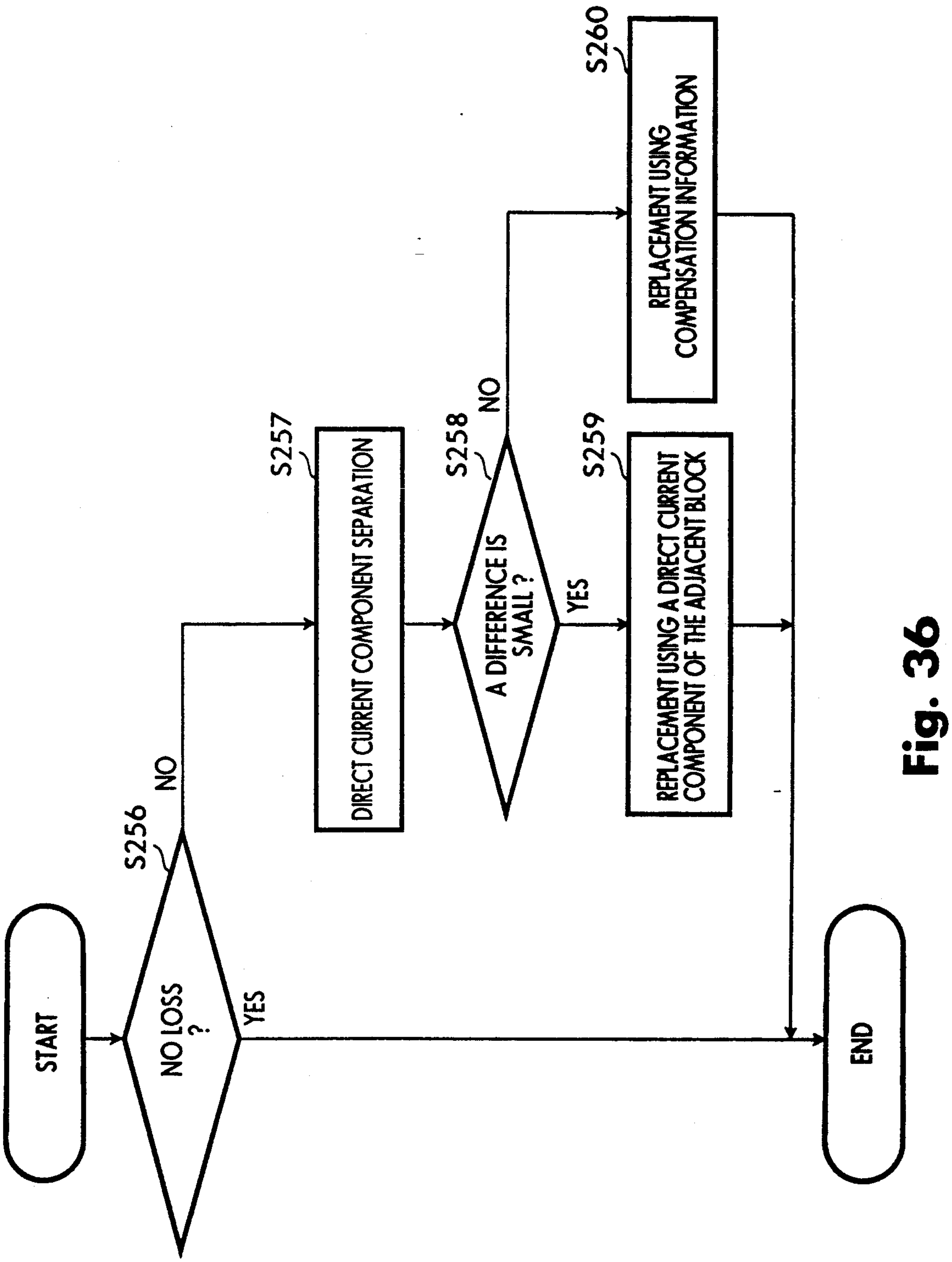
Figure 37A:
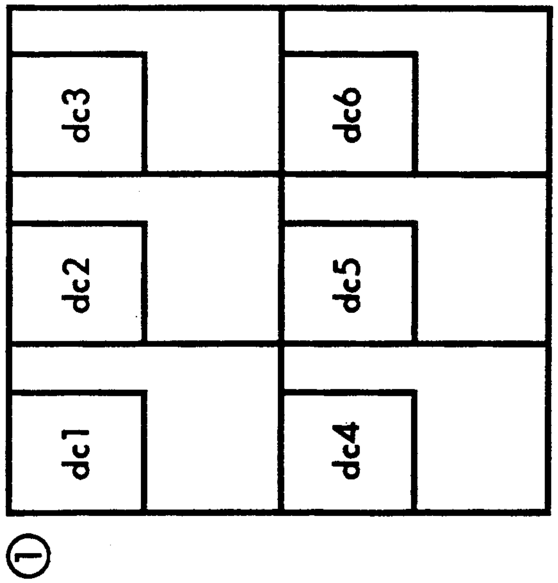
Figure 37B:
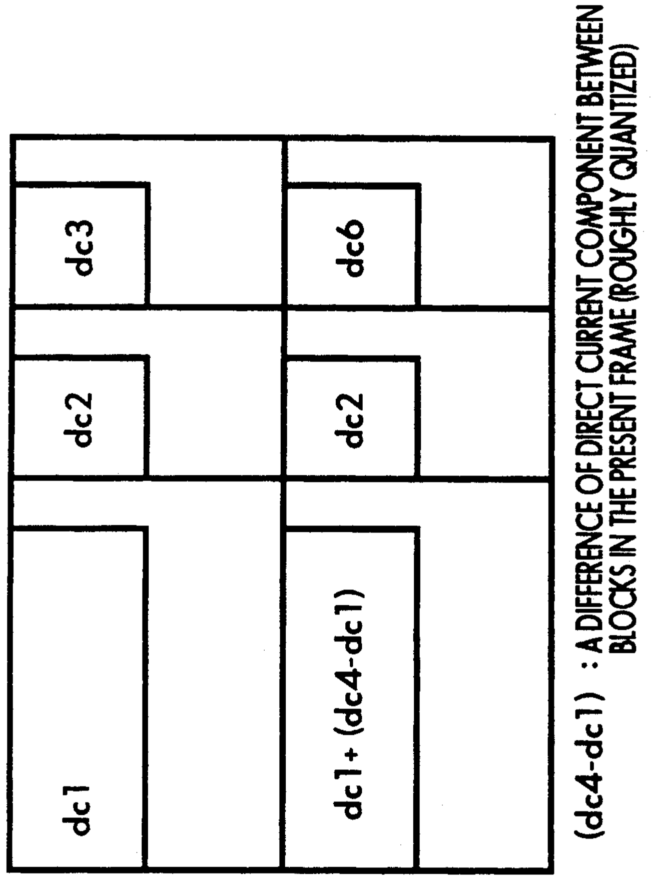
Figure 38:
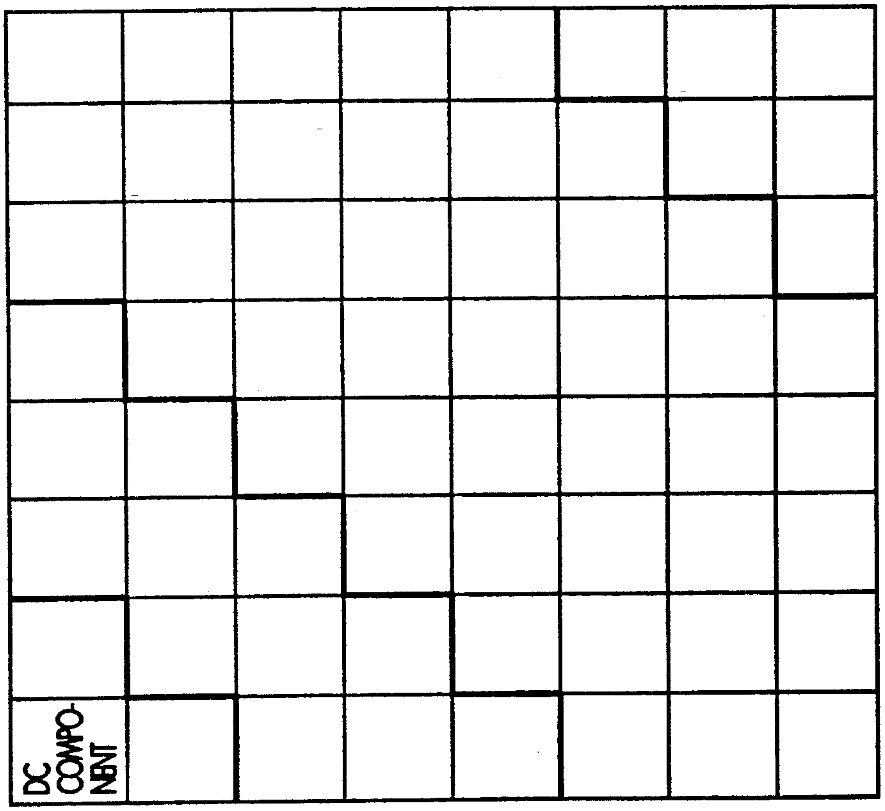
Figure 40A:
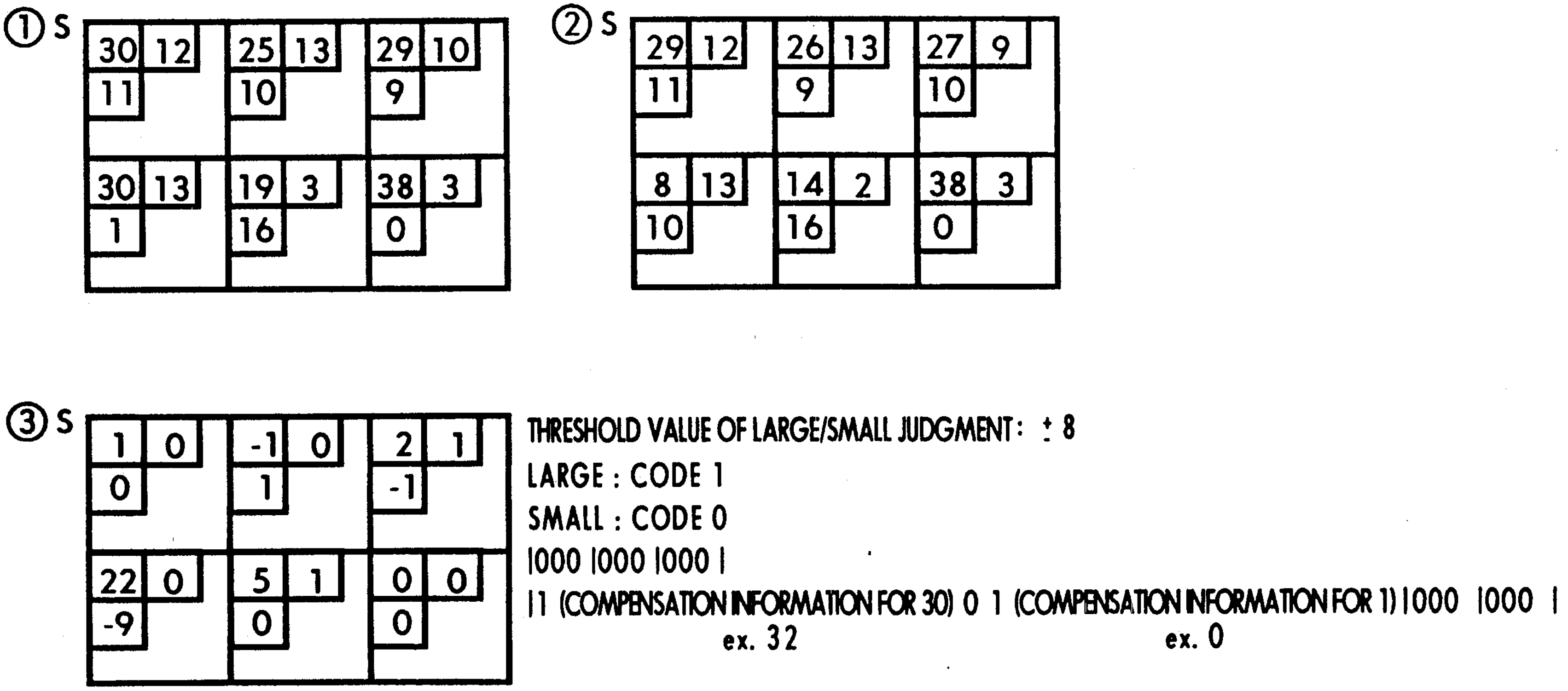
Figure 40B:
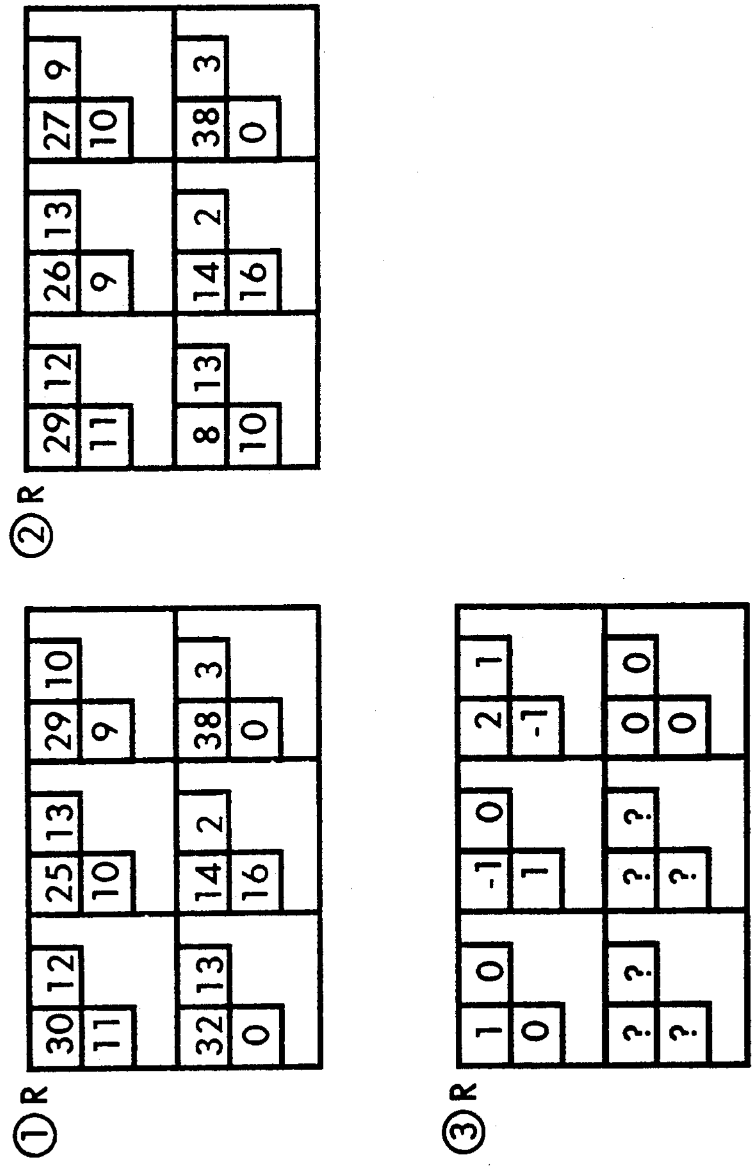
Figure 41:
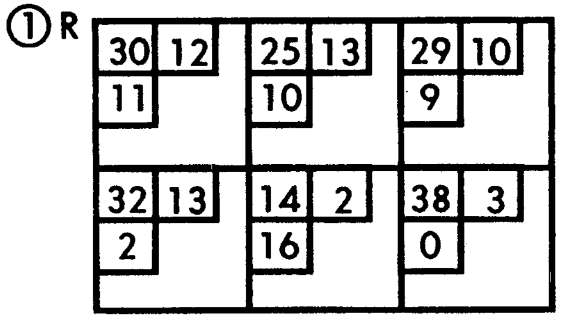
Figure 42:
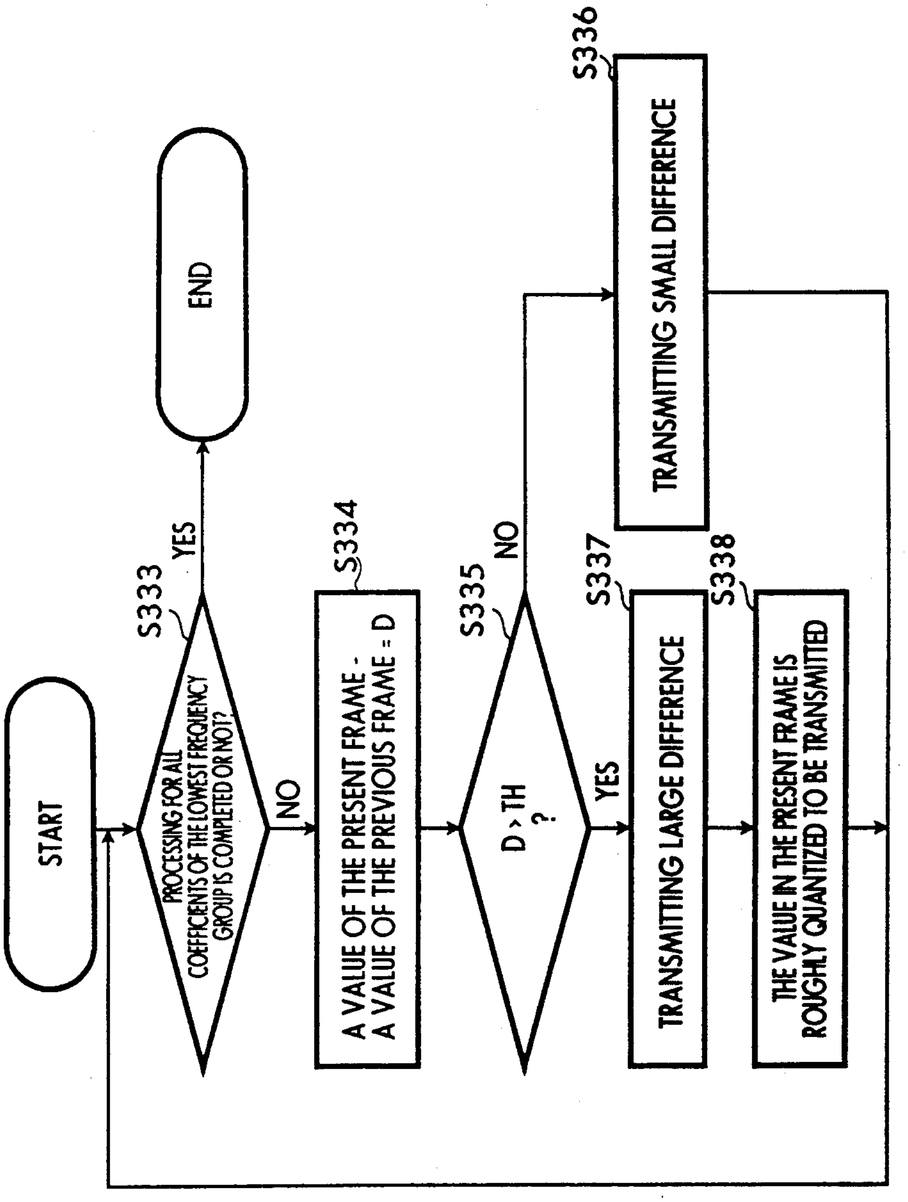
Figure 43:
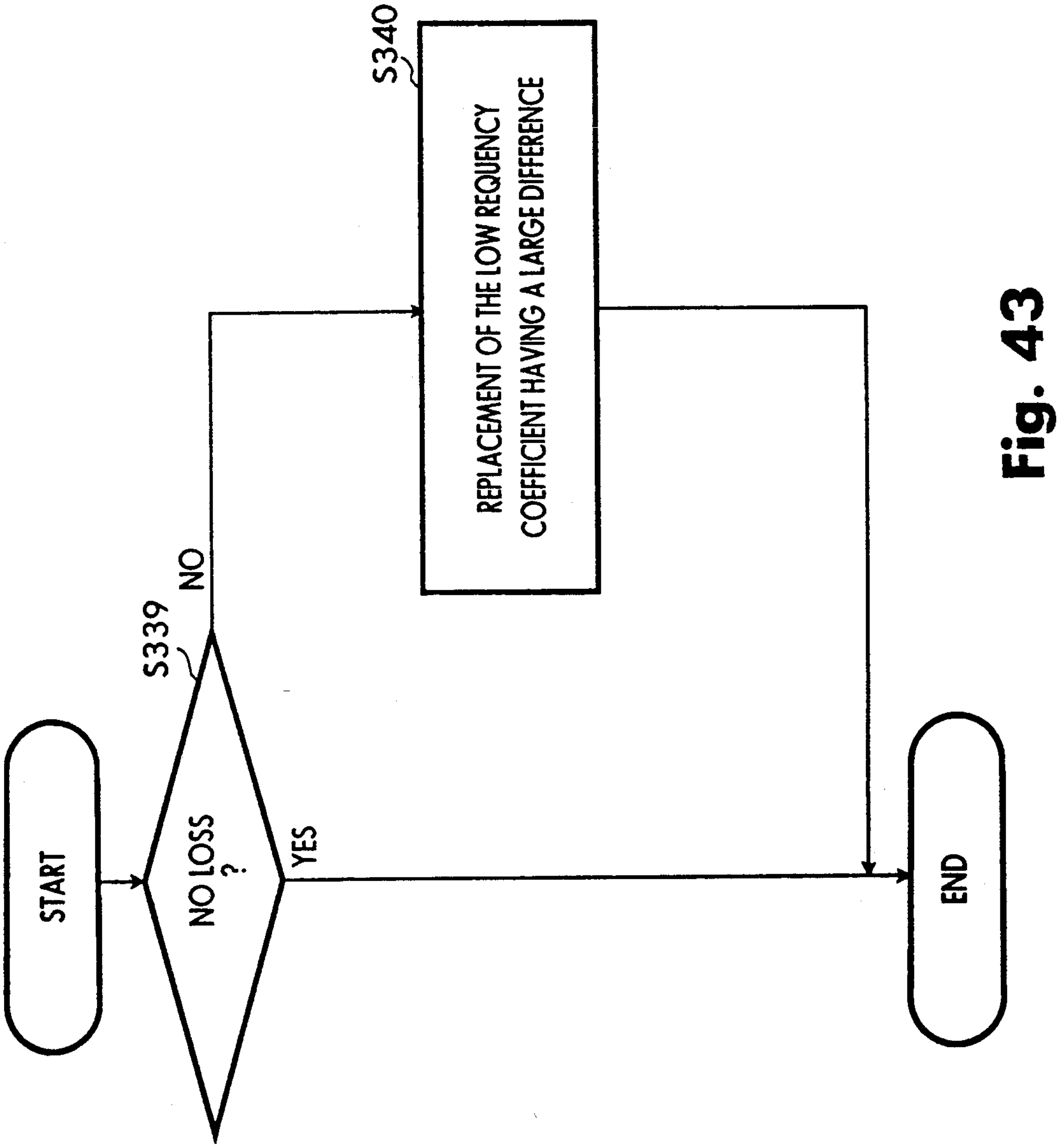
Figure 47A:
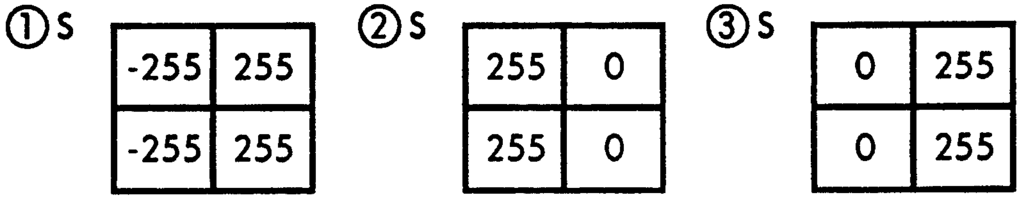
Figure 47B:
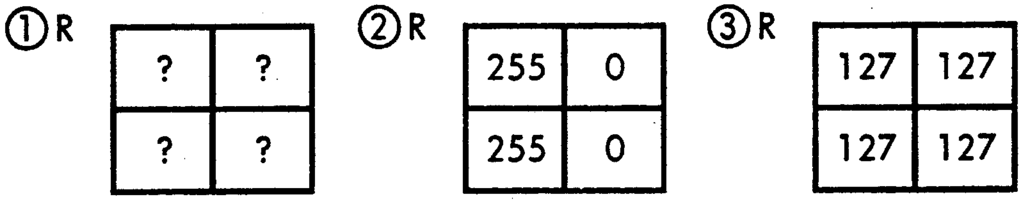
Figure 47C:
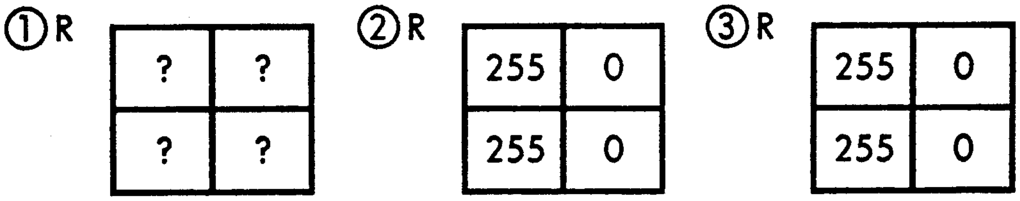
Figure 48A:
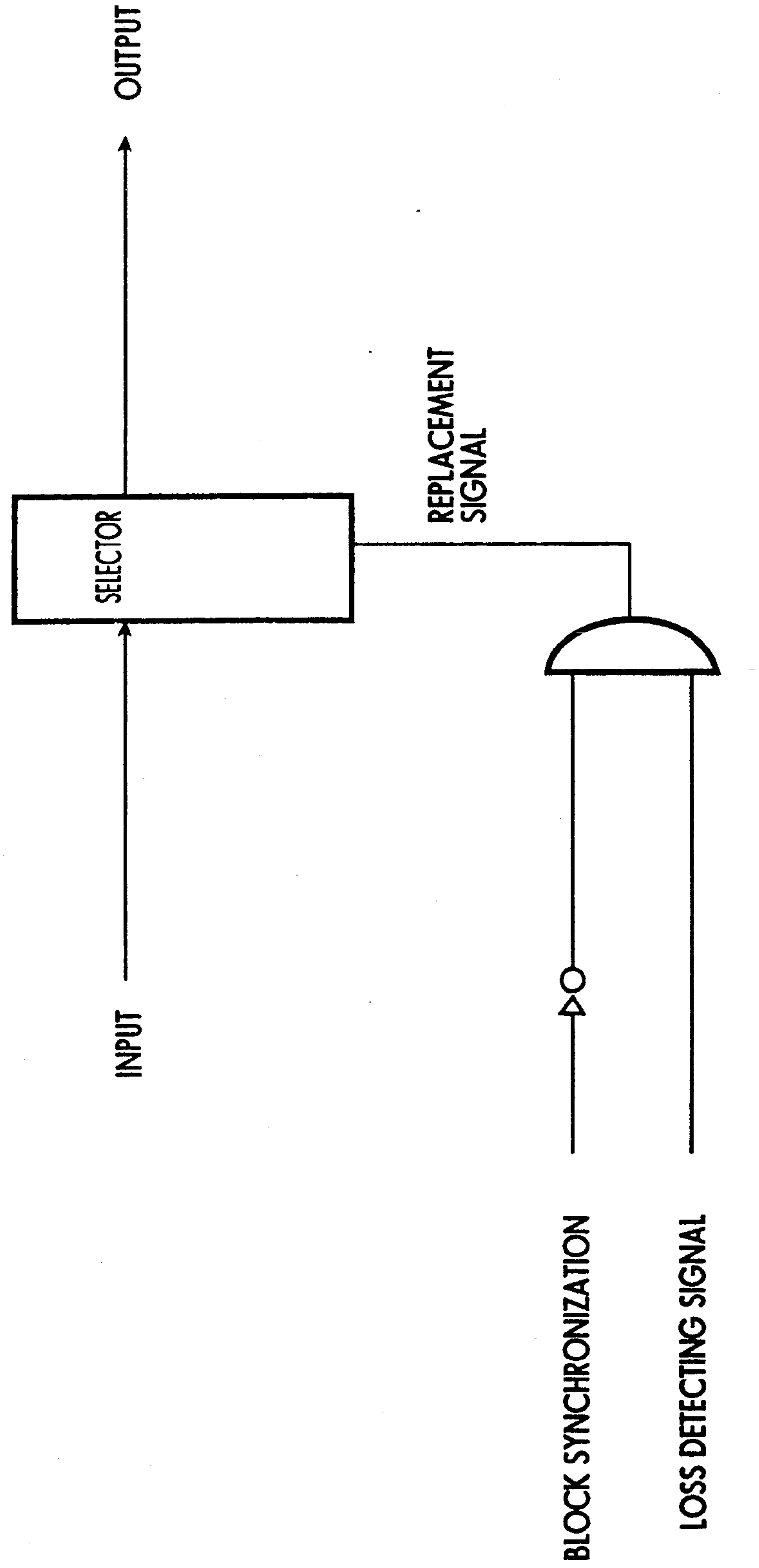
Figure 48B:
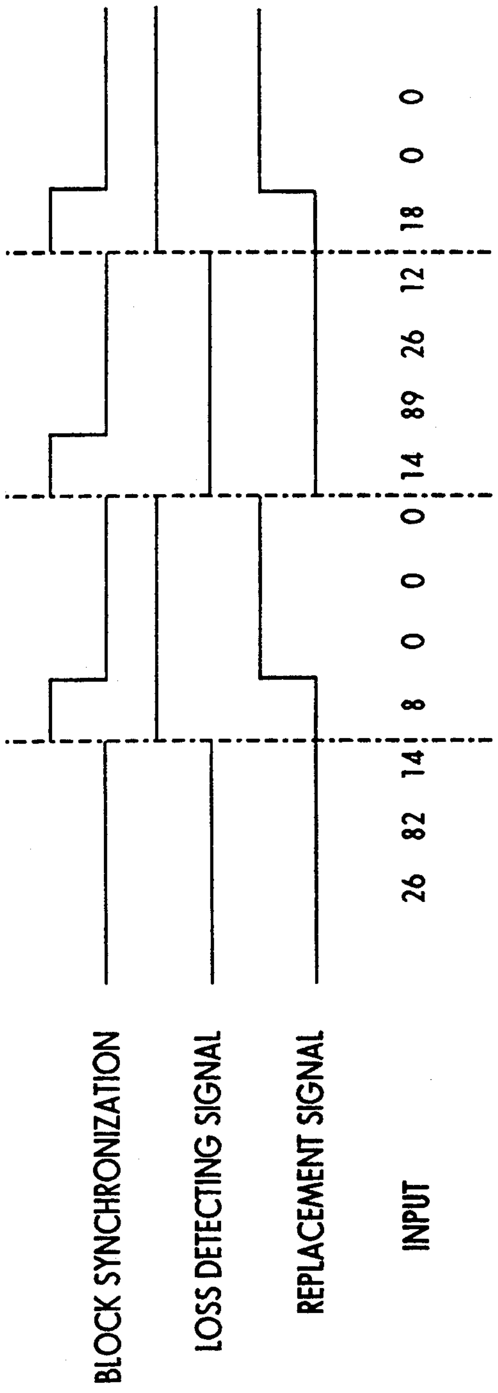
Figure 49:
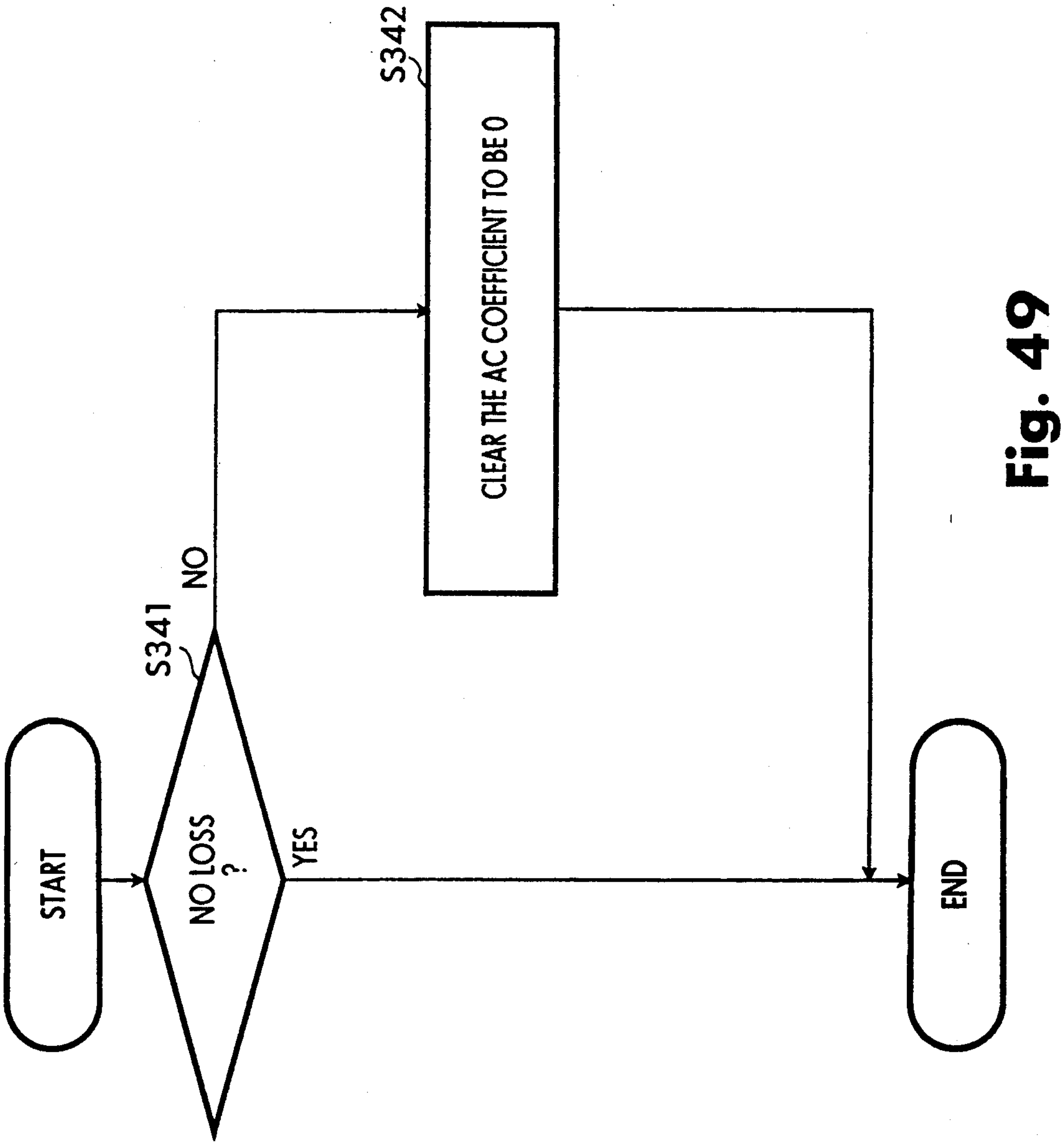
Figure 50:
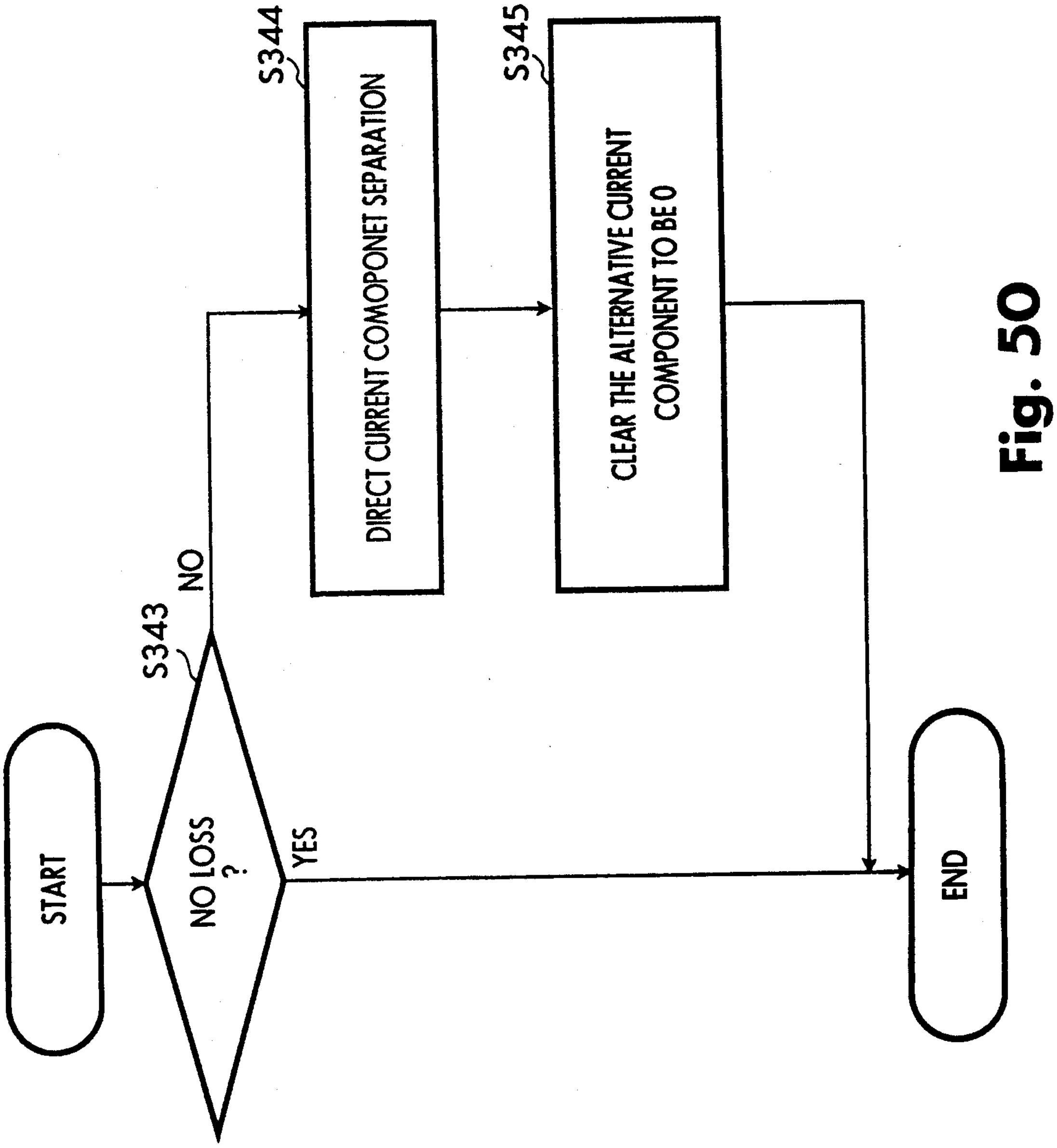

FIG. 1 shows a block diagram designating the whole structure of an image data transmission system using normal orthogonal transformation, FIG. 2 shows a transformation coefficient region after orthogonal transformation of the image data, FIG. 3A to 3C show views for explaining one problem of the prior art, FIG. 4A shows a block diagram for explaining the first principle of the present invention, FIG. 4B shows a block diagram for explaining the second principle of the present invention, FIG. 4C shows a block diagram for explaining the third principle of the present invention, FIG. 5 shows a block diagram of the whole structure of an embodiment of an image data transmission system, FIGS. 6A to 6S show block diagrams describing the basic structure of an embodiment according to various coding methods, FIG. 7A and 7B show block diagrams of the first embodiment of the present invention, FIG. 8A to 8C show flowcharts of the process conducted in the first embodiment, FIG. 9A and 9B show block diagrams of the second embodiment of the present invention, FIG. 10 shows a flowchart of the process of compensation for the loss in the second embodiment of the present invention, FIG. 11A and 11B show block diagrams of the third embodiment of the present invention, FIG. 12A and 12B show flowcharts of the process of the third embodiment of the present invention, FIG. 13A and 13B show block diagrams of the fourth embodiment of the present invention, FIG. 14 shows a flowchart of the process of compensation for loss in the first embodiment of the present invention, FIG. 15A and 15B show block diagrams of the fifth embodiment of the present invention, FIG. 16A and 16B show block diagrams of the sixth embodiment of the present invention, FIG. 17 shows a flowchart of the process of compensation for loss in the sixth embodiment of the present invention, FIG. 18 shows a view of an embodiment of a transmission system using block data and replacement information, FIGS. 19A and 19B show views for explaining the concept of compensation for loss in the third embodiment of the present invention, the compensation for loss being for the coefficient region, FIG. 20A and 20B show views for explaining the concept of compensation for loss in the third embodiment of the present invention, the compensation for loss being for the picture element region, FIG. 21 shows a block diagram of the whole structure of the image data transmission system of the third embodiment of the present invention, the image data transmission system being for the coefficient region, FIGS. 22A and 22B show diagrams of an example of direct current component data on the transmission and receiving sides according to the third embodiment of the present invention, FIG. 23 shows block diagram of the whole structure of the image data transmission system of the third embodiment of the present invention, the image data transmission system being for the picture element region, FIGS. 24A and 24B show explanatory views of large/small judging portion in an embodiment of the present invention, FIG. 25 shows a flowchart of the process of the large/small judging portion in the third embodiment of the present invention, FIG. 26 shows a flowchart of the process of the loss compensation unit in the third embodiment of the present invention, FIGS. 27A and 27B show concept of loss compensation in the image region in the fifth embodiment of the present invention, FIGS. 28A and 28B show examples of the data of the direct current component on the transmission and receiving sides in the sixth embodiment of the present invention, FIGS. 29A and 29B show an embodiment of the loss compensation unit in the coefficient region, FIG. 30 shows a flowchart of the process of the large/small judging portion in the sixth embodiment of the present invention, FIG. 31 shows a flowchart of the process of the loss compensation portion in the sixth embodiment of the present invention, FIGS. 32A and 32B shows views for explaining the concept of loss compensation in the picture element region in the seventh embodiment of the present invention, FIGS. 33A and 33B shows views for explaining the concept of loss compensation in the coefficient region in the eighth embodiment of the present invention, FIGS. 34A and 34B show an example of direct current component data on the receiving and transmitting sides in the eighth embodiment of the present invention, FIG. 35 shows a flowchart of the process of the amplitude judging unit in the eighth embodiment of the present invention, FIG. 36 shows a flowchart of the process of the loss compensating portion in the eighth embodiment of the present invention, FIGS. 37A and 37B show views for explaining the concept of the loss compensation in the coefficient region in the ninth embodiment of the present invention, FIG. 38 shows a view for explaining the method of setting a frequency band in a coefficient region in the sixteenth and seventeenth embodiments of the present invention, FIGS. 39A to 39D show views for explaining the concept of loss compensation for three coefficients of the minimum frequency group in the sixteenth embodiment of the present invention, FIGS. 40A and 40B show an example of coefficient data of the minimum frequency group in the sixteenth embodiment of the present invention, FIG. 41 shows an example of coefficient data compensated on the receiving side in the seventeenth embodiment of the present invention, FIG. 42 shows a flowchart of the process of the magnitude judgment portion in the sixteenth embodiment of the present invention, FIG. 43 shows a flowchart of the process of the loss compensation unit in the sixteenth and seventeenth embodiments of the present invention, FIGS. 44A and 44B show views for explaining the concept of loss compensation in the eighteenth embodiment of the present invention, FIGS. 45A and 45B show views for explaining the concept of loss compensation in the nineteenth embodiment of the present invention, FIGS. 46A to 46C show an example of block data in the eighteenth embodiment of the present invention, FIGS. 47A to 47C show example of block data in the nineteenth embodiment of the present invention, FIGS. 48A and 48B show portions of a loss compensation in the eighteenth embodiment of the present invention, FIG. 49 shows a flowchart of the process of the loss compensation unit in the eighteenth embodiment of the present invention, and FIG. 50 shows a flowchart of the process of the loss compensation unit in the nineteenth embodiment of the present invention.

DETAILED EXPLANATION OF THE PREFERRED EMBODIMENTS

FIGS. 4A to 4C designate the first to third principle structures of the present invention, respectively.

In FIGS. 4A to 4C, 11 is a transmission side apparatus, 12 is a block forming unit, 13 is a coding unit, 20 is a means for outputting a signal designating a loss compensation method, 21 is a replacement information outputting means, 14 is a multiplex and packet assembly unit, 15 is a receiving side apparatus, 16 is a packet disassembly unit, 22 is a loss detecting means, 17 is a decoding unit, 23 is a loss compensating unit, and 18 is an inverse blocking unit.

In FIG. 4A, a signal designating the loss compensation method is outputted in accordance with the kind of the present coded data from the transmission side. When the loss of the packet is detected on the receiving side, loss compensation is performed in accordance with a signal designating the loss compensation method. As shown in FIG. 4B, by transmitting replacement information in addition to the loss compensation method designating signal from the transmission side, loss compensation is performed by using the replacement information upon detecting the loss on the receiving side. In FIG. 4C, only the coded data is transmitted from the transmission side and when the packet loss is detected on the receiving side, the loss compensation is performed by using the predetermined compensation method.

In FIG. 4A, in transmission side apparatus 11, the input image data (which is digitized) is formed into a block comprising a plurality of picture elements (for example, 4×4 picture elements) by a block forming unit 12. The block data is coded in a coding unit 13 using one of the various prior art coding methods. At this time, the loss compensation method designating signal is output in accordance with the kinds of the present coded data from the loss compensation method designating signal output means 20. Where a coding system is adaptively selected as the loss compensation method designating signal for inter-frame, intra-frame, a movement compensating frame or a simple frame, a signal for displaying the coding system currently selected is utilized. Where a predetermined coding system is used, a signal designating that the difference between the previous block and the current block is large or small or a signal designating a direct current component (or an average value) of the difference is used. Further, a signal relating to the brightness or the color difference of the color is used. Various signals can thereby be used in accordance with the coding method.

These coded data and a signal designating the loss compensation method are converted to packet (or cell) of fixed or variable length in multiplex and packet assembly unit 14 and are sequentially multiplexed to be transmitted on the transmission line. The signal designating the loss compensation method is provided with an identification code to be distinguished from coded data.

The packet data input from the transmission line is resolved by the packet disassembly unit 16 of the transmission side apparatus 15, divided into coded data and a signal designating the loss compensation method, and then output. The packet disassembly unit 16 simultaneously detects in the packet loss detecting means 22 whether the packet loss occurs and supplies detecting results to decoding unit 17.

The method of adding a through number on the transmission side and checking the number, or a method of receiving a loss informing signal from an exchange on the transmission line are provided as a method of detecting the packet loss.

The coded data and the signal designating the loss compensation method resolved by the packet disassembly unit 16 and the output of the loss detecting means 22 is input to the decoding unit 17. When a signal detecting the loss is input from the packet disassembly unit 16, the loss compensation means 23 performs a compensation designated by a signal designating the loss compensation method. In this case, the content of the loss compensation corresponding to the signal designating the loss compensation method is previously determined between the transmission side and the receiving side. When the signal designating the loss compensation method is received, the receiving side performs the process in accordance with the designation and restores or reproduces a signal similar to the lost block.

For example, where a signal representing the magnitude of the difference between blocks is transmitted as a signal designating the loss compensation method, a compensation is performed using a signal enlarged by a predetermined ratio when the difference between the current block data and the previous block data is large, using the previous block data when the difference between the current block data and the previous block data is small. The output of decoding unit 17 is converted from the block to the original image signal by the inverse block forming unit 18 and outputted.

The operation of the second principle shown in FIG. 4B is explained. As in FIG. 4A, on the transmission side, the image data formed into a block is coded in the coding unit 13. In this case, the loss compensation method designating signal output means 20 outputs a signal designating the loss compensation method and the replacement information output means 21 outputs the replacement information for performing an adequate data loss compensation on the receiving side. Respective signals from the coding unit 13 are packets (cells) multiplexed in the multiplex and packet assembly unit 14 and are output on the transmission line.

The replacement information output by the replacement information output means 21 is used to restore or reproduce the block which is lost when packet loss occurs and is used on the receiving side. The replacement information used in place of the lost block information utilized for arithmetic processing for restoration or various information corresponding to the coding system currently carried out in the coding unit 13 are used.

The receiving side apparatus 15 resolves the packet into coded data, a signal designating the loss compensation method and replacement information, and the loss detecting means 22 detects the loss of the packet (cell) by using a method illustrated in FIG. 4A.

The signal from the packet disassembly unit 16 is input to the decoding unit 17 and the coded data is decoded. The desposal compensation means 23 receives a loss detecting signal from the packet disassembly unit 16, and upon an occurrence of a loss detecting signal performs a compensation (restoration) process designated by the loss compensation method designating signal for the lost block by using replacement information.

The signal subject to loss compensation is converted to the original image signal by the inverse block forming unit 18 and output.

The replacement information used in FIG. 4B, is formed in accordance with the coding system and the loss compensation method in respective coding systems. As the replacement information, there are used the current block data in a frame, the difference between the current block data and the block data in the previous frame with regard to the same position, direct current components of the current block data as a result of discrete cosine transformation, the difference between the direct current component of the present block and the direct current component of the block in the previous frame with regard to the same position, the alternative current component of the present block, the difference between the alternative current component of the present block and the alternative current component of the block in the same position in the previous frame as in the present frame, a low frequency component of the present block and the difference between the low frequency component of the present block and the low frequency component of block in the same position in the previous frame as in the present block.

FIG. 4C shows the third principle. In this case, only a coded data is received from the transmission side of the system through a transmission line. At the receiving side apparatus 15, the coded data from the transmission line is input to the decoding unit 17 and input to the loss detecting means 22. The loss detecting means 22 inputs a loss detecting signal detecting a loss of a packet or cell to the loss compensation means 23 within the decoding unit 17.

Input coded data is decoded by the decoding unit 17. When the loss compensation means 23 receives a loss detecting signal from the loss detecting means 22, it performs a loss compensation in accordance with the previously determined compensation method for the lost block. Thus, a signal subjected to the loss compensation is converted to the original image signal by the inverse block forming unit 18.

In FIG. 4C, as the predetermined loss compensation methods, where an input image data is transmitted as coefficient data in the orthogonal transformation coefficient region by an orthogonal transformation such as a discrete cosine transformation, the data obtained after decoding a coefficient area of the block in the same position in the previous frame as in the frame including the lost block is processed when a loss of data is detected after all the coefficients representing the AC component is cleared to 0.

FIG. 5 shows a block diagram of the whole structure of an embodiment of the image data transmission system according to the present invention. It shows a form included in all three principle structures shown in FIGS. 4A to 4C. It shows an example of a system in which an orthogonal transformation such as a discrete cosine transformation is applied to image data in a picture element region formed in a block to provide coded data in a coefficient region. The orthogonal transformation unit 24 is provided in the transmission side apparatus 11 and the inverse orthogonal transformation unit 25 is provided in the receiving side apparatus 15. In a system in which an orthogonal transformation is not performed and image data in a picture element region is coded as it is and transmitted, the orthogonal transformation unit 24 does not exist. The output of block forming unit 12 is input to a coding unit 13 in the transmission side apparatus 11 and the output of the decoding unit 17 is input to the inverse block forming unit 18 in the receiving side apparatus 15 without being changed.

FIG. 6 shows a principle structure block diagram of an embodiment of the present invention corresponding to various coding methods. FIG. 6 shows the loss compensation method designating signal output means 20, the replacement information output means 21 and the loss compensation means 23 in the decoding unit 17 on the receiving side and explains their operation.

FIG. 6A shows the first embodiment. This embodiment includes a intra-frame/inter-frame judging means 30 which corresponds to a loss compensation method designating signal output means and is provided on the transmission side. According to this embodiment, a method of adaptively switching intra-frame code and inter-frame code as a coding method for an image data transmission system is used. Intra-frame/inter-frame judging means 30 determines which codes of inter-frame data and intra-frame data input is the most appropriate, i.e., which is shorter, and transmits the selecting signal for selecting either of an intra-frame coding or an inter-frame coding. This selecting signal is then transmitted to the receiving side as the loss compensation method designating signal. Where a great change such as a scene change occurs on an image of a frame, the inter-frame coding system is utilized. When the change is small, intra-frame coding is selected.

On the receiving side of FIG. 6A, loss compensation means 31 receives coded data and intra-frame/inter-frame selection information from the packet disassembly unit 16; the selection information comprising packet loss detecting signal which becomes "1" upon detection of the loss, for example; and previously received direct current data of the adjacent block.

The loss compensation means 31 ① performs an ordinary process for outputting the present block data when loss does not occur, ② outputs direct current data in the same position in the previous frame as in the present frame as block data upon detection of a loss where intra frame coding is selected, and ③ outputs the direct current data of the adjacent block input as the block data upon detection of a loss where inter-frame coding is selected.

FIG. 6B shows a block diagram of the second embodiment. In FIG. 6B, on the transmission side, the intra-frame/inter-frame judging means 30 is provided as the loss compensation method designation signal output means in the same manner as in the first embodiment. The loss compensation means 32 on the receiving side inputs the same signal as that received by the loss compensation means shown in FIG. 6A except for the current data of the adjacent block.

The loss compensation means 32 ① performs an ordinary process when there is no loss, ② outputs a alternative current component of the block in the same position in the previous frame as in the present frame as the alternative current data of the present block when the intra-frame coding is selected and the loss is detected, and ③ clears the alternative current component of the block to 0 and outputs it when the inter-frame coding is selected and the loss is detected.

FIG. 6C shows a block diagram of the third embodiment. In FIG. 6C, the large/small relation information transmission means 33 on the transmission side corresponds to the loss compensation method designating signal output means and receives the difference between the direct current component of the present block and that of the block in the same position in the previous frame as in the present frame, and a threshold value for determining the amplitude of the difference and the threshold value for determining the large/small relation of the difference. Then the large/small relation information obtained from the judgment is transmitted to the receiving side.

Loss compensation means 34 on the receiving side inputs the coded data, amplitude relation information and the direct current component of the adjacent block. It ① performs the ordinary process when there is no loss, ② outputs the direct current component of the previous frame when the difference between the direct current component of the present block and that of the block in the previous frame is small and the loss is detected, and ③ outputs the direct current component of the adjacent block as the direct current component of the present block when the difference between the present frame and the previous frame is large and the loss is detected.

FIGS. 6D and 6E show the embodiment in which the inter-frame/intra-frame coding is adaptively selected and the loss compensation method designating signal and replacement information are transmitted (corresponding to the second principle structure shown in FIG. 4B).

FIG. 6D shows the configuration in which the coding unit 13 on the transmission side apparatus (as shown in FIG. 4B) performs either one of the coding methods based on the result obtained by the intra-frame/inter-frame judging unit 30 and transmits the selection information as the loss compensation method designating signal. When the direct current data of the block (the average level data) is input to replacement information output means 35, the replacement information of the current data occurs as the output and is transmitted.

On the receiving side, the loss compensation means 36 receives coded data, intra-frame/inter-frame selection information, direct current replacement information and the loss detection signal from the packet disassembly unit 16, as shown in FIG. 4. Loss compensation means 36 ① performs the ordinary process where there is no loss, ② outputs the direct current data of the previous frame as block data upon detecting the loss when intra-frame (coding) is selected and ③ outputs the replacement information of the direct current component data as block data when the loss is detected upon detecting inter-frame coding.

The fifth embodiment, shown in FIG. 6E, transmits the replacement information by using a method of adaptive inter-frame/intra-frame switching using the same coding method as in FIG. 6D. The following point is different on the transmission side and the receiving side. On the transmission side, the replacement information output means 37 outputs the replacement information of the difference in the direct current data as the replacement information in response to the input of the direct current data of the present block and the direct current data in the same block, as in the previous frame. On the receiving side, where the loss compensation means 38 detects the loss and selects inter-frame coding, the sum of the current data of the previous frame and the replacement information is output as the block data (as the replacement information is the difference between the direct current data).

FIG. 6F shows a block diagram of the sixth embodiment. In FIG. 6F, a large/small relation information transmission means 33 corresponds to the loss compensation method designating signal output means in the same manner as in FIG. 6C. It transmits large/small relation information designating that the difference between the direct current component of the present block and that of the block in the same position in the previous frame is larger than a threshold value. A replacement information output means 39 transmits the direct current component of the present block for a block having the larger difference of the direct current component.

A loss compensation means 40 on the receiving side outputs the direct current component of the block in the same position in the previous frame as in the present frame where the loss is detected and the difference of the direct current component is small, and outputs the direct current component of the present block obtained as the replacement information on transmission side when the loss is detected and the difference of the direct current component is large.

FIG. 6G shows the seventh embodiment. When the seventh embodiment is compared with the sixth embodiment shown in FIG. 6F, a replacement information output means 41 on the transmission side transmits the difference between the direct current component of the present block and the direct current component of the block in the same position in the previous frame as in the present frame in state of the direct current component of the present block. The loss compensation means 42 on the receiving side outputs sums the differences between the direct current component of the block in the previous frame and the direct current component of the replacement information when the loss is detected and the difference of the direct current component is large.

FIG. 6H is a block diagram of the eighth embodiment. In FIG. 6H, a large/small relation information transmission means 43 corresponds to the loss compensation method designating signal output means Information designating whether the difference of the direct current component is large or not is transmitted as large/small relation information by using the difference between the direct current component of the input present block and that of the adjacent block and the threshold value for determining large/small. The replacement information output means 44 transmits the direct current component of the present block to a block in which there is a large difference between the direct current component of the present block and that of the adjacent block.

On the receiving side, a loss compensation means 45 outputs the direct current component of the adjacent block as the current data of a block in which there is a small difference between the direct current component of the present block and that of the adjacent block and in which the loss is detected. It outputs the direct current component of the present block transmitted from the transmission side for a block in which there is a large difference in the direct current component between the present block and the adjacent block and in which the loss is detected.

FIG. 6I shows a block diagram of the ninth embodiment. FIG. 6I is different from FIG. 6H in that replacement information output means 46 on the transmission side, transmits the difference in a direct current component between the present block and adjacent block as the replacement information regarding the block in which the difference in the direct current is large, and in that loss compensation means 47 on the receiving side transmits the sums of the direct current component of the adjacent block and the difference transmitted from the transmission side.

Next, the embodiment in which the coding system predicting movement between the frame of the image is used, is explained by referring to FIGS. 6J to 6M. In the first embodiment shown in FIG. 6J, where a coding of the movement vector is used in the coding unit 13, a large/small judgment means 48 for judging the movement to which the movement vector and the judgment threshold value are input on the transmission side determines whether the movement exceeds a predetermined value (namely, the judgment threshold value). The resulting large/small signal of the movement is used as the loss compensation method designating signal.

An embodiment for receiving the loss compensation method designating signal and performing the loss compensation corresponds to the first principle structure (FIG. 4A).

A loss compensation means 49 on the receiving side receives the data obtained by hoiding the current data of the adjacent block by the packet disassembly unit. Where the loss exists and the movement is small, it outputs the direct current component of the previous frame as the block data and, where the loss occurs and the movement is large, it outputs the direct current component of the adjacent frame as the block data.

Next, the transmission side has the structure described above. It produces the loss compensation method designating signal. Another structure of the receiving side is shown in the eleventh embodiment shown in FIG. 6K.

In this embodiment, a loss compensation means 50 on the receiving side receives coded data, a signal designating large/small movement (loss compensation method designating signal) and a loss detecting signal. Where the movement is small upon detection of the loss (as shown in 2 in the drawing), it outputs the AC component of the previous frame as AC data of the block. Where the movement is large, (as shown in 3 in the drawing) the AC component 0 is output (or the AC component is cleared).

FIGS. 6L to 6N show the embodiment in which the result of the large/small judgment of the movement is output as the loss compensation method designation signal and replacement information is simultaneously transmitted (corresponding to the second principle structure).

FIG. 6L shows the twelfth embodiment. The large/small judgment means 48 for judging large/small of the movement on the transmission side, determines the large/small of the movement vector and the judgment output as the loss compensation method designating signal. Further, replacement information output means 51 simultaneously outputs the replacement information of the direct current data based on the direct current data of the block.

On the receiving side, by using the replacement information of the received direct current data, a loss compensation means 52 of the decoding unit, outputs direct current data of the previous frame as the block data where the loss occurs and the movement is small, as shown in 2 in the drawing, when the loss detecting signal is input. It outputs the replacement information of the direct current data as block data where the loss exists and the movement is large, as shown in 3 in the drawing. In FIG. 6M designating the thirteenth embodiment, the large/small judgment means 48 for movement on the transmission side judges the movement vector and the judgment output is treated as the loss compensation method designating signal. Large/small judgment means 48 simultaneously outputs replacement information of the difference in the current data by obtaining the difference in the direct current data of the input block and the direct current data of the same block in the previous frame. The loss compensation means 54 in the decoding unit on the receiving side outputs the direct current data of the previous frame as block data where the loss is detected from the loss detecting signal input and the movement is small, as shown in 2 in the drawing by using the received coded data, the large/small of the movement (loss compensation method designating signal) and the replacement information of the difference between the current data. Where the loss is detected and the movement is large, as shown in 3 in the drawing, the direct current component of the present frame is output as block data.

FIG. 6N shows a block diagram of a fourteenth embodiment. As shown in FIG. 6N, large/small judgment means 48 transmits a large/small movement signal in the manner shown in FIGS. 6L and 6M. The replacement information output means 55 receives the direct current component of the present block and the direct current component of the adjacent block and transmits the difference between the direct current component of the present block and that of the adjacent block as the replacement information to the receiving side.

On the receiving side, where the loss is detected and the movement is small, the loss compensation means 56 outputs the direct current component of the present block in the same position as in the previous frame as the block data. Where loss is detected and the movement is large, it outputs the sum of the differences between the direct current component of the adjacent block in the present frame and the direct current component transmitted from the transmission side.

FIG. 6O is a block diagram of the fifteenth embodiment. This embodiment shows the case where discrete cosine transformation coding (DCT), a kind of orthogonal coding, is used as a coding system. On the transmission side, where the difference between the input DCT coefficient and the previous frame is DCT coefficient is input as the intra-frame data, the comparing means 57 for comparing the sum of the powers of the difference and the threshold value and which corresponds to the loss compensation method designation signal output means obtains. The sum of the second powers of the difference for all the AC coefficients without considering the DC component. The comparing means 57 compares the sum value with the predetermined judgment threshold value and determines whether or not the value of the sum is larger than the threshold value. The judgment result is then transmitted as the loss compensation method designation signal.

On the receiving side, the loss compensation means 58 receives coded data and compares it with the threshold value. Where the existence of the loss is input based on the loss detecting signal and the value is a signal designating that the second power sum is smaller than threshold value, the AC component of the previous frame is output as the AC data of the block. Where the existence of the loss is input and a signal designating that the second power sum is larger than the threshold value is input, an AC component of 0 is output.

FIG. 6P is a block diagram of the sixteenth embodiment. In FIG. 6P, coefficient large/small relation transmission means 59 on the transmission side corresponds to the loss compensation method designating signal output means. In the sixteenth and seventeenth embodiments, the picture element data formed in a block is orthogonally transformed and coded data in the orthogonal transformation coefficient region is transmitted. Further, a plurality of coefficients representing a frequency component from the direct current component to the high frequency component in the orthogonal transformation coefficient region is divided into a plurality of groups corresponding to a plurality of frequency bands. A compensation is performed for the frequency coefficient of the group with the lowest frequency.

The coefficient large/small relation transmission means 59 receives the difference between a plurality of coefficients in a group with a low frequency and a plurality of frequency coefficients corresponding to blocks in the same position in the previous frame as in the present frame including the present block and the information designating whether the difference is larger than the predetermined threshold value or not is transmitted to the receiving side as large/small relation information. The replacement information output means 60 transmits the low-frequency component of the lowest frequency group of the present block as the replacement information for the compensation on the receiving side.

Loss compensation means 61 on the receiving side outputs the low-frequency component of the block in the same position in the previous frame as in the present frame as the low frequency component of the present block when the loss is detected and the difference in the low frequency component is small, and outputs the low frequency component of the present block transmitted from the transmission side when the loss is detected and the difference in the low frequency component is large.

The seventeenth embodiments, shown in FIG. 6Q, performs a compensation of the low frequency component in the same manner as the sixteenth embodiment. The seventeenth embodiment is different from the sixteenth embodiment, shown in FIG. 6P, in that replacement information output means 62 on the transmission side transmits as replacement information, the difference between the low-frequency component of the present block and the low-frequency component of the block in the same position in the previous frame as in the present frame, The loss compensation means 63 on the receiving side then outputs the sum of the low-frequency components of the block in the same position in the previous frame as in the present frame and the replacement information as the low frequency component of the present block when the loss is detected and the difference in the low-frequency component is large.

FIGS. 6R and 6S show the embodiment corresponding to the third principle structure shown in FIG. 4C. FIG. 6R shows the eighteenth embodiment, which receives only coded data from the transmission side to the receiving side apparatus 15 shown in FIG. 5. The loss compensation means 64 in the decoding unit 17 on the receiving side performs the normal process, i.e., it outputs the decoded output data to the inverse orthogonal transformation unit 25 as it is where the loss does not occur. It then clears all the coefficients representing the AC component of the corresponding block in the previous frame to 0 and outputs the present block data when the loss is detected.

The nineteenth embodiment, shown in FIG. 6S, transmits only the coded data from the transmission side, in the same manner as in the eighteenth embodiment. This embodiment corresponds to the case where the orthogonal transformation is not used and data of the image region is transmitted as is after being coded. The loss compensation means 65 on the receiving side performs the ordinary process and outputs the decoded data as is to the inverse block formation unit 18 shown in FIG. 5 when the loss is not detected. The loss compensation means 65 obtains an average of the data corresponding to all the picture elements forming a corresponding block in the previous frame to clear the AC component of the present block to 0. It then outputs the average value as the data for all the picture elements.

The image transmission system of the present invention will be more concretely explained by selecting a representative coding system, for example, from the block diagrams of the embodiments shown in FIGS. 6A to 6S.

FIG. 7 is a block diagram of a first concrete structure of the present invention. FIG. 7A shows the transmission side and FIG. 7B shows the receiving side. FIG. 8 shows a flowchart of the process in the first concrete structure shown in FIGS. 7A and 7B.

The first concrete embodiment corresponds to the second principle structure and uses a coding system for adaptively selecting a method for intra-frame/inter-frame coding and transmits replacement information for compensating a lost packet from the transmission side. The operation of the first concrete embodiment will be explained by referring to FIGS. 7A and 7B and FIG. 8.

As shown in FIG. 7A, distributed cosine transformation circuit 70 (DCT) performs a well-known distributed cosine transformation of data formed into a block. The direct current component (DC) in the transformed output is quantized by a quantizing circuit (represented by Q1) separately from the ordinal coding. It is then formed into replacement information as fixed-length coding (for example, coding only upper 4 bits) by a fixed-length coding circuit (represented by FLC) 72, and is thereby input to multiplexing circuit (represented by VMUX) 73.

One of the direct-current components is input to a judgment unit 74 for the direct-current intra-frame/inter-frame. The other direct-current component is input to a subtracting circuit 75. The subtracting circuit 75 obtains the difference between the present frame data and the previous frame data output from frame memory (FM) 76 and is supplied to judgment unit 74.

The judgment method of judgment unit 74 is shown in FIG. 8A. In this case, the inter-frame data is subject to a fixed length coding (called FLC) of 8 bits.

Firstly, the code length is obtained when the inter-frame data is subjected to variable length coding (S1). It is judged whether the code length is less than 8 bits (S2). If it is, the S3 inter-frame coding is performed. If it is not the S4 inter-frame coding is performed.

The direct current intra-frame/inter-frame selection signal obtained from the above judgment is input to the multiplexing circuit 73 as the loss compensation method designating signal for the DC. The coded data obtained through the judgment by judging unit 74, namely, intra-frame coding data or inter-frame coding data, is quantized by quantizing circuit (Q2) 77 and coded by either the variable length coding circuit (VLC) or the fixed length coding circuit (FLC) 78 based on the selection by judgment unit 74. It is then supplied to the multiplexing circuit 73 as DC data. Switch 79 (SW1) provides the output of the frame memory 76 to adder 80 in case of intra-frame coding and provides ground potential to adder 80 in case of inter-frame coding. Adder 80 adds the outputs of switch 79 and digitizing circuit to be output to frame memory 76.

Similarly, the AC component from DCT 70 is input to unit 81 for judging intra-frame/inter-frame for the AC current. It is also input to subtracting circuit 82, which obtains the difference between the present frame data and the previous frame data (AC component) output from frame memory (FM) 83 and supplies it to judging unit 81.

The judgment method conducted in judging unit 81 is shown by the flowchart of FIG. 8B.

First the sum of the second powers of all the AC current coefficients of the inter frame (ΣINTER) is obtained (S5). Next, the sum of the second powers of all the AC current coefficients of the intra-frame (ΣINTRA) is obtained (S6). Next, the ΣINTER <ΣINTRA judgment is conducted (S7) and if YES, i.e., ΣINTER is smaller than ΣINTRA, inter-frame coding is performed (S8). If NO, i.e., ΣINTRA is smaller than ΣINTER, intra-frame coding is selected (S9).

The selection signal (AC INTRA/INTER) for selecting the AC intra-frame/inter-frame obtained from the judgment, is input to multiplexing circuit 73 as the AC loss compensation method designating signal. The AC data coded by the selected method is quantized by quantizing circuit (Q3) 87 and is coded by a variable length coding circuit 84 and input to multiplexing circuit 72 as AC data. The operation of switch 85 and adder 86 is the same as that of switch 79 and adder 80.

The multiplexing circuit 73 performs a transmission line coding and multiplexes the data required for the usual decoding, namely, for the case of nonloss of the data, such data comprising DC INTRA/INTER, DC data, AC INTRA/INTER and unique word of VLC, for example. It then outputs the multiplexed data as coded data. It also outputs DC INTRA/INTER data as the DC compensation designation signal and the output data from quantizing circuit (Q1) 71 as replacement information in case of INTER.

The multiplexed information is transmitted to the receiving side in packet units (cell) through a network transmission line.

The decoding unit on the receiving side, shown in FIG. 7B, receives the loss detecting signal from the packet disassembly unit (16 as shown in FIG. 4). The multiplexing separation circuit 90 receives various signals, such as the coded data and separate frame, so that the decoding and loss compensation are performed.

The loss compensation control unit 91 controls the loss compensation based on the loss detecting signal, respective signals of DC compensation designation and the AC compensation designation, and the loss detecting signal. The process flow is shown in FIG. 8C.

It is judged (S11) by reading the loss detecting signal whether or not the loss is detected. If the loss does not occur, switch (SW3) 92 is connected to the adder (shown by +) 93 (S12), and switch (SW5) 94 is connected to adder (shown by +) 95 (S13).

When it is judged at S10 that loss has occurred it is judged whether or not the data is DC intra-frame coded (S14). If it is (YES), switch (SW3) 92 is connected to adder 93 (S15). If it is not (NO), switch (SW3) is connected to decoder 96 for the replacement information (S16). It is judged sequentially whether the data is AC current frame (S17). If it is (YES), switch SW5 is connected to adder 95. I it is not (NO), switch SW5 is connected to ground, thereby compensating the lost packet. The DC and AC outputs of switches SW3 and SW5 are returned to the original block coding by the inverse distributing cosine transformation circuit (IDCT) 97 and further converted to the original image signal by another circuit (not shown).

As shown in FIG. 7B, switches SW4 and SW6 (98 and 99) select whether the output of frame memory (FM) 100 or 101 is added to the difference of the direct current component and the AC component. They are respectively composed of a DC INTRA/INTER signal and an AC INTRA/INTER signal from the multiplexing separation circuit 90. That is, for inter-frame coding, the output of frame memories 100 and 101 are respectively input to adders 93 and 95. Decoders 102 and 103, respectively, decode the input DC and AC data, respectively.

FIG. 9 shows the second concrete example. This example is a method for performing a loss compensation by sending the loss compensation method designation signal and the replacement information from the transmission side. In the structure shown in FIG. 7A, the value of the direct component of the distributed cosine transformation circuit (DCT) 70 is quantized as is as the replacement information. However, in the structure shown in FIG. 9A, the difference between the direct current components of the previous frame and the present frame is obtained by subtracting circuit 75, whose output is quantized by the quantizing circuit 105 and is subject to a variable length coding by the coder 106.

The structure on the receiving side of FIG. 9B is different from that shown in FIG. 7B, in that the DC data of the output of the decoder 108 is replaced by the output of decoder 107 by switch 109 and added to the DC data of the previous frame by adder 110. The process flow of the loss compensation by the loss compensation control unit 111 is shown in FIG. 10.

Namely, it is judged whether the loss occurs (S21). If it does not, switch (SW3) 109 is connected to DC data side as the output of decoder 108 (S22) and switch (SW5) 94 is connected to +(adder 95 side) (S23). If it does, it is judged whether the DC intra-frame coding is conducted (S24). If it does (YES), switch (SW3) 109 is connected to the DC data side (S25). If it does not (NO), switch (SW3) is connected to the replacement information as the output of the decoder 107 (S26) and DC replacement information is added to the output of the frame memory FM 100, which provides the DC output. Next, it is judged whether the data is AC intra-frame coding (S27). If it is (YES), switch (SW5) is connected to +(adder 95 side) (S28). If it is not (NO), switch (SW5) is connected to ground (GND), shown in the lower part (S29).

The third concrete example is shown in FIG. 11. In this example, the compensation designating signal (DC INTRA/INTER) is output from the transmission side with regard to the DC component of the output of discrete cosine transformation circuit (DCT) 70. With regard to the AC component, large/small judgment unit 115 performs a control of the AC component in accordance with the flowchart for large/small judgment shown in FIG. 12A.

In the flowchart, first, the sum of the second powers of all AC intra-frame (ΣINTRA) coefficient is obtained at S31 and compared with the threshold value (TH) at S32. Thus, it is judged whether the sum of the second powers is smaller than the threshold value and the result of the judgment is output in S33 or S34. Then the output signal is transmitted as the AC compensation designation signal.

The receiving side shown in FIG. 12B is controlled by the flowchart of the loss compensation unit 67.

Firstly, it is judged at S35 whether the loss occurs. If it does not, switch (SW2) 116 is connected to +(adder 93 side) at S36. Next, switch (SW4) 94 is connected to +(adder 95 side) at S37. If it does, it is judged at S38 whether the data is DC intra-frame. If it is (YES), switch SW2 is connected to +(adder 93 side) at S39. If it is not (NO), switch SW2 is connected to the output side of the adjacent block from frame memory 100 at S40.

It is judged at S41 whether or not the content of the AC compensation designation signal is smaller than the threshold value (TH). If it is (YES), the switch (SW4) 94 is connected to +(adder 95 side) at S42. If it is not (NO), the switch (SW4) is connected to GND at S43.

FIG. 13 is the fourth concrete example. In the coding unit on the transmission side shown in FIG. 13A, when the subtracter 120 receives the input block data in the coding unit on the transmission side shown in FIG. 13A, the difference between the block data of the present frame and the corresponding block data of the previous frame, which is output from frame memory 121 and is delayed by variable delay circuit 123 under the control of movement detecting unit 122, is obtained. This difference is quantized by quantizing circuit 124 and the block data are thus produced from variable length coding circuit (VLC) 125. Movement detecting unit 122 produces a movement vector by comparing the input block data with the adjacent block data in the previous frame. It then transmits the value of the movement vector so that the value of the movement vector is input into the large/small judgment unit 126 is compared with the threshold value TH, thereby outputting the result of judging a large/small movement as the compensation designating signal. The output of the movement detecting unit 122 controls the delay time of the variable delay circuit 123 and determines a block of the previous frame, which can be used to obtain the difference between the block of the present frame and the block of the previous frame. The DC component is separated by DC separation unit 127 from the ordinary coding operation conducted by 124, and is quantized by quantizing circuit (Q2) 128, thereby outputting 4 bits of replacement information from the fixed length coding circuit (FLC) 129. The replacement information is output from the multiplexing unit 130 when the output of the large/small judgment of the large movement or small movement designates that the movement is large.

Multiplexing unit (VMUX) 130 multiplexes the data necessary for usual decoding, namely, decoding in case of no loss. The data comprises movement vector, block data, and unique word of VLC, for example, and multiplexed data is output as coded data.

The decoding unit on the receiving side shown in FIG. 13B controls the loss compensation by the process flow of the loss compensation shown in FIG. 14B by the loss compensation control unit 131. However, it is judged at S45 whether a loss is detected If it is not, switch (SW1) 132 is connected to the DC output side of the AC/DC separation unit 133 at S46, and then switch (SW2) 134 is connected to the AC output side of separation unit 133 at S47. If it is, it is judged by detecting the loss compensation method designating signal at S48 whether the movement is large or not. If it is small, switch SW1 is connected to the DC output side of AC/DC separation unit 133 at S49 and further, switch SW2 is connected to the AC output side at S50. If the movement is large, switch SW1 is connected to the replacement information, namely, the output of decoder 135, at S51 and switch SW2 is connected to ground (GND) at S52. As shown in FIG. 1 3, the block data from multiplexing separation circuit 136 is decoded by decoder 137 and added to the output of the variable delay circuit 139 and adder 140. This is because the output of the variable delay circuit 139 is obtained by delaying the output of frame memory 1 38 in accordance with the magnitude of the movement vector and the output of the variable delay circuit 139 is input to AC/DC separation unit 133. The outputs of switches 132 and 134 are multiplexed by AC/DC multiplexing unit 141 and output as output data.

FIG. 15 shows the fifth concrete example of the structure. The fifth concrete example is different from the structure shown in FIG. 13A in that the DC replacement information produced on the transmission side is obtained by providing the difference between the output of the DC separation circuit 127 and the DC separation signal separate from the other DC separation unit 144 and formed in the previous frame signal from the frame memory FM 121 by using subtracter 145 and quantizing the difference by quantizing circuit (Q2) 128.

On the receiving side shown in FIG. 15B corresponding to the structure shown in FIG. 15A, the loss compensation control unit performs the process flow in the same manner as in FIG. 14. If a loss exists and the movement is large, replacement information decoded by decoder 135 is added to the DC separation unit 147 of the output of the previous frame from frame memory 138 and is added to adder 148.

The sixth concrete structure shown in FIG. 16 is to use the coding system using the movement vector in the same manner as shown in FIG. 15. In FIG. 15, the loss compensation designation signal and the replacement information is transmitted for performing the loss compensation. However, the structure shown in FIG. 16 is different in that only the loss compensation method designation signal is transmitted and the replacement information is not transmitted (which corresponds the sixth concrete structure corresponding to the first principle shown in FIG. 4A).

On the transmission side shown in FIG. 16A, multiplexing unit (VMUX) 130 multiplexes data necessary for ordinary decoding (in which loss is not detected) such as movement vector, block data and VLC unique word and outputs them as coded data. The movement vector is compared with the threshold value TH and the signal representing whether the movement is large or small is transmitted as a loss compensation method designation signal.

The structure on the receiving side shown in FIG. 16B controls the process flow shown in FIG. 17 in the loss compensation control unit 151.

That is, it judges whether loss is detected or not (S55). If it is not, switch (SW1) 132 for selecting the DC component is connected to the DC output terminal of AC/DC separation unit 133 at S56 and further switch (SW2) 134 for selecting the AC component is connected to the AC output side from the AC/DC separation unit 133 at S57.

If it is detected, it is judged whether the large movement/small movement signal of the loss compensation method designation signal designates that the movement is small. If it does, switch SW1 is connected to the DC output side from the AC/DC separation unit 133 at S59 and further, switch (SW2) is connected to the AC output side of the AC/DC separation unit 133 at S60. If it designates that the movement is large, switch (SW1) is connected to the output side of the DC separation unit 147 of the data, namely, the output of FM of the adjacent block (S61) and the switch (SW2) is connected to the ground side (the upper side of SW2) at S62. If the movement is large, the block is restored.

An embodiment of a transmission system of replacement information for the loss compensating and the block data. As shown in FIG. 18, coded data for a plurality of (n) blocks is transmitted as a continuous packet. Different blocks are not mixed in one packet and dummy data is entered in the packet in the vacant area. The packet for transmitting the coded data, the replacement information for n blocks is transmitted as a packet. The replacement information is transmitted in a group separately from the coded data because this prevents coded data as well as replacement information from being lost.

A serial number is added at the head of the packet for transmitting the coded data and loss of the packet is detected by checking the number on the receiving side. A number not attached to the packet for transmitting the coded data is added to the packet for transmitting the replacement information, thereby enabling the replacement information and the coded data to be distinguished from each other. For example, for simplicity, suppose that 4 bits are added to the packet. 0001 is added to the packet as the replacement information and 0010, 0011, 0100, 0101. A more detailed explanation will be presented by showing concrete data with regard to several embodiments.

FIG. 19 shows a conceptional view of the third embodiment in the orthogonal transformation coefficient region, namely, the loss compensation shown in FIG. 6C.

In the third embodiment, only the information of the large/small relation designating whether the difference between the direct current component of the block being transmitted and the direct current component of the corresponding block in the previous frame is larger than the threshold value is transmitted to the receiving side, thereby to perform a compensation of the direct current component. FIG. 19 shows the uppermost left coefficient in the orthogonal transformation coefficient region, i.e., only the direct current component is shown. FIG. 19A designates the coefficient region after the decoding process in the ordinary case in which cell loss does not occur and FIG. 19B shows the coefficient region after the decoding process where cell loss does occur. If the fourth and fifth blocks are lost because of the cell loss, and the large/small relation information designating that the difference of the direct current component is large for the fourth block and that the difference of the direct current component is small for the fifth block is transmitted from the transmission side to the receiving side, then the value of the adjacent block, namely, the value of the direct current component in the immediately upper block in the present frame is used for the fourth block, and the direct current component of the corresponding block in the previous frame is used for the fifth block. In the drawing the upper stage shows the first to the third blocks and the lower stage shows the fourth to the sixth blocks.

FIG. 20 shows a conceptional view of the loss compensation in the picture element region in the third embodiment. In FIG. 20, only the average value of the picture element data within respective blocks, namely, the direct current component, is used for the first to the sixth blocks. FIG. 20A shows the direct current component of the respective block, namely, the average value after the decoding process, in the normal case where the cell loss does not occur in the manner shown in FIG. 19. FIG. 20B shows the average value in the picture element region after the decoding process where the cell loss occurs. Suppose that the fourth and the fifth blocks are lost and the large/small relationship of the direct current component is such that the difference is large for the fourth block and small for the fifth block. The average value of the immediately upper block in the present frame is used for the fourth block and the average value of the image data of the corresponding block in the previous frame is used for the fifth block.

FIG. 21 shows a block diagram of the whole structure of the image data transmission system in the orthogonal transformation coefficient region according to the third embodiment. In FIG. 21 , the transmission side comprises a large/small judging unit 219 for transmitting to the loss compensation unit 230 on the receiving side, large/small relation information designating that the difference in the direct current component of the block currently being transmitted and the corresponding block in the previous frame is larger or smaller than the threshold value, by using the output of the later described subtracter 222, DCT unit 220 for discrete cosine transformation ( DCT), a kind of orthogonal transformation of the input image data, subtracter 222 for obtaining the difference between the outputs ① S of DCT unit 220 and the corresponding block data ② S of the previous frame and stored in frame memory 221, quantizing unit 223 for quantizing the output ③ S of subtracter 222, inverse quantizing unit 224 for determining the output of quantizing unit 223 to the format ③ S taken before the quantization, adder 225 for adding the output ③ S of inverse quantizing unit 224 to the block data ② S in the previous frame and is output from frame memory 221 and leakage factor multiplier 226 for multiplying the output ① S of adder 225 with leakage factor $\alpha$ to be output to frame memory 221.

The receiving side comprises inverse quantizing unit 227 for inverting the input data formed by quantizing the signal ③ S input through the transmission line to the original form of ③ R, adder 229 for obtaining the sum of the output ③ R and the block data ② R in the previous frame and stored in the frame memory 228, loss compensation unit 230 corresponding to the loss compensation means 23 in FIG. 4, inverse DCT unit 231 for applying the inverse discrete cosine transformation to the output ① R of the loss compensation unit 230 and for outputting the image data in the picture element region and leakage factor multiplying unit 232 for multiplying the output 1 Ⓡ of loss compensation unit 230 with a leakage factor $\alpha$ to be output to frame memory 228.

A discrete cosine transformation (DCT) unit using a transformation matrix formed from a cosine function has difficulty in performing a high speed operation as a multiplier is needed for an operation. However, it is frequently used for semimovement picture transmission such as a television conference signal or static picture transmission in accordance with a high speed signal processing processor.

FIG. 21 shows the image data transmission system using the intra-frame coding system. In this system, the difference between block data ① S in the frame to be currently transmitted and the block data ② S in the frame previously transmitted, namely, the intra-frame difference is designated as ③ S and the difference of the intra-frame ③ S is quantized and, for example, Huffman coded to be transmitted on the transmission line. The receiving side receives the difference ③ R from the transmission line and obtains the sum of the difference ③ R and the block data ② R in the previous frame, thereby providing the block data ① R in the present frame. In the transmission side, the adder 225 obtains the sum of the difference ③ S and the block data ② S in the previous frame after the sum is multiplied by the leakage factor $\alpha$. Then the product is stored in frame memory 221 to obtain the intra-frame difference for the next frame. On the receiving side, after the block data ① R is also multiplied by a leakage factor $\alpha$, the product is stored in frame memory 228.

The leakage factor $\alpha$ causes the influence of the cell loss to be attenuated within a short time, even if cell loss occurs. Suppose that the difference $D_1$ is input to the receiving side, for example. The sum of the difference $D_1$ and block data $FM_0$ of the previous frame are stored in frame memory 228 to obtain the sum $(D_1+FM_0)$. This sum is multiplied by a leakage factor $\alpha$ and the block data for the present frame, as expressed by the following equation, becomes the content $FM_1$ of the frame memory 228.

$$FM_1=(D_1+FM_0)\alpha=D_1\alpha+FM_0\alpha$$

When the difference $D_2$ of the block data of the next intra-frame coding is input from the transmission line, the content of frame memory 228 becomes as shown in the following equation.

$$FM_2=(D_2+FM_1)\alpha=D_2\alpha+D_1\alpha^2+FM_0\alpha^2$$

Further, the block data $D_3$ of the next intra-frame coding is input, and the content of frame memory 228 is provided by the following equation.

$$FM_2=(D_3+FM_2)\alpha=D_3\alpha'+D_2\alpha^2+D_1\alpha^3+FM_0\alpha^3$$

Therefore, the influence of the predicted error $D_1$ where the cell loss occurs on the whole image is attenuated to $\alpha^n$ after n frames are input. By determining $\alpha$ smaller than 1, the influence of the predicted error $D_1$ on the whole image can be made almost 0 within a short time.

FIG. 22 shows the direct current component data on the transmission side and the receiving side according to the third embodiment. FIG. 22A shows an example of the data on the transmission side. As explained by referring to FIG. 21, subtracter 222 obtains the difference data ① S in the present frame input from DCT unit 220 and the data ② S for the previous frame stored in frame memory 221, thereby providing data ③ S. When the threshold value of the large/small judgment of the direct current coefficient is ±8 and the case where data is larger than the threshold value is represented by code 1 and the case where the data is smaller than the threshold value is represented by code 0, large/small relation information transmitted to the receiving side becomes "000100" in the order from the first block to the sixth block. The upper stage in respective block data comprises the first to the third block and the lower stage of respective block data comprises the fourth to the sixth blocks.

FIG. 22B shows the data on the receiving side. As explained in FIG. 21, on the receiving side, the sum of the received data ③ R and the data ② R for the previous frame is obtained and this sum is considered as the data ② R for the present frame. When the direct current for the fourth and the fifth blocks among data ③ R is lost due to cell loss, for the fourth block, the transmitted large/small relation information designates that the difference is large under the operation of the loss compensation unit 230. Thus, the direct current component 30 of the immediately upper block in the present frame is used. For the fifth block, the transmitted large/small relation information shows that the difference is small. Thus, the direct current component 14 of the corresponding block in the previous frame is used.

When these values are compared with the data ① S in FIG. 22A, the difference between these and the direct current coefficient lost due to cell loss is pretty large for the fourth block. This is because the compensation for the block with the large difference is merely conducted by the direct current coefficient of the adjacent block in the present frame.

FIG. 23 shows a block diagram of the whole structure of the image data transmission system in the picture element region according to the third embodiment. When FIG. 23 is compared with the system in the orthogonal transformation coefficient region shown in FIG. 21, the structures of FIG. 21 and FIG. 23 are the same except that the structure of FIG. 23 does not have the discrete cosine transformation (DCT) unit and inverse DCT unit. The operation of FIG. 23 is the same as the operation of the structure shown in FIG. 21 except that the coding can be conducted by using the picture element data itself and the direct current component for respective blocks is provided as the average value of a plurality of picture element data forming respective blocks.

FIG. 24 shows an embodiment of the large/small judgment unit 219 as shown in FIGS. 21 and 23. As shown in FIG. 24A, the large/small judgment unit comprises a comparator for comparing the input data with the threshold value, for example, 8. When the input data is larger than the threshold value, the large/small judgment unit 219 outputs "H" and when the input data is smaller than the threshold value, it outputs "L".

FIG. 25 shows a flowchart of the large/small judgment unit 219. When the process starts in FIG. 25, first the direct current component is separated from the data in step 233. This separation of the direct current component is carried out by obtaining the direct current coefficient of the uppermost left region in the coefficient region and the average value of the image element data for respective picture elements in the block in the picture element region are obtained. Next, at step 234, a difference between the direct current component of the block in the present frame and the direct current component of the corresponding block in the previous frame is obtained and at step 234, it is judged whether the difference D is larger than the threshold value TH which is determined in advance. Where the difference D of the direct current component is larger than the threshold value TH, this is transmitted at step 236 and where the difference of the direct current component is smaller than the threshold value TH, this is transmitted at step 237. The above process is performed for respective blocks.

FIG. 26 shows a flowchart of the process of loss compensation unit 230 for the third embodiment. When the process starts, it is judged at step 238 whether cell loss happens. If it does not happen, loss compensation unit 230 does not perform any process and the input from adding unit 229 is output to inverse DCT unit 231 without being changed as shown in FIG. 21.

If it does happen, the direct current component of the block corresponding to the lost cell is separated at step 239. The separation of the direct current component is performed for the corresponding block in the previous frame for blocks having a small difference of the direct current component and the separation of the direct current component is performed for the adjacent block in the present frame for blocks having a large difference. Then the compensation of the direct current component is performed at step 240. Namely, the direct current component of the corresponding block in the previous frame is used for blocks having a small difference and the direct current component of the adjacent block in the present frame is used for blocks having a large difference, thereby completing the process.

FIG. 27 shows a conceptional view of the sixth embodiment, in a picture element region, according to the present invention, namely, the loss compensation shown in FIG. 6F. FIG. 27A shows the average value of the picture element data of respective blocks after the ordinary decoding process where cell loss does not occur and FIG. 27B shows average value after the decoding process where cell loss does occur. As in FIGS. 19 and 20, if the fourth and fifth blocks are lost, the value (ave4) obtained by roughly quantizing the direct current component of the fourth block within the present frame in addition to the large/small relation information designating that the difference in the fourth block is large and the difference in the fifth block is small is transmitted from the transmitting side to the receiving side as the compensation information. Therefore, the value of the compensation information transmitted from the transmission side in FIG. 27B, which is subjected to the loss compensation, is used for the fourth block. The average value of the data of the corresponding block in the previous frame is used for the fifth block.

The whole structure of the image data transmission system for the sixth embodiment is the same as that of the third embodiment shown in FIGS. 21 and 23, except that the operation of large/small judgment unit 219 and loss compensation unit 230 are not exactly the same.

FIG. 28 shows the direct current component data for respective blocks in the transmission side and the receiving side of the sixth embodiment. This figure corresponds to FIG. 22 in the third embodiment. FIG. 28A shows the data of the transmission side and FIG. 28B shows the data of the receiving side. On the transmission side, the difference between the data ① S and ② S is obtained and as a result ③ S is transmitted to the receiving side as the intra-frame code. The direct current component in the present frame is roughly quantized for the block having the large/small relation information with the large difference in the direct current component and then the quantized direct current component is transmitted to the receiving side.

As in FIG. 22, if the threshold value of the large/small judgment is *8 and the case where the direct current component is larger than the threshold value is represented by code 1 and the case where the direct current component is smaller than the threshold value is represented by code 0, the information to be transmitted to the receiving side is expressed as follows.

0001 (the code representing 8) 00

That is, the code representing the value 8 of the direct current component in the present frame in the fourth block is inserted after the code 1 representing that the difference of the direct current component in the fourth block is large. On the receiving side in FIG. 28B, the value 8 received from the transmission side is used for the lost fourth block and value 14 of the direct current component of the corresponding block in the previous frame is used for the fifth block.

FIG. 29 shows a block diagram of the loss compensation unit for compensating the direct current component in the coefficient region. In FIG. 29A, the loss compensation unit comprises a first AND circuit for receiving a block synchronization signal and a large/small judgment signal transmitted from the transmission side, a second AND circuits for receiving the output of the first AND circuit and the loss detecting signal, a memory for storing the replacement data and a selector for selecting the output.

Suppose that the data received when the block synchronization signal becomes "H" is the direct current data and the other data is the AC current data shown in FIG. 29B. When "8" is input as the direct current data, the replacement signal becomes "H" and the direct current data is replaced by the value "10" in the memory to be outputted.

FIG. 30 shows a flowchart of a large/small judgment unit in the sixth embodiment. In FIG. 30, when the process starts, separation of the direct current component is performed at step 241. Separation of the direct current component in a picture element region is performed by obtaining the average value of the picture element data within respective blocks. Separation of the direct current component in the coefficient region is performed by obtaining the uppermost left direct current coefficient. Next, at step 242, the difference between the direct current component of the block in the present frame and the direct current component of the corresponding block in the previous frame is obtained and it is judged at step 243 whether or not the difference D is larger than the predetermined threshold value TH. Where the difference D is smaller than the threshold value TH at step 243, the fact that the difference is small is transmitted to the receiving side at step 244. Where the difference D is larger than the threshold value TH at step 243, the fact that the difference is large is transmitted to the receiving side at step 245. The value of the direct current component of the block in the present frame is roughly quantized at step 246 and transmitted to the receiving side, thereby completing the process.

FIG. 31 shows a flowchart of the process of the loss compensation unit for the sixth embodiment. In FIG. 31, when the process starts, it is judged at step 247 whether or not loss of the cell occurs. If it does not, the loss compensation does not perform any process and the received data is output without being changed. If it does at step 247, separation of the direct current component, is performed, i.e., the direct current component of the corresponding block in the previous frame for the frame having a small difference is obtained at step 248. Next, the compensation of the direct current component is performed at step 249. That is, the direct current component in the previous frame obtained at step 248 is used for a block having a small difference and the direct current component transmitted from the transmission side is used for a block having a large difference, thereby completing the process.

FIG. 32 shows a conceptual view of the seventh embodiment in the picture element region, namely, the loss compensation in FIG. 6G. The seventh embodiment is different from the sixth embodiment in that, where there is a large difference between the direct current component of the block in the present frame and the direct current component of the corresponding block in the previous frame, the difference of the direct current component is roughly quantized and transmitted from the transmission side to the receiving side as the compensation information.

When the sixth embodiment shown in FIG. 27 is compared with the embodiment shown in FIG. 32, the embodiment shown in FIG. 32 is the same as the sixth embodiment shown in FIG. 27 except that the sum of the values of the difference between the direct current component of the block in the present frame and the direct current component of the corresponding block in the previous frame is used for the compensation information transmitted from the transmission side as the data for the fourth block after the decoding process when the cell loss occurs, as shown in FIG. 27B.

The structure of the image data transmission system for the seventh embodiment is the same as that shown in FIGS. 21 and 23 for the third embodiment. The embodiment of the direct current component data in respective blocks in the transmission side and the receiving side are the same as those shown in FIG. 28 except that the code representing the difference of the direct current component is transmitted from the transmission side as the compensation information.

The flowchart for the process in the large/small judgment unit is the same except that the difference of the corresponding direct current component in the previous frame is transmitted at step 46 instead of the value of the direct current component of the block in the present frame as shown in FIG. 30. The present embodiment is the same as the previous one except that the separation of the direct current component of the corresponding block in the previous frame is performed for a block in which there is a large difference in the direct current component in step 248 as shown in FIG. 31 and the value of the supplemental information transmitted from the transmission side is added to the direct current component in the previous frame obtained at step 248 for the block in which the large difference is obtained at step 249.

FIG. 33 shows the eighth embodiment in the coefficient region, namely, a conceptual view of a loss compensation in FIG. 6H, where the information designating the large/small relation between the direct current component of the block is currently being transmitted and the direct current component of the adjacent block in the same frame obtained by roughly quantizing the value of the direct current component for the block in which the difference of the direct current component is larger than the threshold value are transmitted to the receiving side. FIG. 33A shows the direct current component data after the process of normal decoding where cell loss does not occur and FIG. 33B shows the direct current component of the block data after the process of decoding where cell loss does occur.

As in FIG. 19, suppose that the fourth and the fifth blocks are lost. For the fourth block, the difference between the present block and an adjacent block, for example, the immediately upper block, is large, and for the fifth block, the difference between the present block and the adjacent block is small, and the data obtained by roughly quantizing the direct current component of the fourth block is transmitted as compensation information from the transmission side, the value of the transmitted compensation information is used for the fourth block and the direct current component of the immediately upper block in the same frame is used for the fifth block.

The eighth embodiment in the picture element region is the same as that of FIG. 33 except that the average value obtained by performing an average operation of the picture element of all the picture elements in the block is used as the direct current component instead of the uppermost left coefficient in the coefficient region, namely, the direct current coefficient.

The whole structure of the image data transmission system for the eighth embodiment is substantially the same as those shown in FIGS. 21 and 23 and the explanation is omitted. FIG. 34 shows the direct current component of data on the transmission side and the receiving side in the eighth embodiment. In the eighth embodiment, only blocks within the same frame are considered and only block data (1) S to be transmitted and data (1) R on the receiving side are shown.

On the transmission side shown in FIG. 34A, the threshold value ±8 is used for the fourth to sixth blocks. When the data is larger than the threshold value, code 1 is used and when the data is smaller than the threshold value, the code is determined to be 0. Then information representing the large/small relation of the direct current coefficient between the present block and the immediately upper block is transmitted to the receiving side, together with the following format.

1(code representing 8)00

1 represents that the difference between the fourth block and the immediately upper first block is larger than the threshold value and thereafter the code representing the direct current coefficient 8 of the fourth block is inserted.

On the receiving side shown in FIG. 34B, if the fourth and fifth blocks are lost because of cell loss, the compensation information 8 transmitted from the transmission side is used for the direct current component of the block of the present frame for the fourth block and the coefficient value 25 of the immediately upper block is used for the direct current component of the block in the present frame with regard to the fifth block.

FIG. 35 shows a flowchart of the large/small judgment unit for the eighth embodiment. When the process starts, the direct current component is separated at step 250. The average value of the data of a plurality of picture elements forming the block is considered as the direct current component in the picture element region. At step 251, the difference between the direct current component in the present block and the direct current component in the adjacent block, for example, the immediately upper block, is obtained. In step 252, it is judged whether or not the difference D is larger than the threshold value TH.

Where the difference D is smaller than the threshold value TH, the fact that the difference is smaller is transmitted to the receiving side at step 53, thereby completing the process of the block. Where the difference is larger than the threshold value TH at step 252, the fact that the difference is larger is transmitted at step 254 and the direct current component in the present block is roughly quantized to be transmitted at step 255, thereby completing the process.

FIG. 36 shows a flowchart of the process of the loss compensation unit for the eighth embodiment. When the process starts in FIG. 36, the existence of the cell loss is judged at step 256, the cell loss does not occur, the loss compensation unit does not perform the process and the input data is output as is. Where the cell loss does occur, separation of the direct current is performed at step 257 and it is judged at step 258 whether or not the difference between the direct current component in the present block and the direct current component in the adjacent block is larger based on the large/small relation information transmitted from the transmission side. If the difference is small, the compensation is performed at step 259 by using the adjacent block of the lost block, for example, the direct current component of the immediately upper block, thereby completing the process. Where the difference is large at step 258, the direct current component of the block is compensated at step 260 by using the compensation information, thereby completing the process.

FIG. 37 shows a conceptual view for the ninth embodiment, namely, the embodiment of the loss compensation in FIG. 6I where the difference between the direct current component of the present block and that of the adjacent block is transmitted to the receiving side instead of the direct current component of the block in which there is a large difference between the present block and the adjacent block as the compensation information in the eighth embodiment. FIG. 37A shows the direct current component data after the process of the ordinary decoding where the cell loss does not occur. FIG. 37B shows the direct current component data after the process of the decoding where the fourth and fifth blocks are lost in the same manner as in FIG. 19.

In FIG. 37, the information designating the difference between the direct current component of the present block and that of the adjacent block, for example, the immediately upper block is large for the fourth block and the difference between the present block and the adjacent block is small in the fifth block and the compensation information for the fourth block, namely, the difference between the direct current component of the fourth block and the direct current component of the immediately upper first block are transmitted to the receiving side. The sum of the value of the direct current component of the first block and compensation information, namely, the data obtained by roughly quantizing the difference between the direct current component of the fourth block and that of the first block are used for the fourth block. Merely the upper block, the value of the direct current component of the second block are used for the fifth block.

The ninth embodiment is the same as the eighth embodiment in respect of the operation except that the difference between the direct current component of the block in which there is a large difference between the present block and the adjacent block, for example, the immediately upper block and the direct current component of the adjacent block is transmitted to the receiving side as the compensation information. The explanation for the structure of the image data transmission system, the example of the direct current component data, large/small judgment unit and the process flowchart of the loss compensation unit will be omitted.

FIG. 38 shows an example of how to set the frequency band and the orthogonal transformation coefficient region in FIGS. 6P and 6Q, which show the sixteenth and seventeenth examples. In FIG. 38, the uppermost left coefficient shows the direct current component and all the other coefficients designate the AC current component and the AC current component has higher frequency in the right lower region as shown in FIG. 38. The frequency band can be separated by a curved line (thick line) added from the upper right side and extending toward the lower left side of the coefficient region. FIG. 38 shows a coefficient region for 8×8 picture elements but the number of the picture element is not limited to this example. The manner of separating the frequency band shown by the thick curved line is not limited to the present system.

FIG. 39 shows a conceptual view of the loss compensation in the sixteenth embodiment for the coefficient of the lowest frequency group and comprising three coefficients. FIG. 39A shows a coefficient in the previous frame which is one frame prior to the present frame and the group of the lowest frequency includes L1 of the direct current component and L2 and L3 of the AC current component. Thus, the number is 3 in total. FIG. 39B shows the coefficient in the present frame and the group for the lowest frequency comprises l1 of the direct current component and l2 and l3 of the AC current component. The present invention does not apply to coefficients other than that for the lowest frequency group in these frames. Thus, the value of the coefficient of these frames are to be "H".

The coefficients of the groups of lowest frequency are compared as shown in FIGS. 39A and 39B, and it is judged whether the difference between the coefficient in the present frame and that in the previous frame is larger than the predetermined threshold value with regard to respective coefficients. The threshold values for respective coefficients may be the same or different. The influence over the whole image differs depending on the frequency. For example, the difference between the direct current component l1 and the direct current component L1 and the difference between the AC component l3 and the AC component L3 exceeds respective threshold values, the coefficients l1 and l3 together with the information designating the large/small relation of respective coefficients are transmitted to the receiving side as (l1) and (l3) obtained as a result of performing a rougher quantization than the quantization upon the transmission of the ordinary coefficient.

FIG. 39C designates the coefficient output as the present frame after the ordinary decoding where cell loss does not occur. FIG. 39D shows a coefficient after the decoding where cell loss does occur. For the coefficient in which there is a small difference between the present frame and the previous frame, the value L2 of the previous frame is output and for the coefficient in which there is a large difference between the present frame and the previous frame, (l1 ) and (l3) transmitted from the transmission side are output.

FIG. 40 shows an example of the coefficient data of the lowest frequency group in the sixteenth embodiment. In FIG. 40, when the difference of the value of the coefficient is large, the coefficient value in the present fame itself is roughly quantized on the transmission side and transmitted. In FIG. 40, only the coefficient within the lowest frequency group is shown and the coefficient designating the other high frequency component is omitted.

Data ① S among the data on the transmission side shown in FIG. 40A designates the coefficient of the lowest frequency group for serial six blocks in the present frame. Data ② S designates a coefficient of the lowest frequency group in the previous frame and the difference between the data ① S and ② S. That is, the data ③ S is quantized to be coded and output on the transmission line.

When all the threshold values used for performing a large/small judgment between the data ① S in the present frame and the data ② S in the previous frame are determined to be the same value of ±8 and the case where the difference is larger than the threshold value is designated by code 1 and the case where the difference is smaller than the threshold value is designated by 0, the compensation information output on the transmission line is expressed as follows.

| 0 0 0 | 0 0 0 | 0 0 0 |

| 1 (compensation information of 30) 0 1 (compensation information) 0 0 0 | 0 0 0 |

The vertical line of the compensation information shows the partition of six blocks (comprising first to third blocks starting from the upper left stage and comprising the fourth to sixth blocks starting from the lower left stage), 0 designating that the difference between the corresponding coefficients are smaller than the threshold value is output for all the coefficients for the first to third blocks and the fifth and the sixth blocks.

In contrast, for the fourth block, the compensation information (for example 32) for the direct current component 30 in the block in the present frame is shown in brackets after code 1 designating that the difference 22 of the direct current component is larger than the threshold value and code 0 designating that the difference between the right side coefficient of the direct current component is smaller than the threshold value. Then code 1 designating that the difference −9 of the lower coefficient of the direct current component is larger than the threshold value is shown. Thereafter, compensation information (for example 0) of the direct current component 1 in the present frame is shown in brackets.

FIG. 40B shows an embodiment of a coefficient data on the receiving side. In FIG. 40B, coefficient ② R for the previous frame is equal to the data ② S for the previous frame on the transmission side. When the cells corresponding to the fourth and the fifth blocks of the cells input from the transmission line are lost as shown in data ③ R, the value of the coefficients of the data ② R and the data ① R are used for the fifth block as is. For the fourth block, the compensation information value 32 transmitted from the transmission side is used as the direct current component, the value 0 transmitted from the transmission side is used for the coefficient under the direct current component and the value 13 in the data ② R in the previous frame is used for the coefficient on the right side of the direct current component, thereby providing the data of the present frame.

FIG. 41 shows the seventeenth embodiment of the coefficient data compensated on the receiving side. When the difference between the coefficient in the present frame and the coefficient in the previous frame is large, it is roughly quantized to be transmitted to the receiving side. In FIG. 41, the compensation information transmitted from the transmission side to the receiving side is represented as follows.

| 000 | 000 | 000 |

| 1 (compensation information of 22) 0 1

(compensation information of −9) | 000 | 000 |

The value obtained by quantizing 22, for example 24, is transmitted to the receiving side as the compensation information for the difference 22 between the direct current component of the fourth block and −8, for example, is transmitted to the receiving side as the compensation information of the difference −9 for the AC component under the direct current component. The direct current component of the fourth block in the data (1) R is 32 and the AC component on the right side is 13 and the AC current component under the direct current component is 2. The block data (2) R and (3) R other than the (1) R on the receiving side and the block data on the transmission side are the same as those in FIG. 40.

FIG. 42 shows the process flowchart of the large/small judgment unit in the sixteenth embodiment. When the process starts in FIG. 42, it is judged at step 333 whether or not the process for the lowest frequency group is completed for all the coefficients. If the process is not completed, the difference D between the coefficient value of the present frame and the coefficient value of the previous frame is calculated. It is judged at step 335, whether or not the difference is larger than the threshold value. If it is smaller, this fact is transmitted to the receiving side at step 336 and the process returns to the step 333. If the difference is larger, this fact is transmitted to the receiving side at step 337 and the coefficient value in the present frame is roughly quantized at step 338 to be transmitted and the process is returned to step 333. The process is repeated for all the coefficients of the lowest frequency group, starting with step 333 and when the process is completed for all the coefficients, the process is ended.

The seventeenth embodiment is the same as the sixteenth embodiment except that when the difference is larger than the threshold value at step 335, the fact that the difference is larger is transmitted at step 337 and the data obtained by roughly quantizing the difference is simultaneously transmitted instead of the coefficient value itself of the present frame at step 338.

FIG. 43 shows the flowchart of the loss compensation unit in the sixteenth and the seventeenth embodiments. When the process starts, the existence of a cell loss is determined at step 339. If a cell loss does not occur, loss compensation unit does not perform any process and outputs the input data as is.

If a cell loss does occur, the replacement of the coefficient is performed for the low frequency coefficient in which there is a large difference between the present frame and the previous frame, thereby completing the process. In the sixteenth embodiment, the replacement of the coefficient is performed by the value obtained by quantizing the coefficient value of the present frame transmitted from the transmission side and the replacement of the coefficient is performed by the value obtained by the quantizing the difference of the coefficient in the seventeenth embodiment.

FIG. 44 shows a conceptual view of the loss compensation in the eighteenth embodiment. FIG. 44A shows an ordinary case in which loss does not occur, i.e., an example of the coefficient region after the ordinary decoding process and the coefficient region of 2×2 is shown for simplicity. The uppermost left coefficient designates the direct current component as a coefficient representing the AC component. FIG. 44B shows the cc,efficient region after decoding when 10 cell loss occurs. In this invention, only the direct current component (represented by dc') of the corresponding block in the previous frame is kept as is and all AC components are cleared to 0.

FIG. 45 shows a conceptual view of the loss compensation of the nineteenth embodiment. FIG. 45A shows a picture element region after the ordinary decoding process where cell loss does not occur and the data for respective picture elements, such as the density data are output as is. FIG. 45B shows a picture element region after the decoding process where cell loss occurs and designates that the value obtained by averaging the data (represented by ') in the picture element region of the corresponding block in the previous frame is output as the data of all the picture elements in the block.

FIG. 46 shows the block data in the eighteenth embodiment. FIG. 46A shows coefficient data on the transmission side and designates the block data (1) S by coding, as the intra-frame signal, the difference obtained by subtracting block data (2) S in the previous frame from the block data (3) S in the present frame. FIG. 46B shows the block data where frame loss occurs on the receiving side and the receiving data (1) R is completely unknown. In this case, only the direct current component among the coefficients of the block data (2) R in the previous frame is left by the loss compensation unit and output as the block data (3) R for the present frame. The other coefficients, namely, all the AC components, are made 0. FIG. 46C shows the prior art process on the receiving side in which the present invention is not utilized. The block data (2) R in the previous frame is output as block data (3) R in the present frame as is.

FIG. 47 shows an example of the block data in the nineteenth embodiment. The nineteenth embodiment is the same as the embodiment shown in FIG. 46 except that respective data are respective picture elements in the picture element region. FIG. 47A shows the data on the transmission side and FIG. 47B shows the process of the present invention. Where the block data (1) R within the present frame are unknown because of the cell loss, the average value of the data for all the picture elements in the block data (2) R in the previous frame is obtained and this average value is considered as the data for all the picture elements of the block data (3) R in the present frame. In contrast, FIG. 47C representing the prior art process uses block data (2) R in the previous frame as the block data (3) R in the present frame as is. If 0 represents black and 255 represents white, the color corresponding to 127 obtained by the average process, namely, the gray color, is output for the lost block instead of the pattern in which half of the pattern is black and the other half of the pattern is white.

FIG. 48 shows a block diagram of the structure of the loss compensation unit in the eighteenth embodiment. In FIG. 48A, the loss compensation unit comprises an AND circuit for receiving an inverted signal of a block synchronization signal and a loss detecting signal, and a selector for selecting the output. In FIG. 48B, the AC coefficient output from the selector is replaced by 0 when the block synchronization signal is "L" and the loss detecting signal is "H".

FIG. 49 shows a flowchart of the process of the loss compensation unit on the receiving side in the eighteenth embodiment. When the process starts in FIG. 49, it is judged at step 341 whether or not cell loss occurs. If it does, the AC coefficient in the coefficient region in the corresponding block in the previous frame is cleared to 0 at step 342, thereby completing the process. If it does not, the block data ③ R in the present frame is output as is, thereby completing the process.

FIG. 50 shows the flowchart of the process of the loss compensation unit in the nineteenth embodiment. If the process starts in FIG. 50, it is judged at step 343 whether or not cell loss occurs. If it does, the direct current component is separated from the data of the picture element region in the corresponding block in the previous frame at step 344, namely, the average of the data for all the picture elements in the block is obtained and the AC component is cleared to be 0 at step 345 and the average value is assigned to the data of respective picture elements, thereby completing the process. If it is judged at step 343 that loss does not occur, the input data are output as is.

In the above description, the region of 2×2 of the picture element number is explained as an example and the intra-frame coding is explained for the coding system. It is obvious that the number of picture elements of the block is not limited to 2×2 and the coding system is not limited to intra-frame coding, but the inter-frame coding can be also used.

As explained above, according to the present invention, even if loss of the packet or cell occurs, the compensation of the loss can be performed based on the predetermined compensation method, thereby preventing deterioration of the image quality. By sending the compensation information from the transmission side, the advantage of the present invention can be further increased. Therefore, the present invention can be used for the image transmission system for performing the data transmission in the form of a packet or cell format in which data loss might occur.

What is claimed is:

1. An image data transmission system for coding input image data using a plurality of picture elements in blocks and for transmitting said picture elements in units of packets or cells, comprising;

signal outputting means provided on the transmission side of said image data transmission system for outputting a loss compensation method designating signal on the receiving side of said image data transmission system where the data of the block currently being coded is lost during the transmission, loss detecting means provided on the receiving side of said image data transmission system for detecting the loss of a packet or a cell, and loss compensating means provided on the receiving side of said image data transmission system for compensating the data of the block which can not be decoded due to the loss, using the loss compensation method designated by the transmission side when the loss is detected.

2. The image data transmission system according to claim 1, wherein said image transmission system adaptively and selectively uses an inter-frame coding or intra-frame coding, said loss compensation method designating signal outputting means transmits a selection signal for inter-frame/intra-frame coding as the loss compensation method designating signal, and said loss compensating means outputs AC current component of the corresponding block in the previous frame which is one frame prior to a present frame, as the AC current data of the block when intra-frame coding is selected upon detecting said loss and clearing the AC current component of the block when inter-frame coding is selected.

3. The image data transmission system according to claim 1, wherein said image data transmission system adaptively and selectively uses inter-frame coding and intra-frame coding as the coding method, said loss compensation method designating signal outputting means transmits a selection signal for an inter-frame/intra-frame coding as the loss compensation method designating signal, said loss compensating means outputs the direct current component of the corresponding block in the previous frame one as the direct current compensation of the present block when intra-frame coding is selected upon detecting the loss and outputs the direct current component of the block adjacent to a present block in a present frame when inter-frame coding is selected.

4. The image data transmission system according to claim 1, wherein said loss compensation method designation signal outputting means transmits as the loss compensation method designating signal large/small relation information designating that the difference between the direct current component of the block currently being transmitted and the direct current component of the corresponding block in the previous frame which is one frame prior to a present frame is larger than the predetermined threshold value, and said loss compensating means outputs the direct current component of said corresponding block in the previous frame which is one frame prior to a present frame, as the direct current component of the present block with regard to the block in which the difference of the direct current component is smaller than the predetermined threshold value and outputs the direct current component of the block adjacent to the present block in the present frame including the present block when the difference of the direct current component is larger than the predetermined threshold value.

5. The image data transmission system according to claim 1, said image data transmission system further comprising means for utilizing a coding method using a movement compensation and means for producing an output for determining whether the movement is large, said output being used as said loss compensation method designating signal.

6. The image data transmission system according to claim 1, wherein said image data transmission system utilizes a coding method using a movement compensation, said loss compensation method designation signal outputting means compares a movement vector obtained from the block currently being coded and the data of the adjacent block in the previous frame with the predetermined threshold value and transmits the movement large/small signal obtained as the result of the comparison as the loss compensation designation signal, and said loss compensating means outputs the direct current component of the corresponding block in the previous frame as the direct current component of the present block upon detecting the loss when the said movement vector is smaller than the threshold value and outputs the direct current component of the adjacent block in the present frame when the movement vector is larger than the threshold value.

7. The image data transmission system according to claim 1, wherein said image data transmission system utilizes a coding system using a movement compensation, said loss compensation method designation signal outputting means compares a movement vector obtained from the block currently being coded and the data of the adjacent block in the previous frame with the predetermined threshold value and transmits the movement large/small signal obtained as the result of the comparison as the loss compensation designation signal, and said loss compensating means outputs the AC current component of the corresponding block in the previous frame as the AC current component of the present block upon detecting the loss when said movement vector is smaller than the threshold value and clears the AC component of the present block to 0 when the movement vector is larger than the threshold value.

8. The image data transmission system according to claim 1, wherein said signal outputting means compares a sum of the second power of the difference between the AC component of a plurality of frequencies in the present block and the corresponding frequency components among a plurality of AC components of the corresponding block and in the previous frame with the predetermined threshold value and transmits a signal designating whether the sum of the second power is larger than the threshold value, and said loss compensating means outputs the AC current component of the corresponding block in the previous frame as the AC current component of the present block upon detecting the loss when said sum of the second power sum is smaller than the threshold value and clears the AC component of the present block to 0 when the second power sum is larger than the threshold value.

9. The image data transmission system according to claim 1, wherein the transmission side of the image data transmission system comprises a discrete cosine transformation unit for performing an orthogonal transformation of input image data in a picture element region, a first frame memory for storing a direct current component of a block corresponding to the present block and in the frame one frame prior to a frame containing a present block, said direct current component being the output of said discrete cosine transformation unit, a subtracter for obtaining the difference between the direct current component obtained from the output of said discrete cosine transformation unit and the output from said first frame memory, a direct current intra-frame/inter-frame judging unit for receiving the output of said subtracter and the direct current component of a present block and for determining whether an intra-frame signal or an inter-frame signal is transmitted, a first quantizing means for quantizing the output of said direct current intra frame/inter-frame judging unit, a first switch for providing the output of said frame memory or ground potential, a first adder for adding the outputs of said first quantizing means to the output of the first switch to be supplied to said first frame memory, a first coder for coding the output of said first quantizing means, a second frame memory for storing an AC component of a block corresponding to the present block in the frame one frame prior to the frame containing the present block, a second subtracter for obtaining the difference between the AC component of the present block output from said discrete cosine transformation unit and the output from said second frame memory, a large/small judgment means for receiving the output of said second subtracter and the predetermined threshold value and for judging whether the output of said second subtracter is larger than the threshold value, a second quantizing means for quantizing the AC component output from said large/small judgment unit, a second adder for obtaining the sum of the output of said second quantizing means and the output of the second frame memory and for outputting said sum to said second frame memory again, a second coder for coding the output of said second quantizing means, and a multiplexer for multiplexing an intra-frame/inter-frame selecting signal output from said direct current intra-frame/inter-frame judging unit, a direct current component output from the first coder, a large/small judging signal from said large/small judging unit with regard to the threshold value of AC and the AC component output from said second coder; and wherein the receiving side of said image data transmission system comprises a demultiplexer for separating a signal input from the transmission line into a direct current component of the coded data, an AC component, said direct current intra-frame/inter-frame selecting signal as a direct current compensation designation signal, and a large/small judging signal as an AC compensation designating signal with regard to a threshold value, a loss compensation control means for receiving a loss detecting signal from said loss detecting means, a direct current compensation designation signal from said multiplexer and an AC compensation designating signal;

a first decoder for decoding a direct current component from said demultiplexer, a third frame memory for storing a direct current component in the previous frame, a second switch for providing the output from the third frame memory or ground potential, a third adder for adding the output of said first decoder to the output of said second switch, a third switch for outputting a direct current component of a block adjacent to the present block and in the previous frame and output from said third adder or said third frame memory to said third memory again, a second decoder for decoding an AC component from said demultiplexer, a fourth frame memory for storing an AC component of the frame immediately preceding the frame containing the present block, a fourth adder for adding an output of said fourth frame memory to the output of said second decoder, a fourth switch for providing the output of said fourth adder or ground potential to said fourth frame memory; and an inverse discrete cosine transformation unit for performing an inverse orthogonal transformation of the direct current component output from said third switch and the AC component output from said fourth switch.

10. The image data transmission system according to claim 9, wherein said large/small judgment means based on the threshold value obtains the sum of the second power of all the AC coefficients of intra-frame data, it is judged whether said second power sum is larger than the threshold value, and when the sum of the second power is larger than the threshold value, it is output as a loss compensation designation signal and when the sum of the second power is smaller than the threshold value, it is output as the loss compensation designation signal.

11. The image data transmission system according to claim 9, wherein when loss does not occur, said loss compensation control means connects said third switch to the side of said third adder and said fourth switch to the side of said fourth adder, thereby completing the process, when loss occurs, a coding system for a direct current component is judged to be intra-frame or inter-frame, said third switch is connected to said third adder in case of an intra-frame coding and said third switch is connected to the data side of the adjacent block output from said third frame in case of an inter-frame coding, the AC current component is determined to be smaller than the threshold value, said fourth switch is connected to said fourth adder side when the AC component is smaller than the threshold value, and said fourth switch is connected to the side of ground potential when the AC component is larger than the threshold value, thereby completing the process.

12. The image data transmission system according to claim 4, wherein the transmission side of said image data transmitting system comprises a discrete cosine transformation unit for performing an orthogonal transformation for the input image data in the picture element region, a frame memory for storing the coefficient data in a block corresponding to the block containing the data currently being transmitted and in the frame immediately preceding a frame containing a present block, a subtracter for obtaining the difference between the output of said discrete cosine transformation unit and the output of said frame memory, quantizing means for outputting the output of said subtracter to a transmission line after the output of the subtracter is quantized, inverse quantizing means for returning the output of said quantizing means to the format before the quantization again, an adder for obtaining the sum of the output of said inverse quantizing means and the output of said frame memory, a leakage factor multiplying means for multiplying the output of the adder by a leakage factor and for outputting the obtained product to said frame memory, and a large/small judging means for judging whether the absolute value of the difference between the direct current component of the block being currently transmitted and the direct current component of the corresponding block in the frame immediately preceding the frame including the present block is larger than the predetermined threshold value and transmitting the result of the judgment through a transmission line to the receiving side as the large/small relation information, and wherein said receiving side of said image data transmitting system further comprises an inverse quantizing means for performing an inverse quantization of the receiving signal input from the transmission line, a frame memory for storing the coefficient data in a block corresponding to the block for the data being transmitted and in the frame one frame prior to a frame containing a present block as the output of inverse quantizing means, an adder for obtaining the sum of the output of said inverse quantizing means and said frame memory, a loss compensating unit for receiving large/small relation information transmitted from said large/small judging unit on said transmission side, an inverse discrete cosine transformation unit for performing an inverse orthogonal transformation of the output of said loss compensation unit and for outputting the image data in a picture element region and a leakage factor multiplying for multiplying the output of said loss compensation unit with a leakage factor and outputting the obtained product to said frame memory.

13. The image data transmission system according to claim 12, wherein said large/small judging means separates the uppermost left coefficient of the coefficient data obtained by orthogonal transformation of the picture element region data of respective blocks which represents the direct current component of the block transmitted and the direct current component of the corresponding block in the previous frame obtains the difference between the direct current component of the block currently being transmitted and the direct component of the corresponding block in the frame immediately preceding the frame containing the present block, compares the absolute value of the difference with the predetermined threshold value, when the absolute value of the difference is smaller than the threshold value, it is transmitted to the receiving side and when the absolute value of the difference is larger than the threshold value, it is transmitted to the receiving side.

14. The image data transmission system according to claim 4, wherein the transmission side of the image data transmitting system comprises a frame memory for storing the data in a block corresponding the block containing the block of data currently being transmitted and in the previous frame as the input image data in the picture element region, a subtracter for obtaining the difference between the input image data of the picture element region formed in the block and the output of said frame memory, quantizing means for outputting the output of said subtracter to a transmission line after the output of said subtracter is quantized, inverse quantizing means for returning the output of said quantizing means to the format before the quantization again, an adder for obtaining the sum of the output of said inverse quantizing means and the output of said frame memory, a leakage factor multiplying means for multiplying the output of said adder by a leakage factor and for outputting the obtained product to said frame memory, and a large/small judging means for judging whether the absolute value of the difference between the direct current component of the block currently being transmitted and the direct current component of the corresponding block in the previous frame is larger than the predetermined threshold value and transmitting the result of the judgment through a transmission line to the receiving side as the large/small relation information, said receiving side of said image data transmitting system further comprising an inverse quantizing means for performing an inverse quantization of the received signal input from the transmission line, a frame memory for storing the data in a block corresponding to the block for the data being transmitted and in the previous frame, an adder for obtaining the sum of the output of said inverse quantizing means and the output of said frame memory, a loss compensating means for receiving the output of said adder and the large/small relation information transmitted from said large/small judging means on said transmission side and for outputting the image data in the picture element region in the form of a block, a leakage factor multiplier for multiplying the output of said loss compensation unit by a leakage factor and outputting the obtained product to said frame memory.

15. The image data transmission system according to claim 14, wherein said large/small judging unit separates the average value of a plurality of picture element region data of respective blocks which represent a direct current component of the corresponding block in the previous frame which is one frame prior to the frame being currently transmitted and the direct current component of the present block currently being transmitted, obtains the different between the direct current component of the block currently being transmitted and the direct current component of the corresponding block in the previous frame, and compares the absolute value of the difference with the threshold value, so that when the absolute value of the difference is smaller than the threshold value, it is transmitted to the receiving side, and when the absolute value of the difference is larger than the threshold value, it is also transmitted to the receiving side.

16. The image data transmission system comprising;

signal outputting means provided on the transmission side of said image data transmission system and for outputting a loss compensation method designating signal provided on the receiving side of said image data transmission system where the data of the block currently being coded is lost during the transmission, replacement information outputting means for outputting replacement information used on the receiving side when a loss compensation is performed, loss detecting means provided on the receiving side of said image data transmission system for detecting the loss of a packet or a cell, and loss compensating means provided on the receiving side of said image data transmission system for compensating the data of the block which can not be decoded due to the loss, using the loss compensation method designated by the transmission side and said replacement information when the loss is detected, said signal outputting means comparing a movement vector obtained from the block currently being coded and the adjacent block in the previous frame with the predetermined threshold value and transmits the movement large/small signal obtained as the result of the comparison, said replacement information output means transmitting as the replacement information the value of the direct current component of the present block or the difference between the direct current component of the present block and the direct current component of the corresponding block and in the previous frame, and said loss compensating means outputting the direct current component of the corresponding block in the previous frame, when said movement vector is smaller than the threshold value and outputting the replacement information transmitted from the transmission side when the movement vector is larger than the predetermined threshold value, thereby compensating the data of the block which can not be decoded due to the loss.

17. An image data transmission system for coding input image data using a plurality of picture element in blocks and for transmitting said picture element in units of packets or cells, comprising signal outputting means provided on the transmission side of said image data transmission system and for outputting a loss compensation method designating signal provided on the receiving side of said image data transmission system where the data of the block currently being coded is lost during the transmission, replacement information outputting means for outputting replacement information used on the receiving side when a loss compensation is performed, loss detecting means provided on the receiving side of said image data transmission system for detecting the loss of a packet or cell, and loss compensating means provided on the receiving side of said image data transmission system for compensating the data of the block which can not be decoded due to the loss, using the loss compensation method designated by the transmission side and said replacement information when the loss is detected.

18. The image data transmission system according to claim 17, wherein said image data transmission system utilizes a coding system in which an inter-frame coding or an intra frame coding is used adaptively and selectively, said replacement information outputting means outputs one of the difference between the direct current component of the block in the present frame and the direct current component of the corresponding block in the previous frame, the difference between the direct current component of the block in the present frame and the direct current component of the adjacent block in the block in the present frame, and the difference between the low frequency component in the present block or the low frequency component of the corresponding block in the previous frame and, said loss compensating method designating signal output means transmits a signal designating one of the above differences and a selection signal for inter-frame/intra frame coding as the loss compensation method designating signal.

19. The image data transmission system according to claim 17, wherein said loss compensating method designation signal output means provided on the transmission side transmits large/small relation information designating that the difference between the direct current component of the block currently being transmitted and the direct current component of the corresponding block in the previous frame is larger than the predetermined threshold value, said replacement information outputting means transmits as the replacement information the value of the direct current component of the present block or the difference between the direct current component of the present block and the block in which the direct current component of the block is larger than the threshold value in place of the direct current component of the block in which the threshold voltage of the direct current component is larger than the threshold value, and said loss compensating means provided on the receiving side outputs the direct current component of the corresponding block in the previous frame, with regard to the block in which the difference of the direct current component is smaller than the predetermined threshold value and outputs replacement information transmitted from the transmission side for the block in which the difference of the direct current component is larger than the predetermined threshold value, thereby compensating the data of the block which can not be coded due to the loss.

20. The image data transmission system according to claim 17, wherein said loss compensating method designating output means provided on the transmission side transmits large/small relation information designating that the difference between the direct current of the block currently being transmitted and the direct current component of the adjacent block is larger than the predetermined threshold value, said replacement information outputting means transmits as the replacement information the value of the direct current component of the present block or the difference between the direct current component of the present block and the direct current component of the block when said difference is larger than the threshold value, and said loss compensating means provided on the receiving side outputs the direct current component of a block adjacent to the present block in the present frame for the block in which the difference of the direct current component is smaller than the predetermined threshold value and value of replacement information transmitted from the transmission side for the block in which the difference of the direct current component is larger than the predetermined threshold value, thereby compensating the data of the block which can not be coded due to the loss.

21. The image data transmission system according to claim 20, wherein said loss compensating method designating signal output means provided on the receiving side compares the absolute value of the difference between the direct current component of the present block and the direct current component of the block corresponding block in the previous frame or the direct current component of the block adjacent to the block in the present frame with the predetermined threshold value.

22. The image data transmission system according to claim 17, wherein said loss compensating means designating signal output means provided on the transmission side compares a movement vector obtained from a block being currently coded and the adjacent block in the previous frame with the predetermined threshold value and transmits the movement large/small signal obtained from said comparison, said replacement information outputting means transmits as the replacement information the value of the direct current component of the present block or the difference between the direct current component of the present block and the direct current component of the block adjacent to the present block, and the loss compensating means provided on the receiving side outputs the direct current component of the corresponding block in the previous frame, when said movement vector is smaller than the threshold value and outputs the replacement information transmitted from the transmitting side when the movement vector is larger than the predetermined threshold value, thereby compensating the data of the block which can not be coded due to the loss.

23. The image data transmission system according to claim 17, wherein an orthogonal transformation unit performs an orthogonal transformation of input image data by using a plurality of images as a block, and a coefficient region in said orthogonal transformation is coded to the transmitted in units of packets or cell and an inverse orthogonal transformation unit for performing an inverse orthogonal transformation is provided on the receiving side, a plurality of coefficients representing a frequency component from a direct current to a high frequency current in the coefficient region in said orthogonal transformation is divided into a plurality of groups corresponding to a plurality of frequency bands, said loss compensating method designation signal output means provided on the transmission side transmits information designating whether the difference of the corresponding coefficient is larger than the predetermined threshold value for a plurality of coefficients in the group of lowest frequency in said plurality of groups in the block currently being transmitted and a plurality of coefficients respectively corresponding to said plurality of coefficients in the corresponding block in the previous frame, said replacement information outputting means transmits the value of the coefficient in the present block corresponding to the coefficient representing that the difference is larger than the predetermined threshold value; and said loss compensating means provided on the receiving side, based on the information representing the large/small relation of the difference of the coefficient transmitted from said loss compensating means provided on the receiving side to the lost block when the loss occurs, outputs a corresponding coefficient in the corresponding block the previous frame to an inverse orthogonal transformation unit for the coefficient representing that the difference is smaller than the threshold value and among the coefficients in said lowest frequency group and outputs the data obtained by replacing the corresponding coefficient in the present block by the coefficient value transmitted from said replacement information outputting means to the inverse orthogonal transformation unit as to the coefficient representing that the difference is larger than the threshold value.

24. The image data transmission system according to claim 17, wherein an orthogonal transformation unit performs an orthogonal transformation of input image data by using a plurality of images as a block, and a coefficient region in said orthogonal transformation is coded to be transmitted in units of packets or cells and an inverse orthogonal transformation unit for performing an inverse orthogonal transformation is provided on the receiving side, a plurality of coefficients representing a frequency component from a direct current to a high frequency current in the coefficient region in said orthogonal transformation is divided into a plurality of groups corresponding to a plurality of frequency bands, said loss compensating method designation signal output means provided on the transmission side transmits information designating whether the difference of the corresponding coefficient is larger than the predetermined threshold value for plurality of coefficients in the group of lowest frequency in said plurality of groups in the block currently being transmitted and a plurality of coefficients respectively corresponding to said plurality of coefficients in the corresponding the present block in the previous frame which is one frame prior to the frame including the present block, said replacement information outputting means transmits the value of the coefficient in the present block corresponding to the coefficient representing that the difference is larger than the predetermined threshold value; and said loss compensating means provided on the receiving side, based on the information representing the large/small relation of the difference of the coefficient transmitted from said loss compensating designation signal output means provided on the receiving side to the lost block when the loss occurs, outputs a corresponding coefficient in a the corresponding block in the previous frame which is one frame prior to the frame including the present block to an inverse orthogonal transformation unit for the coefficient representing that the difference is smaller than the threshold value and among the coefficients in said lowest frequency group and outputs the value of the difference of the coefficient transmitted from said replacement information outputting means for the coefficient representing the difference which is larger than the threshold value and the coefficient in the lowest frequency group to said inverse orthogonal transformation unit by using the corresponding coefficient in the corresponding block in the previous frame which is one frame prior to the frame including the present block.

25. The image data transmission system according to claim 17, wherein the transmission side of said image data transmission system comprises a discrete cosine transformation unit for performing an orthogonal transformation of input image data in a picture element region, a first frame memory for storing a direct current component of the corresponding block in the previous frame which is one frame prior to the frame including the present block, said direct current component being the output of said discrete cosine transformation unit, a first subtracter for obtaining the difference between the direct current component obtained from the output of said discrete cosine transformation unit and the output from the first frame memory, a direct current intra-frame/inter-frame judging unit for receiving the output of the first subtracter and the direct current component of the present block, a first quantizing means for quantizing direct current component data output from said direct current intra-frame/inter-frame judging unit, a first switch for providing the output of said frame memory or the ground potential, a first adder for adding the outputs of said first quantizing means to the output of said first switch to be supplied to said first frame memory, a first coder for coding the output of said first quantizing means, a second quantizing means for quantizing the direct current component of the present block more roughly than by said first quantizing means, a second coder for coding the output of said second quantizing means, a second frame memory for storing an AC component of the corresponding block to the present block and in a frame which is one frame prior to the previous frame, a second subtracter for obtaining the difference between an AC component output from said discrete cosine transformation unit and the output from said second frame memory, an AC current intra-frame/inter-frame judging unit for receiving the output of said second subtracter and the AC component of the present block, a third quantizing means for quantizing the AC component output from said AC intra-frame/inter-frame judging unit, a second switch for providing the output of said second frame memory and ground potential, a second adder for adding the output of said second switch to the output of said third quantizing means to be supplied to said second frame memory, a third coder for coding the output of said third quantizing means, and a multiplexer for multiplexing a direct current intra frame/inter-frame selection signal output from said direct current intra-frame/inter-frame judging unit as a direct current compensation designation signal, an AC intra-frame/inter-frame selecting signal output from said AC intra-frame/inter-frame judging unit as an AC compensation designation signal, a direct current component of the present block output from said second coder as direct current replacement information and a direct current component and AC component output from said first coder and said third coder as coded data; and wherein the receiving side of the image data transmission system comprises a demultiplexer for separating a signal input from the transmission line into a direct current component, an AC component, a direct current compensation designation signal, an AC compensation designation signal and direct current replacement information, a loss compensation control unit for receiving a loss detecting signal from said loss detecting means, a direct current compensation designation signal from said multiplexer and an AC compensation designating signal;

a first decoder for decoding a direct current component from said demultiplexer, a third frame memory for storing a direct current component in the previous frame, a third switch for providing the output from said third frame memory or said ground potential, a third adder for adding the output of said first decoder to the output of said third switch, a second decoder for decoding the direct current replacement information from said demultiplexer, a fourth switch for outputting the output of said second decoder or said third adder to said third frame memory, a third decoder for decoding an AC component from said demultiplexer, a fourth frame memory for storing an AC component of the block corresponding in the previous frame which is one frame prior to the present block, a fifth switch for providing the output of said fourth memory and ground potential, a fourth adder for adding an output of said fifth switch to the output of said third decoder, a sixth switch for providing the output of said fourth adder or ground potential to fourth frame memory; and an inverse discrete cosine transformation unit for performing an inverse orthogonal transformation of the direct current component output from said fourth switch and the AC component output from said sixth switch.

26. The image data transmission system according to claim 25, wherein when the loss does not occur, said loss compensation control unit connects said fourth switch to the side of said third adder and said sixth switch to the side of said fourth adder, thereby completing the process, when the loss occurs, the coding system for the direct current component is judged to be intra-frame or inter-frame, said fourth switch is connected to said third adder in case of an intra-frame coding and said fourth switch is connected to the second decoder side in case of an inter-frame coding, the coding system of the AC component is judged to be intra-frame or inter-frame, said sixth switch is connected to said fourth adder in case of intra-frame coding, and said sixth switch is connected to ground potential in case of inter-frame coding, thereby completing the process.

27. The image data transmission system according to claim 25, wherein said second quantizing means on the transmission side quantizes the difference between the direct current component of the present block as the output of said first subtracter and the direct current component of the corresponding block in the previous frame more roughly than in said first quantizing means and said multiplexer multiplexes the difference of said direct current component as the direct current difference replacement information in place of the direct current component of the present block, and said demultiplexer on the receiving side outputs the direct current difference replacement information to said second decoder in place of the direct current replacement information, said fourth switch provides the output of said second decoder or the output of said first decoder, said third adder adds the output of said fourth switch to the output of said third switch to be provided to said third frame memory and said inverse discrete cosine transformation unit and said inverse discrete cosine transformation unit perform a inverse orthogonal transformation of the outputs of said third adder and said sixth switch.

28. The image data transmission system according to claim 27, wherein when the loss does not occur, said loss compensation control means connects said fourth switch to the side of said first decoder and said sixth switch to the side of said fourth adder, thereby completing the process, when the loss occurs, a coding system for a direct current component is judged to be intra frame or inter-frame, said fourth switch is connected to the side of said first coder in case of an intra-frame coding and said fourth switch is connected to said second decoder side in case of an inter-frame coding, when the coding system of the AC component is judged to be intra-frame or inter-frame, said sixth switch is connected to said fourth adder in case of intra-frame coding, and said sixth switch is connected to ground in case of inter-frame coding, thereby completing the process.

29. The image data transmission system according to claim 27, wherein said direct current intra-frame/inter-frame judging unit obtains the coding length when the intra-frame data is subjected to variable length coding, when the coding length is shorter than 8 bits, intra-frame coding is used and when said coding length is not shorter than 8 bits, inter-frame coding is selected.

30. The image data transmission system according to claim 27, wherein said AC intra-frame/inter-frame judging unit obtains the second power sum of all the AC components of the intra-frame data and obtains the second power sum of all the AC components of the inter-frame data, the second power sum of the intra-frame data is judged to be smaller than the second power sum of the inter-frame AC component, and when the second power sum of the intra-frame AC component is smaller than the second power sum of the inter frame AC component, intra-frame coding is used, and when the second power sum of the intra frame AC component is not smaller than the second power sum of the inter-frame AC component, inter-frame coding is used.

31. An image data transmission system for performing an orthogonal transformation of input image data using a plurality of picture elements as a block and coding a coefficient in a coefficient region of said orthogonal transformation to be transmitted in units of cells or packets and provided with an inverse orthogonal transformation unit on the receiving side for performing an inverse orthogonal transformation of the received data and for outputting image data, wherein a loss detecting means for detecting a loss of a packet or a cell and a loss compensating means are provided on the receiving side of the image data transmission system, said loss compensating means outputting the data after decoding in the coefficient region in the corresponding block in the previous frame which is one frame prior to the frame including the present block in which the loss occurs to the inverse orthogonal transformation unit by clearing all the coefficients representing AC components when the loss occurs and outputting the input as is after the decoding to said inverse orthogonal transformation unit as is when the cell loss does not occur.

32. An image data transmission system for coding input image data in a picture element region using a plurality of picture elements as a block and to be transmitted in units of packets or cells, wherein a loss detecting means for detecting a loss of a packet or a cell and a loss compensating means are provided on the receiving side of the image data transmission system, said loss compensating means obtaining the average value of the data after decoding all the picture elements forming the corresponding block to the present block and in a frame which is one frame prior to the previous frame including the present block in which the loss occurs, and replacing the data corresponding to all the picture elements forming the present block by said average value to be output when the loss happens, and for outputting the input after the decoding when the loss does not happen.

33. An image data transmission system for coding input image data in units of blocks by using a plurality of images as one block and sending the coded data in packets or cells, wherein the transmission side of said image data transmission system comprises a first frame memory for storing the block data in the block corresponding in the previous frame, the present block, movement detecting means for receiving an output of said first frame memory and input block data and for outputting a movement vector, a first variable delay circuit for receiving an output from said first frame memory and said movement detecting unit, a subtracter for obtaining the difference between input block data and the output of said first variable delay circuit, a quantizing means for quantizing the output of said subtracter, a coder for adding the output of said quantizing means to the output of said first variable delay circuit and for outputting the sum to said first frame memory, a coder for coding the output of said quantizing means, a large/small judging unit for comparing the movement vector output from said movement detecting means with the predetermined threshold value to provide the large/small movement signal, a multiplexer for multiplexing block data output from said coder as the coded data, the movement vector output from said movement detecting unit, and the large/small movement signal output from said large/small judging unit as the compensation designating signal, the receiving side of the image data transmission system comprises a demultiplexer for separating the input signal into block data as the coded data, the large/small movement signal as the compensation designation signal, and the movement vector, loss detecting means for detecting a data loss and generating a loss detecting signal, loss compensation control means for receiving the compensation designation signal output from said demultiplexer and the loss detecting signal from said loss detecting means designating the existence of the data loss, a decoder for decoding the block data from said demultiplexer, a second frame memory for storing the data in the previous frame, a second variable delay circuit for receiving the output from said second frame memory and the movement vector from said demultiplexer, a second adder for adding the output of said second variable delay circuit to the output of said decoder, an AC/DC separating unit for separating the output of said second adder into a direct current component and an AC component, a DC separating unit for receiving the data of the adjacent block adjacent to the present block stored in said second frame memory, a first switch for outputting the direct current component from said the AC/DC separating unit or the output of said DC separating unit, a second switch for outputting the AC component or ground potential output from said AC/DC separating unit and an AC/DC multiplexing unit for receiving the output of said first switch and the output of said second switch and for providing the multiplexed output to said second frame memory.

34. The image data transmission system according to claim 33, wherein when loss of the block data does not occur, said loss compensation control means connects said first switch to the output side of the direct current component of said AC/DC separating unit and connects said second switch to the AC component output side of said AC/DC separating unit, thereby completing a process, when the loss occurs, the movement vector output from said movement detecting means is judged to be small, when said movement vector is small, said first switch is connected to the direct current component output side of said AC/DC separating unit and said second switch is connect to the AC component output side of said AC/DC separating unit, when said movement vector is large, said first switch is connected to the output terminal of said DC separating unit and said second switch is connected to ground.

35. The image data transmission system according to claim 33, wherein said transmission side further comprises a second DC separating unit for separating a direct current component of the input block data, a third DC separating unit for separating a direct current component of a block in the previous frame output from said first frame memory, a second subtracter for obtaining the difference of said output of the second and third DC separating units, a second quantizing means for quantizing the output of said second subtracter, and a second coder for coding the output of said second quantizing means, thereby multiplexing coded data, a compensation designating signal and direct current difference replacement information as an output of the second coder, said demultiplexer on the receiving side separately outputs the direct current difference replacement information, the receiving side further comprises a second decoder for decoding the direct current difference replacement information provided by said demultiplexer and a third adder for adding the output of the DC separating unit on the receiving side to the output of the second coder, thereby enabling said first switch to provide the output of said third adder or the direct current component of said AC/DC separating unit.

36. The image data transmission system according to claim 33, wherein said transmission side further comprising a DC separating unit for separating the DC component of the input block data, a second quantizing means for quantizing the output of said DC separating unit, a second coder for coding the output of said second quantizing means, thereby enabling said multiplexer to further multiplex the direct current replacement information as the output of said second coder, and said demultiplexer of the receiving side separately outputs the direct current replacement information, said receiving side further comprising a second coder for coding the direct current replacement information from said demultiplexer in place of said DC separating unit, thereby enabling said first switch and said second decoder to provide the direct current component output from said AC/DC separating unit.

37. The image data transmission system according to claim 36, wherein when the loss of the block data does not occur, said loss compensation control means connects said first switch to the output side of the direct current component of said AC/DC separating unit and connects said second switch to said AC component output side of said AC/DC separating unit, thereby completing the process, when the loss occurs, the movement vector is judged to be small or not when the movement vector is small, said first switch is connected to the direct current component output side of said AC/DC separating unit and said second switch is connected to the AC component output side of the separating unit, thereby completing the process, and when the movement vector is large, said first switch is connected to the output side of said second decoder, and said second switch is connected to the ground, thereby completing the process.

38. The image data transmission system according to claim 33, wherein coded data for a plurality of blocks are transmitted with a serial number added to a plurality of packets or cells from the transmission side and, after the transmission is completed, the replacement information of the coded data for a plurality of block is transmitted with a special number added to the packet or cell, said special number not being included in said serial number, and the receiving side detects the loss of the packet or the cell based on the serial number added to the packet or the cell which is used for the transmission of the coded data.

* * * * *

UNITED STATES PATENT AND TRADEMARK OFFICE

CERTIFICATE OF CORRECTION

PATENT NO. : 5,191,446

DATED : March 2, 1993

INVENTOR(S) : Hamano et al.

It is certified that error appears in the above-identified patent and that said Letters Patent is hereby corrected as shown below:

Col. 2, line 30, "t hereby" should be --thereby--.

Col. 7, line 64, "deposal" should be --disposal--.

Col. 11, line 40, after "means" insert --.--.

Col. 16, line 5, after "circuit" insert --77--;
line 17, "inter frame" should be --inter-frame--.

Col. 19, line 8, "1 3," should be --13,--;

line 13, "1 38" should be --138--.

Col. 27, line 65, "53" should be --253--.

Col. 32, line 6, "cc,efficient" should be --coefficient--; delete "10".

Col. 43, line 13, "the" should be --be--; "cell" should be --cells--.

Col. 47, line 41, "inter frame" should be --inter-frame--;

UNITED STATES PATENT AND TRADEMARK OFFICE

CERTIFICATE OF CORRECTION

PATENT NO. : 5,191,446

DATED : March 2, 1993

INVENTOR(S) : Takashi Hamano, et al.

It is certified that error appears in the above-indentified patent and that said Letters Patent is hereby corrected as shown below:

Col. 47, lines 42 and 43, "intra frame" should be --intra-frame--.

Signed and Sealed this

Eleventh Day of January, 1994

Attest:

BRUCE LEHMAN

Attesting Officer

*Commissioner of Patents and Trademarks*